United States Patent
Shi et al.

(10) Patent No.: US 11,992,813 B2
(45) Date of Patent: May 28, 2024

(54) STRUCTURED HYDROGEL MEMBRANES FOR FRESH WATER HARVESTING

(71) Applicant: California Institute of Technology, Pasadena, CA (US)

(72) Inventors: Ye Shi, Pasadena, CA (US); Julia R. Greer, Pasadena, CA (US); Harry A. Atwater, Pasadena, CA (US); Ognjen Ilic, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/862,916

(22) Filed: Jul. 12, 2022

(65) Prior Publication Data
US 2023/0024854 A1    Jan. 26, 2023

Related U.S. Application Data

(60) Provisional application No. 63/221,670, filed on Jul. 14, 2021.

(51) Int. Cl.
| | |
|---|---|
| *B01D 69/14* | (2006.01) |
| *B01D 53/26* | (2006.01) |
| *B01D 61/36* | (2006.01) |
| *B01D 69/02* | (2006.01) |
| *B01D 71/38* | (2006.01) |
| *C02F 1/44* | (2023.01) |

(52) U.S. Cl.
CPC ......... *B01D 69/147* (2013.01); *B01D 53/261* (2013.01); *B01D 61/364* (2013.01); *B01D 69/02* (2013.01); *B01D 69/1411* (2022.08); *B01D 71/381* (2022.08); *C02F 1/447* (2013.01); *B01D 2311/2626* (2013.01); *B01D 2311/2674* (2022.08); *B01D 2313/367* (2022.08); *B01D 2325/04* (2013.01); *B01D 2325/36* (2013.01); *C02F 2201/009* (2013.01)

(58) Field of Classification Search
CPC .. B01D 69/147; B01D 53/261; B01D 61/364; B01D 69/02; B01D 69/1411; B01D 71/381; B01D 2311/2626; B01D 2311/2674; B01D 2313/367; B01D 2325/04; B01D 2325/36; B01D 2325/06; C02F 1/447; C02F 2201/009; C02F 2103/08; C02F 1/048; C02F 1/14; Y02A 20/212
See application file for complete search history.

(56) References Cited

PUBLICATIONS

Renyuan Li et al., Environ. Sci. Technol. 2018, 52, 11367-11377. (Year: 2018).*

(Continued)

*Primary Examiner* — Pranav N Patel
(74) *Attorney, Agent, or Firm* — Leydig, Voit & Mayer, Ltd.

(57) ABSTRACT

A membrane for water collection may include a sheet having a top surface and a bottom surface, and a plurality of conical structures disposed on the top surface of the sheet, the conical structures comprising a hydrogel material. Each conical structure of the plurality of conical structures may have a height of 1 mm to 50 mm, wherein height is measured from the top surface of the sheet to an apex of a conical structure. Each conical structure of the plurality of conical structures may have an apex angle of 10 to 60 degrees.

19 Claims, 42 Drawing Sheets

(56) References Cited

PUBLICATIONS

Roberts. Schemenauer et. al., Journal of Applied Meteorology, 1994, vol. 33, 1313-1322. (Year: 1994).*
Otto Klemm et al., AMBIO 2012, 41:221-234. (Year: 2012).*
Xingyi Zhou et al., Acc. Chem. Res. 2019, 52, 3244-3253. (Year: 2019).*
Xin Heng et al., ACS Appl. Mater. Interfaces 2014, 6, 8032-8041. (Year: 2014).*
Agam et al. (2006) "Dew formation and water vapor adsorption insemi-arid environments—A review," J. Arid Environ. 65, 572-590.
Andrews et al. (2011) "Three-Dimensional Hierarchical Structures for Fog Harvesting," Langmuir 27, 3798-3802.
Assouline et al. (2017) "Evaporation From Soil Containers With Irregular Shapes," Water Resour. Res. 53, 8795-8806.
Bae et al. (2015) "Flexible thin-film black gold membranes with ultrabroadband plasmonic nanofocusing for efficient solar vapour generation," Nat. Commun. 6, 10103.
Bai et al. (2011) "Controlled Fabrication and Water Collection Ability of Bioinspired Artificial Spider Silks," Adv. Mater. 23, 3708-3711.
Bai et al. (2014) "Efficient Water Collection on Integrative Bioinspired Surfaceswith Star-Shaped Wettability Patterns," Adv. Mater. 26, 5025-5030.
Chen et al. (2017) "Highly Flexible and Efficient Solar Steam Generation Device," Adv. Mater. 29, 1701756.
Chen et al. (2018) "Ultrafast water harvesting and transport in hierarchical microchannels," Nat. Mater. 17, 935-942.
Chen et al. (2019) "Challenges and Opportunities for Solar Evaporation," Joule 3, 683-718.
Dai et al. (2018) "Hydrophilic directional slippery rough surfaces for water harvesting," Sci. Adv. 4, eaaq0919.
Damak et al. (2018) "Electrostatically driven fog collection using space charge injection," Sci. Adv. 4, eaao5323.
El-Samadony et al. (2016) "Influence of glass cover inclination angle on radiation heat transfer rate within stepped solar still," Desalination 384, 68-77.
Fao, Mountain Partnership Secretariat, UNCCD, SDC, CDE (2011). "Highlands and Drylands—mountains, a source of resilience in arid regions," Published by FAO, UNCCD, Mountain Partnership, Swiss Agency for Development and Cooperation, and CDE, with the support of an international group of experts. Rome.
Fessehaye et al. (2014) "Fog-water collection for community use," Renew. Sustain. Energy Rev. 29, 52-62.
Gao et al. (2018) "Solar absorber material andsystem designs for photothermal water vaporization towards clean water and energyproduction," Energy Environ. Sci. 12, 841-864.
Guo et al. (2019) "Synergistic Energy Nanoconfinement and Water Activationin Hydrogels for Efficient Solar Water Desalination," ACS Nano 13, 7913-7919.
Guo et al. (2019) "Tailoring Nanoscale Surface Topography of Hydrogel for Efficient Solar Vapor Generation," Nano Lett. 19, 15 2530-2536.
Guo et al. (Jul. 2020) "Hydrogels and Hydrogel-Derived Materials for Energy andWater Sustainability," Chem. Rev. 120, 7642-7707.
Guo et al. (Mar. 2020) "Biomass-Derived Hybrid Hydrogel Evaporators for Cost- Effective Solar Water Purification," Adv. Mater. 32, 1907061.
Heng et al. (2014) "Branched ZnO Wire Structures for Water Collection Inspired by Cacti," ACS App. Mater. Interfaces 6, 8032-8041.
Hou et al. (2015) "Recurrent Filmwise and Dropwise Condensation on a Beetle Mimetic Surface," ACS Nano 9, 71-81.
Hu et al. (2017) "Tailoring Graphene Oxide-Based Aerogels for Efficient Solar Steam Generation under One Sun," Adv. Mater. 29, 1604031.
Ito et al. (2015) "Multifunctional Porous Graphene for High-Efficiency Steam Generation by Heat Localization," Adv. Mater. 27, 4302-4307.
Johnson et al. (2001) "Managing Water for People and Nature," Science 292, 5 1071-1072.
Ju et al. (2012) "A multi-structural and multi-functional integrated fog collection system in cactus," Nat. Commun. 3, 1247.
Ju et al. (2014) "Cactus Stem Inspired Cone-Arrayed Surfaces for Efficient Fog Collection," Adv. Funct. Mater. 24, 6933-6938.
Kudo et al. (2014) "Structural changes of water in poly(vinyl alcohol) hydrogelduring dehydration," J. Chem. Phys. 140, 044909.
Lecoq et al. (2017) "Study of the water evaporation rate on stainless steel plate in controlled conditions," Int. J. Therm. Sci. 111, 450-462.
Liu et al. (2015) "Dropwise condensation theory revisited Part II. Dropletnucleation density and condensation heat flux," Int. J. Heat Mass Transf. 83, 842-849.
Lorenceau et al. (2004) "Drops on a conical wire," J. Fluid Mech. 510, 29-45.
Miyazaki et al. (2004) "Infrared Spectroscopic Evidence for Protonated Water Clusters Forming Nanoscale Cages," Science 304, 1134-1137.
Nandakumar et al. (2019) "Solar Energy Triggered Clean Water Harvesting from Humid Air Existing above Sea Surface Enabled by a Hydrogel with Ultrahigh Hygroscopicity," Adv. Mater. 31, 1806730.
Ni et al. (2016) "Steam generation under one sun enabled by a floating structurewith thermal concentration," Nat. Energy 1, 16126.
Ni et al. (2018) "A salt-rejecting floating solar still for low-cost desalination," Energy Environ, Sci. 11, 1510-1519.
Olivier et al. (2002) "The implementation of fog water collection systems in South Africa," Atmos. Res. 64, 227-238.
Park et al. (2013) "Optimal Design of Permeable Fiber Network Structures for Fog Harvesting," Langmuir 29, 13269-13277.
Parker et al. (2001) "Water capture by a desert beetle," Nature, 414, 33-34.
Shannon et al. (2008) "Science and technology for water purification in the coming decade," Nature 452, 301-310.
Shanyengana et al. (2002) "Exploring fog as a supplementary water source in Namibia," Atmos. Res. 64, 251-259.
Shi et al. (May 2021) "All-day Fresh Water Harvesting by Microstructured Hydrogel Membranes," Nature Communications, vol. 12, Article No. 2797.
Sun et al. (2019) "Plasmon Based Double-Layer Hydrogel Device for a Highly Efficient Solar Vapor Generation," Adv. Funct. Mater. 29, 1901312.
Tao et al. (2018) "Solar-driven interfacial evaporation," Nat. Energy 3, 1031-1041.
Tian et al. (2017) "Large-scale water collection of bioinspired cavity-microfibers, "Nat. Commun. 8, 1080.
Tu et al. (2018) "Progress and Expectation of Atmospheric Water Harvesting," Joule 2, 1452-1475.
Vörösmarty et al. (2000) "Global WaterResources: Vulnerability from Climate Change and Population Growth," Science 289,284-288.
Xu et al. (2016) "High-Efficiency Fog Collector: Water Unidirectional Transport on Heterogeneous Rough Conical Wires," ACSNano 10, 10681-10688.
Yang et al. (2018) "Graphene-Based Standalone Solar Energy Converter for Water Desalination and Purification," ACS Nano 12, 829-835.
Zhao et al. (2018) "Highly efficient solar vapour generation via hierarchically nanostructured gels," Nat. Nanotech. 13, 489-495.
Zhao et al. (Mar. 2020) "Materials for solar-powered water evaporation," Nat. Rev. Mater. 5, 388-401.
Zhou et al. (2016) "3D self-assembly of aluminium nanoparticles for plasmon-enhanced solar desalination," Nat. Photon. 10, 393-398.
Zhou et al. (2016) "Self-assembly of highly efficient, broadband plasmonic absorbers for solar steam generation," Sci. Adv. 2, e1501227.
Zhou et al. (2018) "A hydrogel-based antifouling solar evaporator for highly efficient water desalination," Energy Environ. Sci. 11, 1985-1992.
Zhou et al. (2019) "Accelerating vapor condensation with daytime radiativecooling," Proc. SPIE 11121, New Concepts in Solar and Thermal Radiation Conversionll, 1112107.

(56) References Cited

PUBLICATIONS

Zhou et al. (2019) "Architecting highly hydratable polymer networks to tune the water state for solar water purification," Sci.Adv. 5, eaaw5484.
Zhou et al. (May 2020) "Atmospheric Water Harvesting: A Review of Material and Structural Designs," ACS Mater. Lett. 2, 671-684.
Zhu et al. (2016) "Biomimetic water-collecting materials inspired by nature," Chem. Commun. 52, 3863-3879.

\* cited by examiner

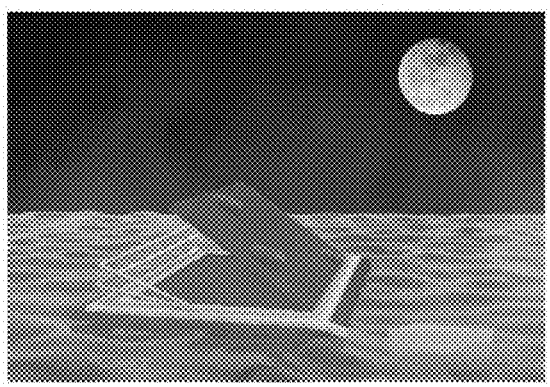 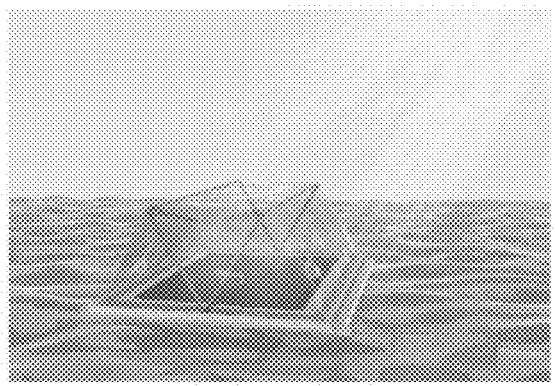
FIG. 1B  FIG. 1C
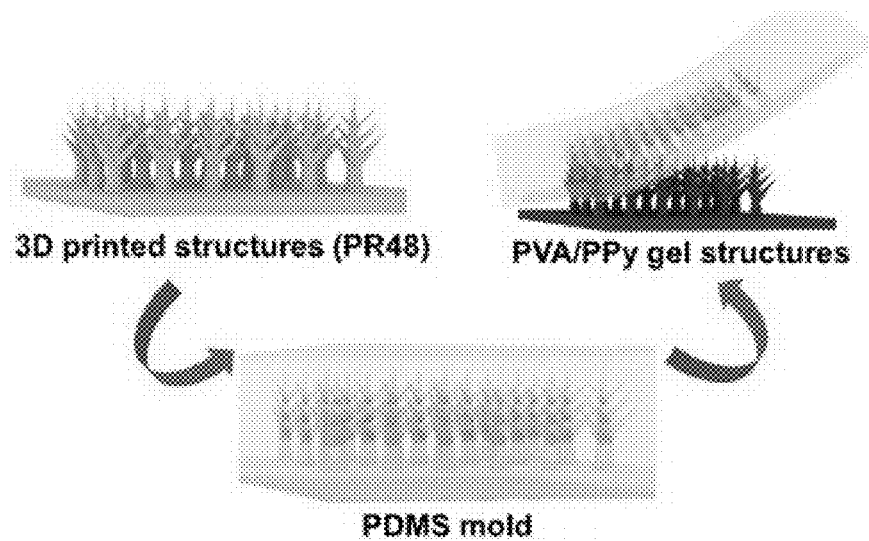
FIG. 2A

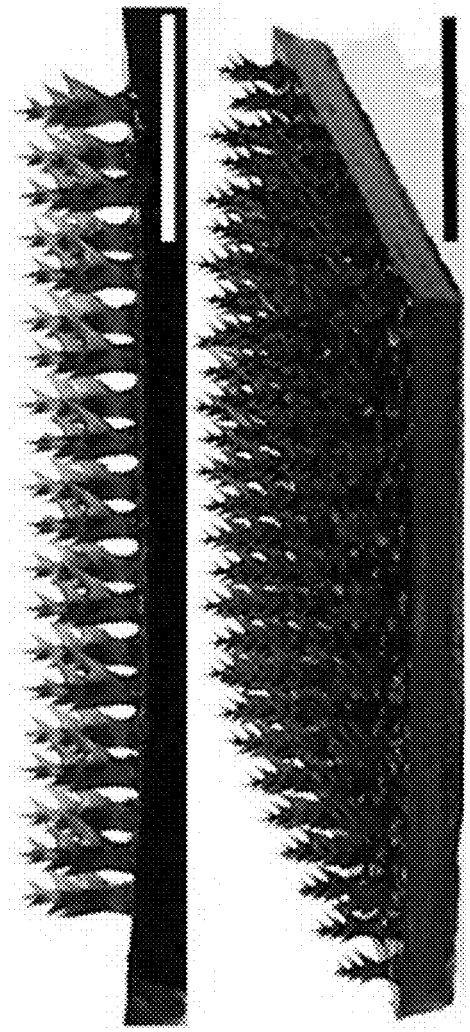
FIG. 2B
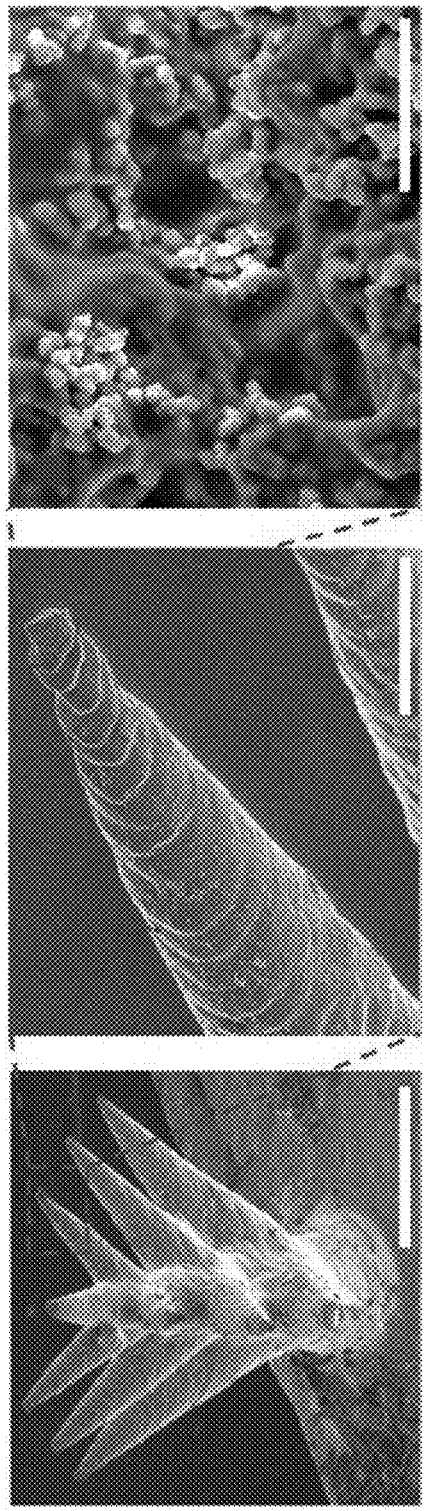
FIG. 2C
FIG. 2D
FIG. 2E

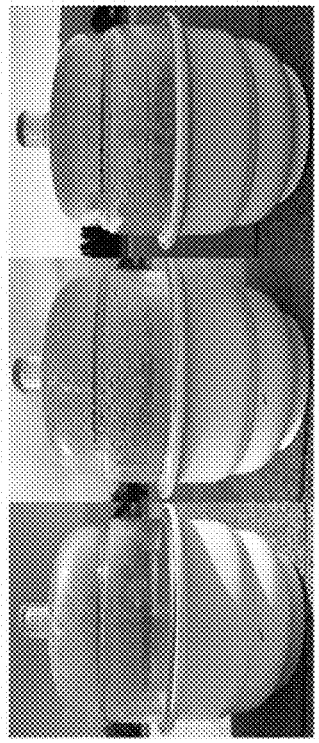
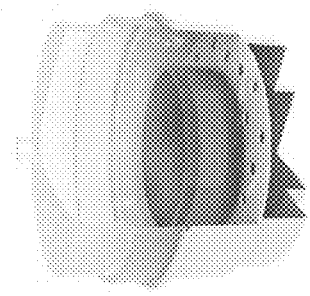
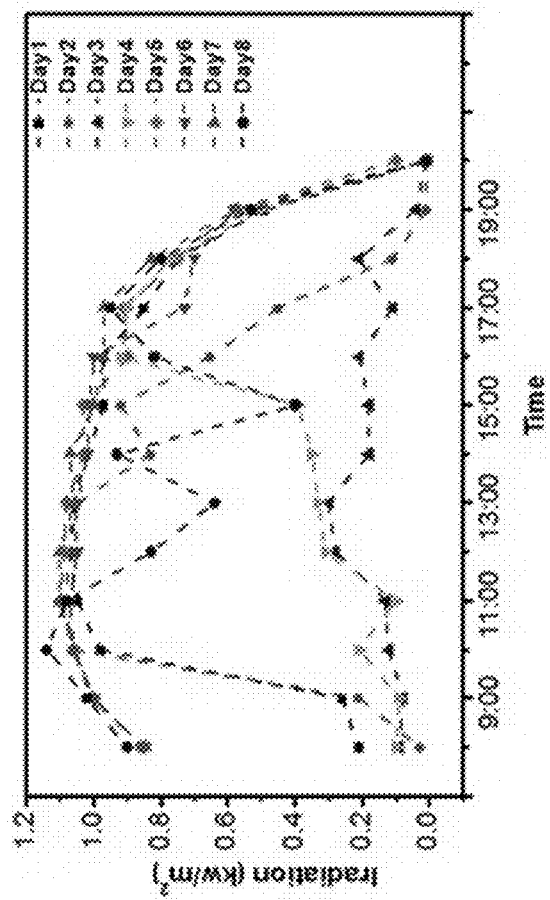
FIG. 5A
FIG. 5B
FIG. 5C

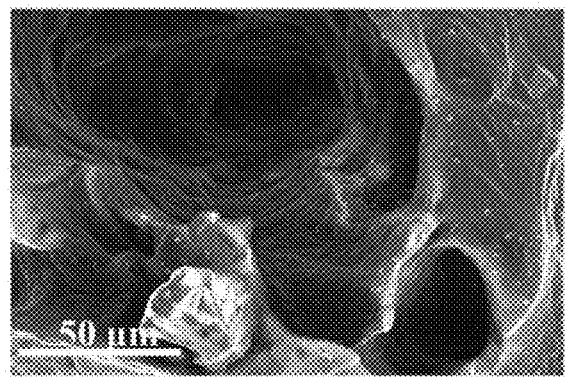 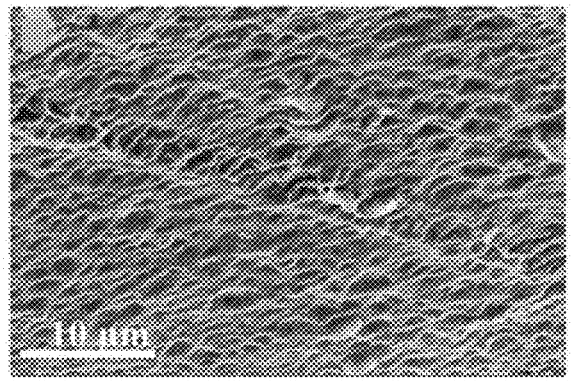
FIG. 7A  FIG. 7B
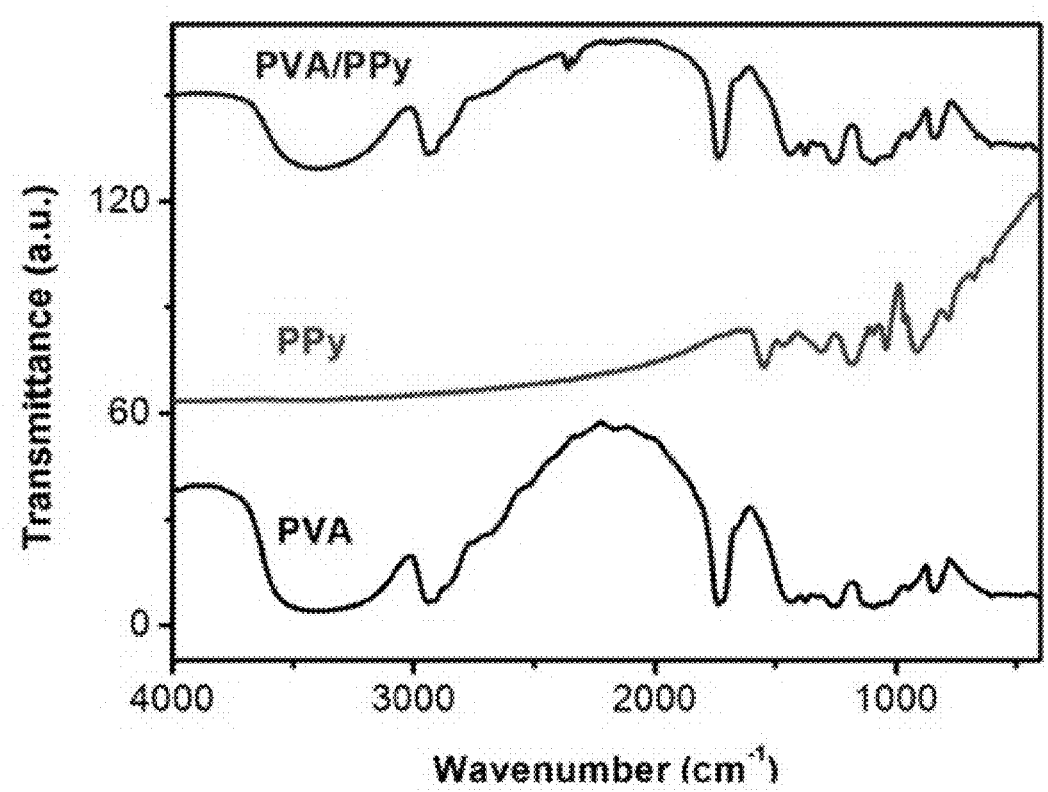
FIG. 8

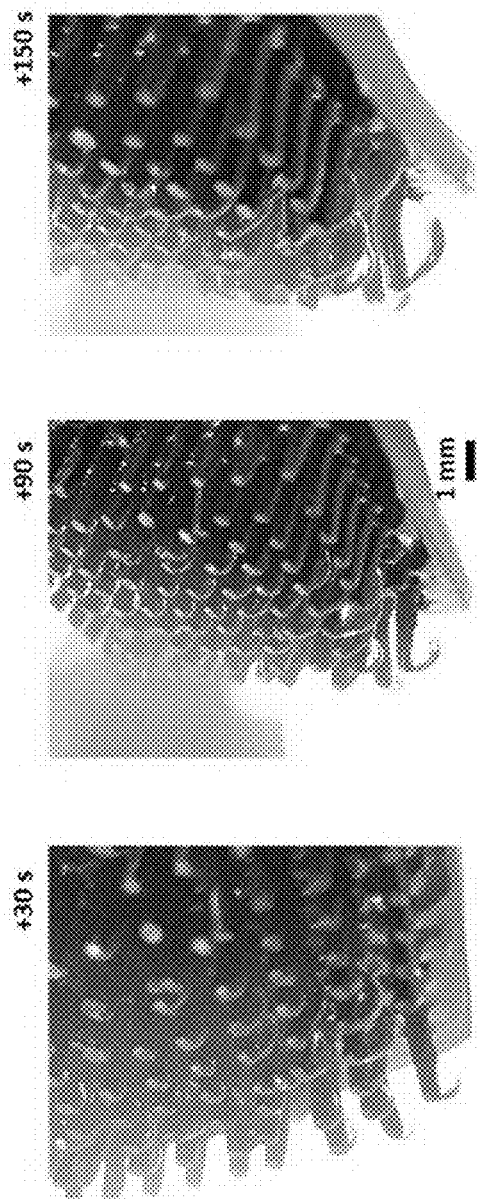
FIG. 21
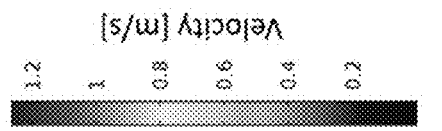
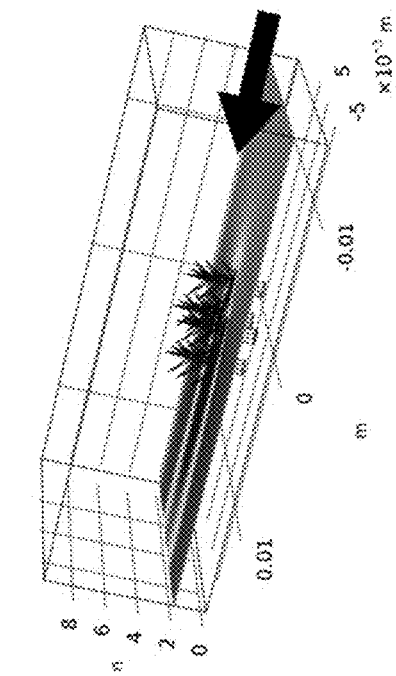
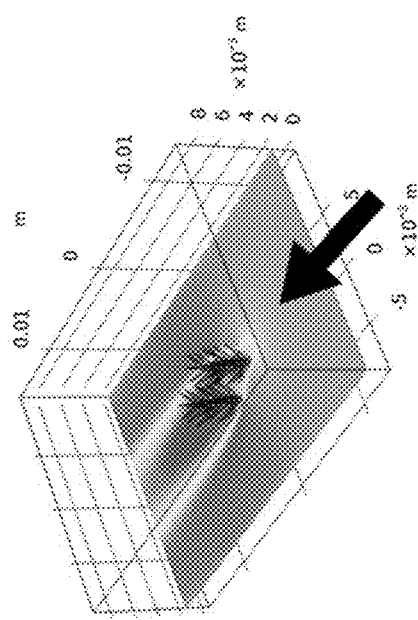
FIG. 22

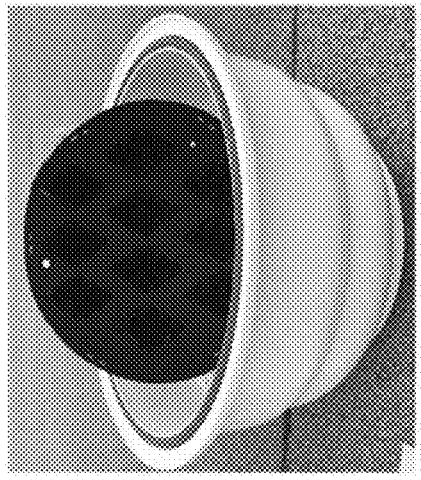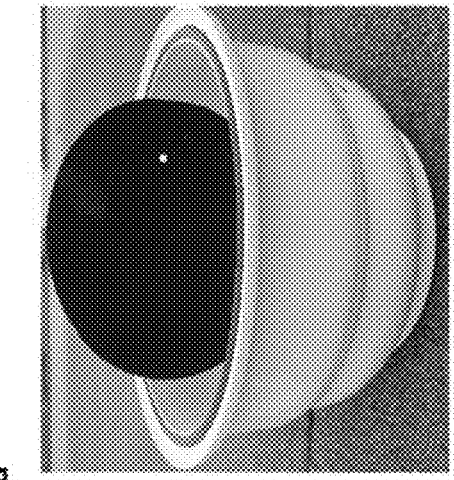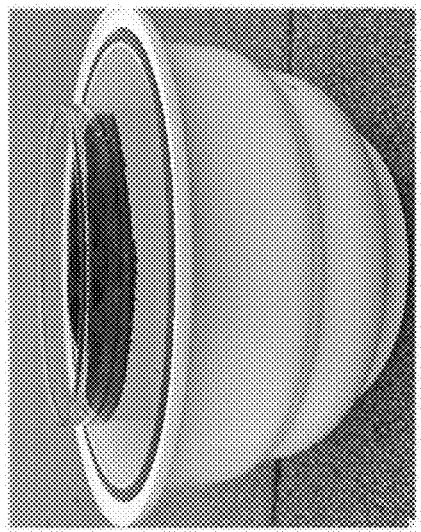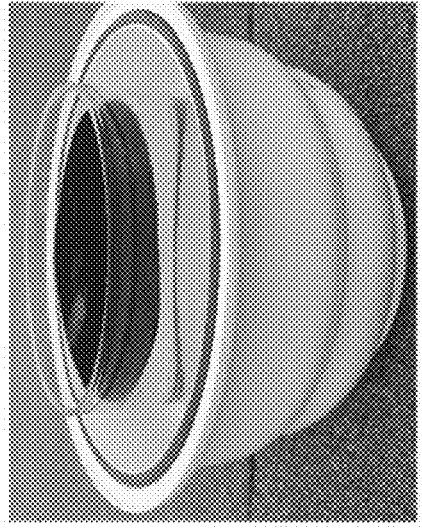
FIG. 31A  FIG. 31B
Green house for day mode    PVA/PPy gels loaded    Night mode: fog harvest
                            Control: polyurethane foam only

STRUCTURED HYDROGEL MEMBRANES FOR FRESH WATER HARVESTING

CROSS-REFERENCE TO RELATED APPLICATIONS

This application claims the benefit of priority to U.S. Provisional Patent Application No. 63/221,670, filed Jul. 14, 2021, which is hereby incorporated by reference in its entirety.

STATEMENT REGARDING FEDERALLY SPONSORED RESEARCH OR DEVELOPMENT

This invention was made with government support under Award Number DE-SC0004993 awarded by the U.S. Department of Energy. The government has certain rights in the invention.

BACKGROUND OF INVENTION

Water scarcity is among the most serious global challenges of our time, and significant efforts have been dedicated to harvesting fresh water from alternative sources[1-3]. Solar steam water purification and fog collection are two independent processes that can enable abundant fresh water generation.

Solar steam generation systems of the prior art may utilize sunlight as an energy source to purify saline or contaminated water by directly heating water and driving its evaporation at the water-air interface[4-10]. The efficiency of these systems depends on water transport and thermal management, and various materials have been studied for this application. For example, nanostructured carbon materials have been designed to absorb light and facilitate water transport[11-13], and plasmonic materials[14,15] and ceramics[5] were used to efficiently convert sunlight to thermal energy. Yu et al. demonstrated a polyvinyl alcohol (PVA)/polypyrrole (PPy) hydrogel based solar steam generator to have a vapor generation rate of 3.2 kg m$^{-2}$ h$^{-1}$ enabled by expedited water transport through porous matrix and a reduced water vaporization enthalpy within the polymeric mesh[16,17]. The vapor generation rate of the Yu system may be improved to ~3.6 kg m$^{-2}$ h$^{-1}$ by modifying the hydrogel systems with highly hydratable polymers or light-absorbing fillers[18,19]. All of these solar steam generators have major drawbacks in that they can only work under sufficient solar irradiation, and their output is limited by the solar energy density at the earth's surface, diurnal cycles, and the size of energy consumption required for water evaporation. The utility of these systems could be greatly improved if they could be used to harvest other fresh water resources when solar energy density is low, such as at night.

Fog frequently occurs in the coastal and post-sunset arid areas. Fog collection presents a promising and low-cost approach to water harvesting[23-25]. Polymer mesh materials are commonly used to capture fog[26-28,] but their efficiency is adversely affected by re-entrainment of deposited droplets and clogging of the mesh with pinned droplets[29]. Certain natural structures with distinctive functions have been discovered that avoid these problems and collect fog more efficiently[30-32]. For example, cactus spines are able to continuously harvest fog by driving directional movement of droplets[33]. Several bio-inspired fog collection motifs have been explored in which devices are constructed with metals[34], metal oxides[35] and polymers[36,37], all of which lack light-into-thermal energy conversion ability, thus rendering them incompatible with solar steam generation.

Thus, it can be seen that improved fresh water harvesting systems are needed to address the issues outlined above in order to provide relief from the ever-accelerating global water scarcity.

SUMMARY OF THE INVENTION

Provided herein are hydrogel membranes that employ hierarchical three-dimensional microstructures with high surface area, which in some embodiments may serve as a round the clock fresh water harvester. At night, the hydrogel membrane may efficiently capture fog droplets and directionally transports them to a storage vessel. During the daytime, the hydrogel membrane acts as an interfacial solar steam generator and achieves evaporation rates as high as 3.64 kg m$^{-2}$ h$^{-1}$ under 1 sun enabled by improved thermal/vapor flow management. When employed with a water harvesting system, this hydrogel membrane can produce fresh water with a daily yield of as high as ~34 L m$^{-2}$ in an outdoor test, which demonstrates its potential for global water scarcity relief.

In one aspect, PVA/PPy hydrogel membranes may be populated with three-dimensional (3D) tree-shaped surface microstructures. Hydrogel membranes may serve as an effective interfacial solar steam generator for water purification. Coupled with the excellent processability of hydrogels and their compatibility with advanced manufacturing techniques, these viscoelastic materials are easily shaped into microstructures that can mimic biological systems at relevant length scales to facilitate fog collection. When placed under controlled fog generation conditions, the hydrogel membrane may capture fog droplets at a rate of ~5.0 g cm$^{-2}$ h$^{-1}$ and drive droplet transport while providing directional control. Using experiments and modeling, it has been discovered that "tree-shaped" conical structures disposed on the surface of the membrane sheet may particularly effective for a combination of solar steam generation and fog capture. In one aspect, the conical structures may enable amplification of thermal and fluidic management for interfacial solar steam generation by maximizing light absorption efficiency and guiding vapor escape. In some embodiments, the conical structures may enable a solar vapor generation rate as high as 3.64 kg m$^{-2}$ h$^{-1}$ under 1 sun irradiation. In outdoor tests, the disclosed systems and methods may be capable of all-day fresh water harvesting, delivering a daily water collection rate as high as ~34 L m$^{-2}$.

In one embodiment, a membrane for water collection comprises a sheet having a top surface and a bottom surface, and a plurality of conical structures disposed on the top surface of the sheet, the conical structures comprising a hydrogel material. Each conical structure of the plurality of conical structures may have a height of 1 mm to 50 mm, wherein height is measured from the top surface of the sheet to an apex of a conical structure. Each conical structure of the plurality of conical structures may have an apex angle of 10 to 60 degrees.

In one embodiment, each conical structure comprises a trunk structure, and wherein each trunk structure further comprises a plurality of branch structures disposed thereon. In one embodiment, each trunk structure has a conical shape. In one embodiment, each branch structure has a conical shape. In one embodiment, each conical structure is characterized by a self-similar geometrical configuration.

In one embodiment, each conical structure of the plurality of conical structures has height of 2 mm to 20 m. In one embodiment, each conical structure of the plurality of conical structures has height of 2 mm to 10 mm. In one embodiment, each conical structure of the plurality of conical structures has height of 3 mm to 7 mm. In one embodiment, the plurality of conical structures has an average height selected from the range of 2 mm to 20 mm. In one embodiment, the plurality of conical structures has an average height selected from the range of 2 mm to 10 mm. In one embodiment, the plurality of conical structures has an average height selected from the range of 3 mm to 7 mm.

In one embodiment, each conical structure of the plurality of conical structures has an average width selected from the range of 0.2 mm to 10 mm, wherein width is measured where the base of the conical structure attaches to the sheet. In one embodiment, each conical structure of the plurality of conical structures has an average width selected from the range of 0.5 mm to 5 mm.

In one embodiment, each conical structure of the plurality of conical structures has an apex angle of 20 to 45 degrees. In one embodiment, the plurality of conical structures has an average apex angle of 20 to 45 degrees.

In one embodiment, the conical structures are disposed on the top surface at a density of 1 to 400 conical structures per $cm^2$. In one embodiment, the conical structures are disposed on the top surface at a density of 5 to 200 conical structures per $cm^2$. In one embodiment, the conical structures are disposed on the top surface at a density of 10 to 100 conical structures per $cm^2$. In one embodiment, the conical structures are disposed on the top surface at a density of 10 to 50 conical structures per $cm^2$.

In one embodiment, the conical structures are separated from a nearest adjacent conical structure by an average spacing of 0.3 to 15 mm. In one embodiment, the conical structures are separated from a nearest adjacent conical structure by an average spacing of 0.3 to 10 mm. In one embodiment, the conical structures are separated from a nearest adjacent conical structure by an average spacing of 0.3 to 5 mm. In one embodiment, the conical structures are separated from a nearest adjacent conical structure by an average spacing of 0.4 to 1.2 mm.

In one embodiment, the conical structures are provided over an area of the top surface of the hydrogel selected from the range of 1 $cm^2$ to 10 $m^2$. In one embodiment, the conical structures are provided over an area of the top surface of the hydrogel selected from the range of 1 $cm^2$ to 1 $m^2$. In one embodiment, the conical structures are provided over an area of the top surface of the hydrogel selected from the range of 1 $cm^2$ to 0.5 $m^2$.

In one embodiment, each trunk structure has a conical apex and a conical axis, the conical axis passing through the conical apex such that each trunk structure has circular symmetry about its respective conical axis; and the conical axis and the top surface of the sheet form an angle that is within 20 degrees of perpendicular.

In one embodiment, each branch structure has a conical apex and a conical axis, the conical axis passing through the conical apex such that each branch structure has circular symmetry about the conical axis; and for each branch structure, the conical axis of the trunk structure and the conical axis of the branch structure form an angle of 30 to 60 degrees.

In one embodiment, the hydrogel material is characterized by a contact angle selected from the range of 10 degrees to 90 degrees. In one embodiment, the hydrogel material is characterized by a contact angle selected from the range of 10 degrees to 90 degrees.

In one embodiment, the hydrogel material hydrophilicity is characterized by a contact angle below 90 degrees. In one embodiment, the hydrogel material hydrophilicity is characterized by a contact angle below 70 degrees.

In one embodiment, the hydrogel material comprises polyvinyl alcohol, poly(ethylene oxide), poly(hydroxyethyl methacrylate), polyacrylamide, polyacrylic acid, chitosan, cellulose, poly(3,4-ethylenedioxythiophene), polythiophene, polypyrrole, polyaniline and any combination of these. In one embodiment, the hydrogel material comprises a polyvinyl alcohol/polypyrrole hydrogel. In one embodiment, the hydrogel material comprises polypyrrole particles dispersed in a matrix of polyvinyl alcohol.

In one embodiment, the hydrogel material is a first hydrogel material, and wherein the sheet comprises a second hydrogel material. In one embodiment, the first hydrogel material are the second hydrogel material are different. In one embodiment, the first hydrogel material are the second hydrogel material are the same material.

In one embodiment, the hydrogel membrane is hierarchically porous. In one embodiment, the hydrogel membrane has an average thickness selected from the range of 0.5 to 100 mm. In one embodiment, the hydrogel membrane is hierarchically porous. In one embodiment, the hydrogel membrane has an average thickness selected from the range of 1 to 50 mm. In one embodiment, the hydrogel membrane has an average thickness selected from the range of 2 to 25 mm.

In one embodiment, the hydrogel membrane has a maximum absorbance in the visible region of the electromagnetic spectrum of greater than 80%.

In one embodiment, the hydrogel membrane is a molded or embossed structure. In one embodiment, the hydrogel membrane is produced via a mold produced at least in part by via an additive manufacturing technique. In one embodiment, the manufacturing technique is stereolithography 3D Printing. In one embodiment, a water collection system may include the hydrogel the membrane.

In one embodiment, a method of purifying and collecting water comprises contacting a membrane with fog, wherein the membrane comprises: a sheet having a top surface and a bottom surface; and a plurality of conical structures disposed on the top surface of the hydrogel sheet, the conical structures comprising a hydrogel material. The method may further include absorbing water from the fog into the membrane via the conical structures, collecting the fog-derived water, placing the membrane on the surface of an amount of impure water, covering the membrane with a condensation structure, wherein the condensation structure is at least partially transparent to solar radiation, distilling at least a portion of the impure water, wherein the distilling comprises: absorbing the impure water into the membrane via the bottom surface of the sheet, heating the membrane via solar radiation, releasing purified water vapor from the conical structures, condensing the purified water vapor on a surface of the condensation structure, and collecting the condensed purified water.

In one embodiment the method may include tilting the hydrogel sheet to improve drainage of the fog-derived water from the hydrogel membrane, concomitant with or prior to the step of contacting the hydrogel membrane with fog.

In one embodiment, the method comprises floating the hydrogel membrane on the surface of the impure water.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 1A-1C: Design of the bifunctional gel membranes and all-day water harvesting prototype. FIG. 1A: Conceptual representation of an exemplary hydrogel membrane with tree-shaped conical structures harvesting fresh water around the clock. FIGS. 1B and 1C. Schematic illustration of nighttime (FIG. 1B) and daytime (FIG. 1C) modes of an exemplary water collection system incorporating the membrane of FIG. 1A.

FIGS. 2A-2E: Fabrication and structure characterization of some embodiments of the microstructured hydrogel membranes. FIG. 2A: Schematic illustration of an exemplary method of fabrication of microstructured hydrogel membranes. FIG. 2B: Images of an exemplary membrane with an array of tree-shaped conical structures disposed thereon. Scale bar: 1 cm. FIG. 2C: Images of an exemplary tree-shaped conical structure. Scale bar: 1 mm. FIG. 2D: SEM image of an exemplary conical branch structure. Scale bar: 50 μm. FIG. 2E: Porous structure of PVA/PPy hydrogel matrix. Scale bar: 5 μm.

FIG. 3A: Snapshots of fog collection process for a single tree-shaped conical structure. Dashed circles correspond to droplet formation events and arrows point to droplet motion trajectories. Scale bar: 0.5 mm. FIG. 3B: Fog collection rates measured for different membrane structures as a function of time that demonstrates saturation at a particular time, unique to each structure. FIG. 3C: Fog collection rates of different gel membrane structures at steady states normalized by the projected area, $A_p$, (left column) and by the total surface area, $A_s$, (right column). FIG. 3D: Fog collection rate and Laplace pressure difference as a function of apex angle of the conical structures. FIG. 3E: Comparison to commercial meshes and a real cactus stem. FIG. 3F: Results of a study of the effects of long term storage of hydrogel membranes having tree-shaped conical structures. The hydrogel membrane maintains dual water harvesting functions after more than twenty-month storage.

FIG. 4A: Water loss for different membrane structure shapes under 1 sun, with free water as control. FIG. 4B: Evaporation rate and energy efficiency for different tested micro-topologies. FIG. 4C: Light absorption spectra over wavelengths of 250 to 2500 nm of different membrane structure shapes. The small jump of the curves at wavelength ~900 nm is caused by the switch of detectors. FIG. 4D: Surface temperature contours (left) and illuminated pattern (right) for different membrane structure shapes under normal 1 sun illumination, simulated using COMSOL. FIG. 4E: Measured surface temperature as a function of time at four positions along the height of a typical tree-shaped conical structure.

FIGS. 5A-5F: All-day water harvesting by PVA/PPy tree-shaped conical structure array outdoors. FIG. 5A: Hydrogel membrane samples are held by a supporting structure made of polyurethane foam. FIG. 5B: Schematic illustration and photos of a rooftop prototype water collection system acting as a solar water desalination system during daytime. FIG. 5C: Solar radiation recorded during rooftop tests by portable solar power radiation meter. FIG. 5D: Daily water collection per square meter of gel membrane during rooftop tests. Red: water collected during daytime (8 am to 8 pm); blue: water collected during nighttime (8 pm to next day's 8 am). FIG. 5E: Daytime and (FIG. 5F) nighttime modes of a floating water harvesting prototype. Insets show the water collected during a day (~170 mL) and night (~70 mL).

FIGS. 7A-7B: SEM images of PVA/PPy hydrogels showing (FIG. 7A) broad internal gaps with diameters from 50 to 150 μm, which together with micro-pores enable rapid water diffusion and capillary pumping to supporting a sustained high rate vapor generation[1]. (FIG. 7B) the wrinkled internal surface, which indicates shrinkage of the polymeric skeleton (PVA network) during dehydration of the hydrogel.

FIG. 8: FTIR spectra of PVA, PPy and PVA/PPy hybrid gels. PVA shows a characteristic peaks at 1093 $cm^{-1}$, which can be attributed to C—O stretching. PPy shows absorption signals at 1552 $cm^{-1}$ and 1045 $cm^{-1}$, which are corresponding to the in-ring stretching of C=C bonds in the pyrrole rings and the in-plane deformation of N—H bonds, respectively. All these characteristic peaks of PVA and PPy can be found in the FTIR spectra of PVA/PPy hybrid gel, which confirms the presence of PPy in the PVA matrix. These peaks show no shifts, indicating that PPy particles are physically mixed with PVA.

FIG. 21: Photos showing fog collection behavior of PVA/PPy gel cylinders. After the initial drop forms on the gel cylinder, the size of droplet keeps increasing with a much lower rate by absorbing water in fog flow. The droplet sticks on the gel surface without obvious movement of its mass center. After more than 2.5 min, the droplet falls from the gel cylinder when it becomes too large for the structure to support its weight. The sticking behavior leads to even worse fog collection performance of gel cylinders than that of flat surface.

FIG. 22: Simulated flow field for a configuration with a reduced number of tree-shaped conical structures. The dynamics were modeled with the Reynolds-averaged Navier-Stokes (RANS) equations, with automatic wall treatment and default COMSOL flow parameters. Arrow corresponds to the inflow direction, with the boundary velocity of 1 m/s at the inlet. This qualitative result corroborates the assessment that the tree-shaped conical structure array disrupts and slows down the fog flow field.

FIG. 28A: Flat surface, of which larger depth below surface is heated. This part of energy is wasted for heating water in gel matrix under evaporation surface rather than supporting vapor generation. FIG. 28B: Cone, which can absorb light through its entire surface. However, its titled surface towards normal light irradiation leads to lower light absorption by unit area. FIG. 28C: Cylinder, which shows reduced temperature in the middle section because this part of cylinder can't absorb sunlight directly. The surface of the base is the hottest for all geometries (FIGS. 28A-28C); for cones (FIG. 28B), the temperature decreases from the base towards the cone tip; for pillars (FIG. 28C), the temperature decreases along the pillar, but increases towards the base/tip. The experimentally measured temperatures are consistent with the observed trends in the qualitative model.

FIG. 31A: Photos showing rooftop tests set-up for solar driven water purification during daytime and fog harvesting during night. The prototype was placed on the roof of one Caltech building. 10 pieces of PVA/PPy gels (~55 $cm^2$ in total) were held by a supporting structure which was made by a 1-mm thick layer of polyurethane foam and nylon mesh. During daytime (8:00 am to 20:00 pm), the gel loaded structure floated on a basin of brine water (3.5 wt % NaCl solution) and covered the whole water surface. A transparent cover was applied on the prototype. During night (20:00 pm to next day's 8:00 am), the transparent cover was removed and the gels were supported to face air flow with 45 degree tilted. FIG. 31B: Set-up of control experiment using polyurethane foam as control sample. From the desiccator with gel samples, 180 to 200 ml water were collected after 12 h solar vapor evaporation. From the control experiment, 5 to 20 ml water was generally collected, which is subtracted.

(FIG. 34A) test on Jun. 26, 2020 and (FIG. 34B) test on Jul. 10, 2020. When the gel samples are fully working under 1 sun irradiation, the temperature on the desiccator surface is around 10° C. lower than the internal temperature and 15 to 20° C. higher than the ambient temperature. The wind velocity is from 2 to 10 mph. These factors help facilitate efficient water condensation. The condensation area in the outdoor system is more than 30 times larger than that of gel samples. It is reported that when the temperature of water vapor in the solar water-purification system is around 40° C.[12], the upper bound of the condensation rate of a convective condenser is less than 0.1 kg $m^{-2}$ $h^{-1}$. Considering the condensation area in the present case is more than 30 times larger than evaporation area, the system could support efficient condensation for the gel samples.

STATEMENTS REGARDING CHEMICAL COMPOUNDS AND NOMENCLATURE

Figure 1A:
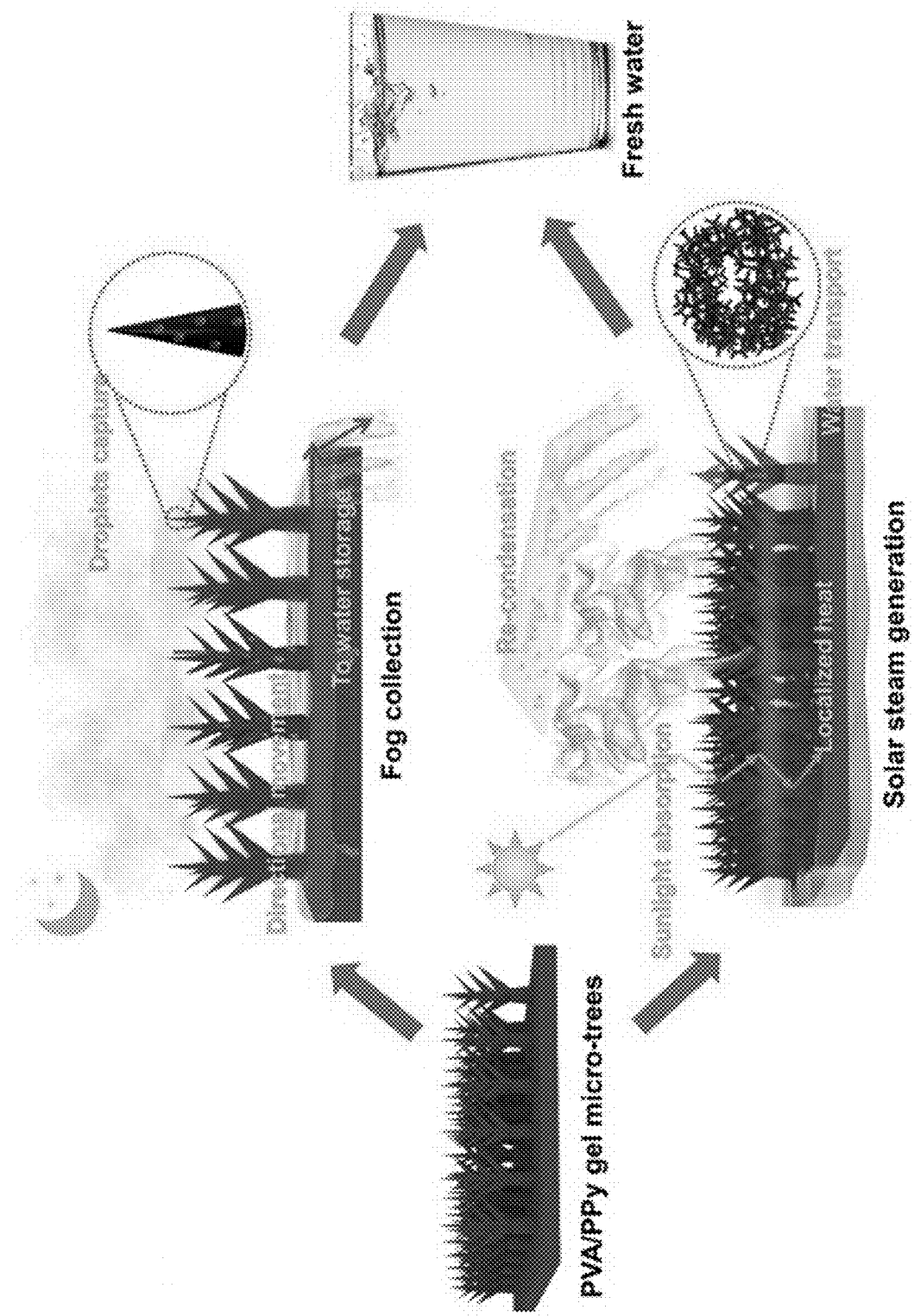

In general, the terms and phrases used herein have their art-recognized meaning, which can be found by reference to standard texts, journal references and contexts known to those skilled in the art. The following definitions are provided to clarify their specific use in the context of the invention.

The term "membrane" as used herein refers to a porous layer to facilitate evaporation of water beneath the membrane and collection of fog from above the membrane.

The term "sheet" as used herein refers to a structure having a length and width larger than its thickness. A hydrogel membrane sheet may have a top surface and a bottom surface, wherein the distance between the two surfaces defines the sheet thickness. The thickness of a hydrogel membrane sheet may be consistent across the entire sheet, or it may have variations (e.g., tapered edges, random variations due to manufacturing, etc.). In some embodiments, the top and/or bottom surfaces of a hydrogel membrane sheet may have a regular shape, for example, a rectangle or parallelogram. In some embodiments, the top and/or bottom surfaces of a hydrogel membrane sheet may have an amorphous shape. In some embodiments, the top and/or bottom surfaces of a hydrogel membrane sheet may be flat. In other embodiments, the top and/or bottom surfaces of a hydrogel membrane sheet may define one or more shapes including but not limited to: curves, waves, grooves, etc.

The term "conical structure" as used herein refers to a structure comprising a least one cone shape, such that the at least one cone shape tapers from a base to an apex. In some embodiments, the base of the cone may be a circle or an ellipse. A conical structure may comprise a single cone shape or multiple cone shapes. For example, tree-shaped conical structures are conical structures that include multiple cone shapes, specifically: a conical "trunk" structure disposed on a membrane sheet, with the conical trunk supporting one or more conical "branch" structures.

The term "hydrogel material" as used herein refers to a material comprising a cross-linked hydrophilic polymer matrix. Examples of hydrogel materials include polyvinyl alcohol, poly(ethylene oxide), poly(hydroxyethyl methacrylate), polyacrylamide, polyacrylic acid, chitosan, cellulose, poly(3,4-ethylenedioxythiophene), polythiophene, polypyrrole, polyaniline.

The term "apex of a conical structure" as used herein refers to the tapered point of a conical structure.

The term "apex angle of a conical structure" as used herein refers to the angle made by the outer surface of the conical structure at the apex.

The term "hierarchically porous" as used herein refers to a porous material in which the porosity and structure span multiple length scales. For example, a hierarchically porous material may have a number of pores in the 1-10 nm range and a number of pores in the 0.1-1 mm range.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

In one aspect, disclosed herein are hydrogel membranes which contain three-dimensional surface microstructures. These hydrogel membranes may be used for round the clock fresh water harvesting. At night, the hydrogel membrane may capture fog droplets and directionally transports them to a storage vessel through the 3D surface microstructures. One microstructure of particular interest is arrays of tree-shaped conical structures comprised of self-similar branched micro-cones. These surface microstructures have been discovered to have high fog harvesting efficiency. During the daytime, the hydrogel membrane acts as an interfacial solar steam generator to purify sea water or contaminated water. The membrane absorbs sunlight energy and heats the water to evaporation at the gel-air interface. The 3D surface microstructures promote these processes by providing high surface area, increasing solar absorption, and optimizing thermal energy distribution and local humidity management. Compared to current technologies, the disclosed hydrogel membranes are the first material capable of combing these two functions to harvest fresh water around the clock.

As described below, the hydrogel membranes of the present disclosure may be incorporated into a bi-functional water harvesting system with day and night working modes. In one embodiment of the system comprises floating all-day water collection system with a foldable cover, tunable supporting structure, and complete water storage components. The hydrogel membranes may be placed on the supporting structure of this system. During daytime, the condensation structure (transparent cover) may be closed and the supporting structure (together with hydrogel membranes) may be placed on the surface of water. The generated vapor re-condenses on the cover, which is then collected and transported to water storage. During night, the cover remains open, and the gel samples face the fog flow. The fog may be collected through the surface of hydrogel membranes and is then directly transported to the clean water container. Thus, the disclosed systems are capable of both solar steam generation and fog harvesting functions.

In one aspect, the disclosed systems and methods include a highly hydrophilic hydrogel material for efficient fog capture while still efficiently removing the deposited droplets. In contract, conventional fog harvesting technologies generally use hydrophobic materials to facilitate the removal of deposited droplets. However, this decreases the fog capture (deposition of fog droplets on collecting surface) efficiency.

In one aspect, the surface microstructures may be rationally designed and fabricated by additive manufacturing. Such fabrication provides great tunability to enable different structures.

In one aspect, the properties (e.g. mechanical property, water transporting ability, sunlight absorption, et al.) of hydrogel matrix can be tuned by using different polymers or modification of its chemical structure.

The invention can be further understood by the following non-limiting examples.

Example 1—Design of PVA/PPy Gel Membrane with Micro-Tree Array for Bi-Functional Water Collection FIG. 1A is a schematic of one example of a fresh-water-collecting membrane. At night, the hydrogel membrane is exposed to fog, and the surface microstructures continuously capture fog droplets and transport them to a storage vessel. During the daytime, the hydrogel membrane acts as an interfacial solar steam generator to purify saline or contaminated water.

To develop this unique bifunctional water collection membrane, PVA based hydrogel was selected as the building material. This material choice stems from its favorable solar steam generation ability, water affinity, and processability. PVA hydrogel provides hierarchically porous pathways within its matrix for efficient water transport and it reduces the evaporation enthalpy of water owing to interactions between its hydroxyl groups and water molecules, thus enabling high-performance solar steam generation[16]. Its hydrophilic nature also favors water capture on its surface. Hydrogel materials are compatible with various processing techniques and can be easily shaped into desired structures.

While the illustrated embodiment employs PVA/PPy, other hydrogel materials may be employed additionally or alternatively. Useful hydrogel materials include poly(ethylene oxide), poly(hydroxyethyl methacrylate), polyacrylamide, polyacrylic acid, chitosan, cellulose, poly(3,4-ethylenedioxythiophene), polythiophene, and polyaniline, alone or in combination.

Though PVA hydrogel captures water efficiently, a smooth membrane surface inhibits its fog collection ability since captured droplets will be pinned on its hydrophilic surface. To enable optimally efficient water collection from fog, the surface structure needs to be modified to continuously remove deposited droplets[38,39]. It has been found that conical structures are particularly useful for this purpose. Water droplets attached to the sides of conical structures experience a Laplace pressure difference, $\Delta P$,[40]

$$\Delta P = \frac{dP}{dz}\big|_\Omega = -\frac{2\gamma}{(r+R_0)^2}\sin\alpha \qquad \text{Eq. 1}$$

where $\Omega$ is droplet volume, $\gamma$ is surface tension, r is the local radius, $R_0$ is the droplet radius and $\alpha$ is the half apex angle. This Laplace pressure difference drives droplets towards the wider base, thus re-exposing the gel surface to more incoming vapor. According to Equation 1, the apex angle in the design is smallest possible within the constraints of fabrication process and mechanical strength of PVA hydrogel to increase $\Delta P$ and cause the droplets to move faster.

To increase the surface area and thus provide a benefit for both fog capture and interfacial solar steam generation, the conical structures were assembled in a hierarchical way by building branched small cones on a cone trunk and then these tree-like structures were arrayed into a dense forest on membrane surface. Light absorption is improved in the hydrogel "forest" and water droplets collected on branches are able to merge together for quick drainage. The density of these hydrogel tree-shaped structures is also carefully tuned to facilitate escape of generated vapor during steam generation and water drainage during fog collection.

To realize all-day water collection in natural environments, a floating water collection system was assembled. As shown in FIGS. 1B and 1C, the system includes a foldable cover. During night, the foldable cover may be left open and the hydrogel membrane can be supported to face the fog flow. During daytime, the foldable cover may remain closed to act as a re-condensation structure.

Figure 9A:
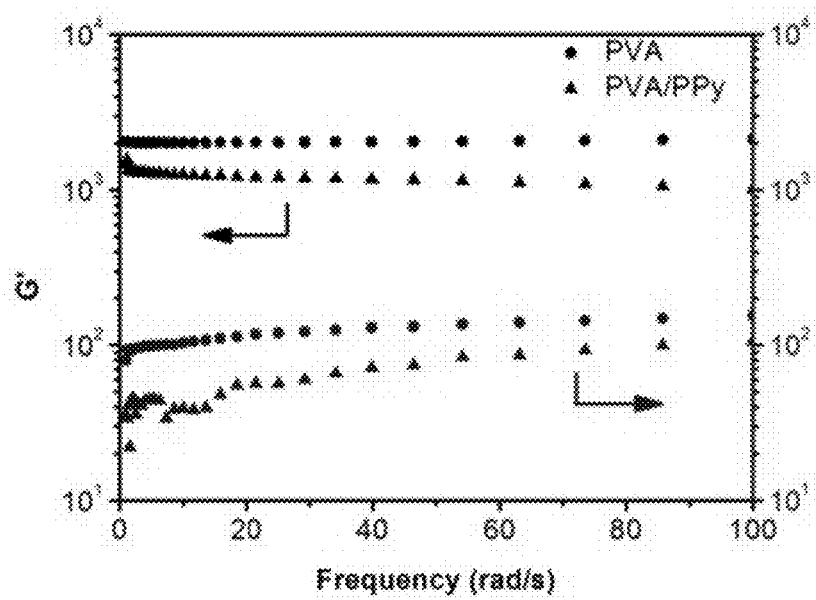
FIG. 9A: The storage modulus (G') and loss modulus (G") of as-prepared PVA and PVA/PPy gels. Both samples exhibit solid gel behavior. The hybrid gel exhibits a ~40% lower G' than the pure PVA gel because it has fewer crosslinking points caused by the introduction of PPy. The lower G" of the PVA/PPy hybrid gel indicates that the polymeric PVA chains are immobilized by the hard PPy segments.

The micro-tree array structure was designed in CAD software (FIGS. 6A-6C) and fabricated on a PVA/PPy gel membrane using stereolithography 3D Printing, followed by a simple molding method (FIG. 2A). The photomicrographs in FIG. 2B illustrate a typical gel membrane with a projected area ($A_p$) of ~5.5 $cm^2$, which contains 100 hexagonally arranged micro-trees on a supporting layer. Each tree is ~4 mm tall, has a bottom diameter of ~0.8 mm, and contains nine 45-degree tilted conical branches at ⅓, ½, and ⅔ of the tree height (FIG. 2C). All the branched cones have same conicity as the trunk. Scanning electron microscope images reveal that the smallest dimension of the conical structure is ~20 μm at the tip (FIG. 2D). The cross-linked hydrogel is hierarchically porous and contains inter-dispersed PPy particles, which may be beneficial in enabling efficient water transportation within the matrix (FIGS. 2E and 7A-7B)[16]. The chemical composition and mechanical properties of PVA/PPy hydrogels were also investigated by FTIR spectroscopy and rheological measurements (FIGS. 8 and 9A).

Figure 3A:
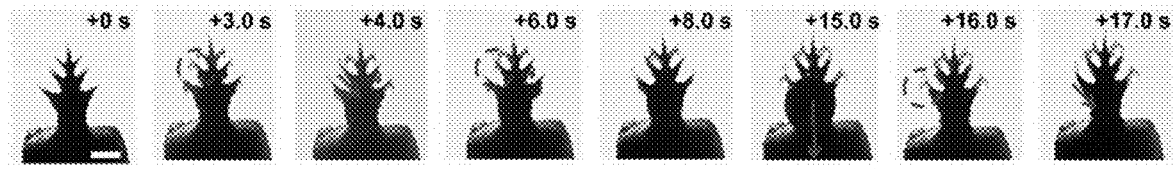
FIGS. 3A-3F: Fog collection properties of various hydrogel membrane structures.
Figure 3B:
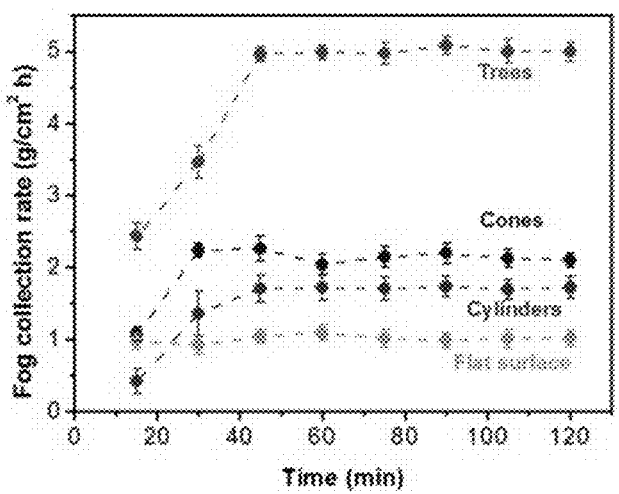
Figure 10A:
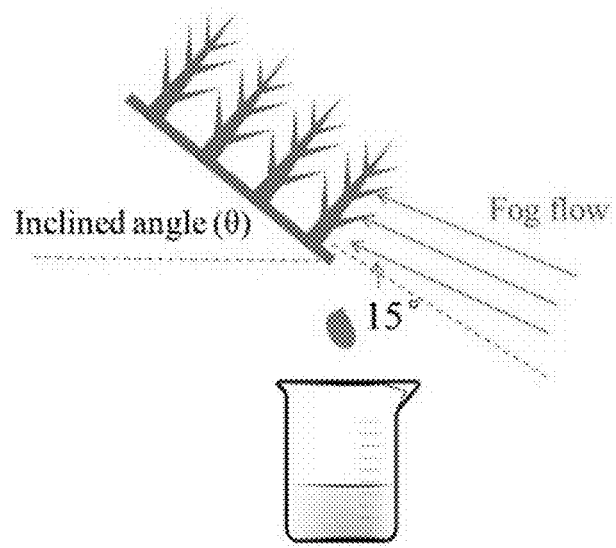
FIG. 10A: Schematic illustration of set-up of fog collection test.
Figure 10B:
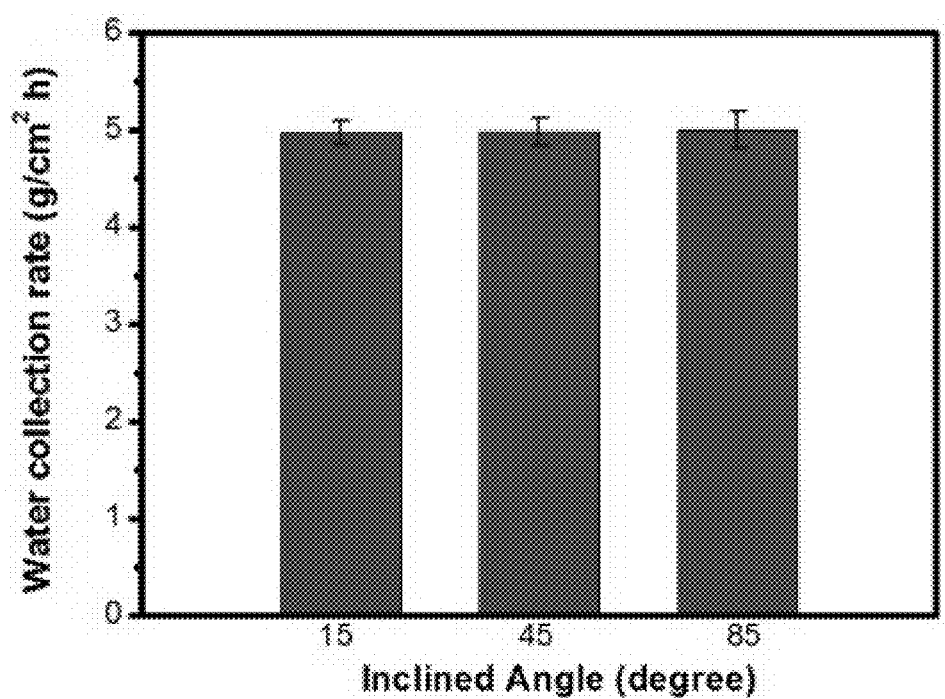
FIG. 10B: Fog collection rates of PVA/PPy tree-shaped conical structure array with different inclined angles in lab tests.
Figure 10C:
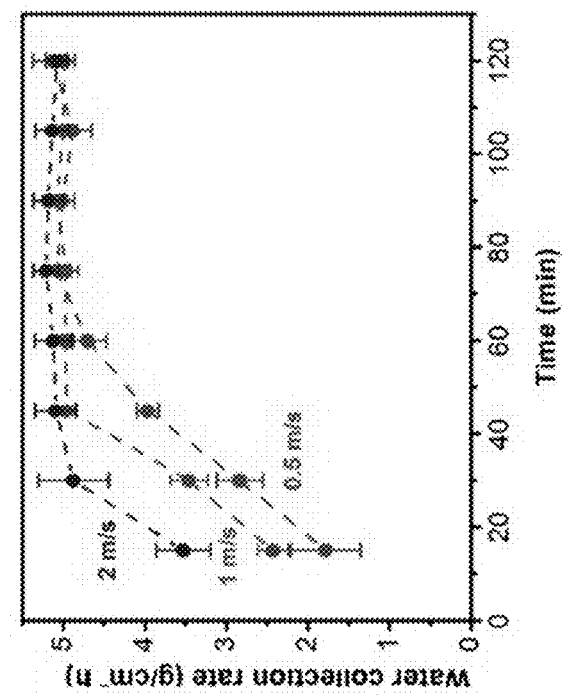
FIG. 10C: Fog collection rates of PVA/PPy gel tree-shaped conical structure array under different fog flow speeds.
Figure 11:
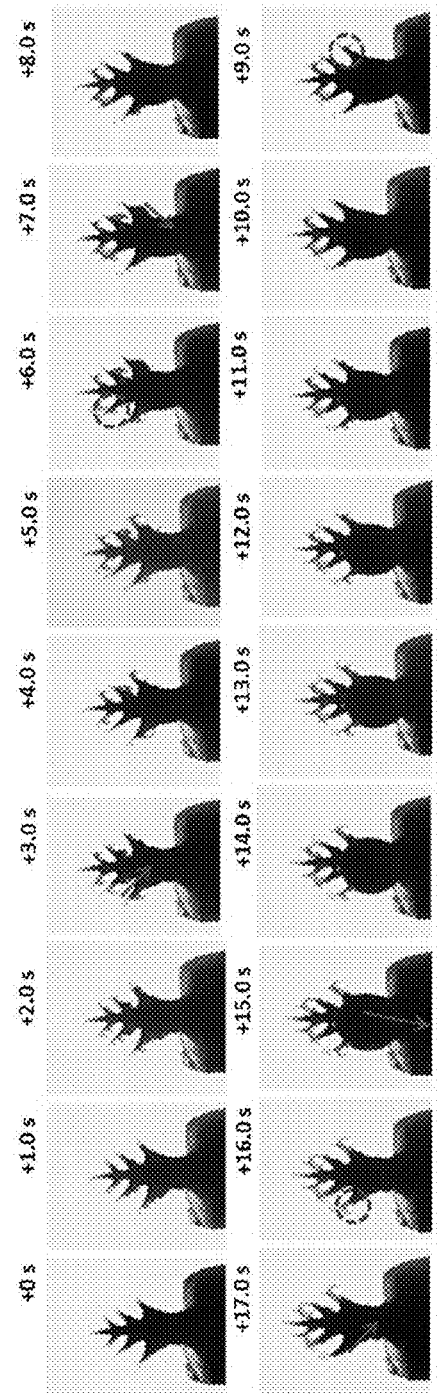
FIG. 11: Photos showing fog collection behavior of one PVA/PPy gel tree-shaped conical structure.

Example 2—Fog Harvesting Properties of PVA/PPy Gel Membrane with Micro-Tree Array Fog collection experiments were conducted to quantify the water collection rate of microstructured PVA/PPy hydrogel membranes (FIGS. 10A-10C). Under a continuous fog flow generated by an ultrasonic humidifier, the micro-trees capture micro-sized water droplets that quickly grow and coalesce with one another as they move towards the cone base while new droplets continuously condense onto the cones. As this process continues, droplets from different branches merge together into a millimeter-size droplet, which is ultimately collected into the beaker with the guide of the support layer (FIGS. 3A and 11). This cycle of fog droplet nucleation followed by transport, growth, and eventual drainage of the large water drops repeats with an average period of ~20 s, which corresponds to a saturated fog collection rate ($m/A_p$) of ~5.0 g $cm^{-2}$ $h^{-1}$ calculated using the projected membrane area (FIG. 3B). In some embodiments, the fully hydrated hydrogel membranes may collect water droplets in an environment with a relative humidity above 90%.

Figure 3C:
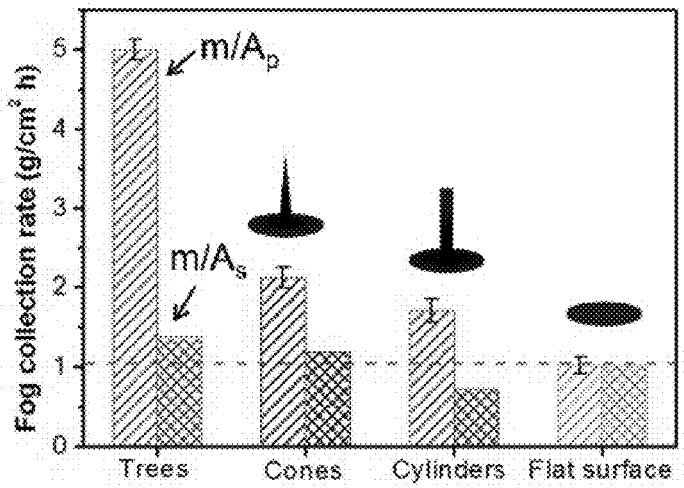
Figure 3D:
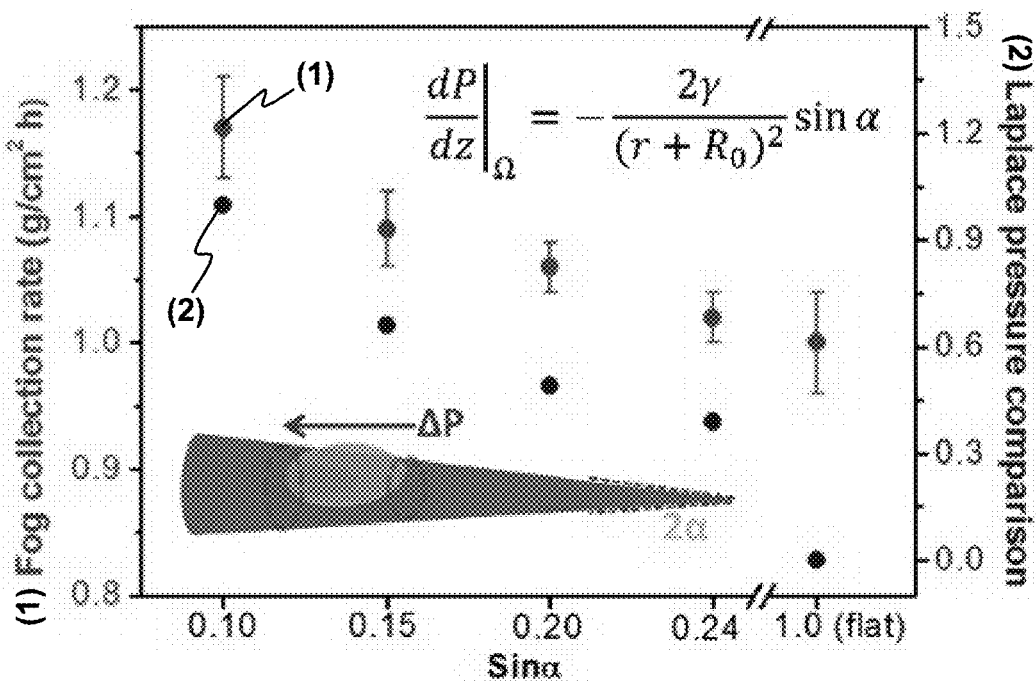
Figure 12A:
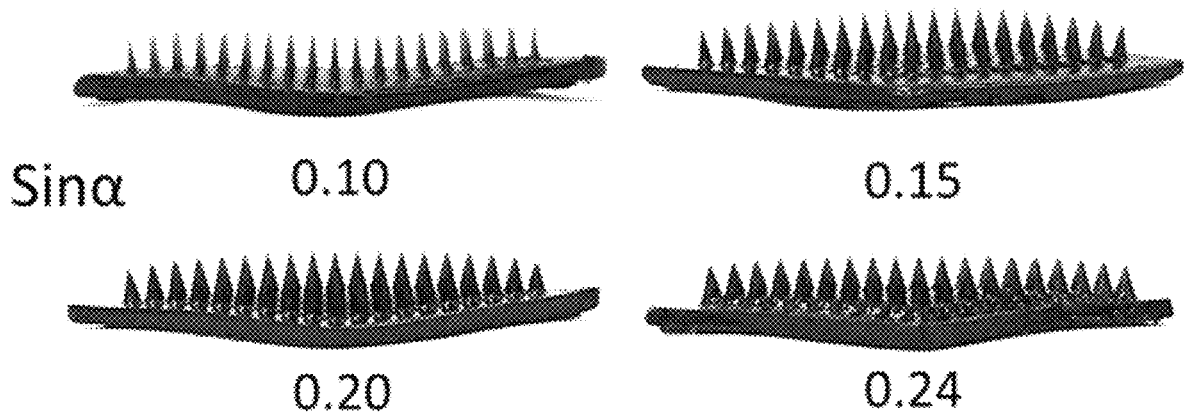
FIG. 12A: Photos of PVA/PPy gel conical structure arrays with different apex angle.
Figure 12B:
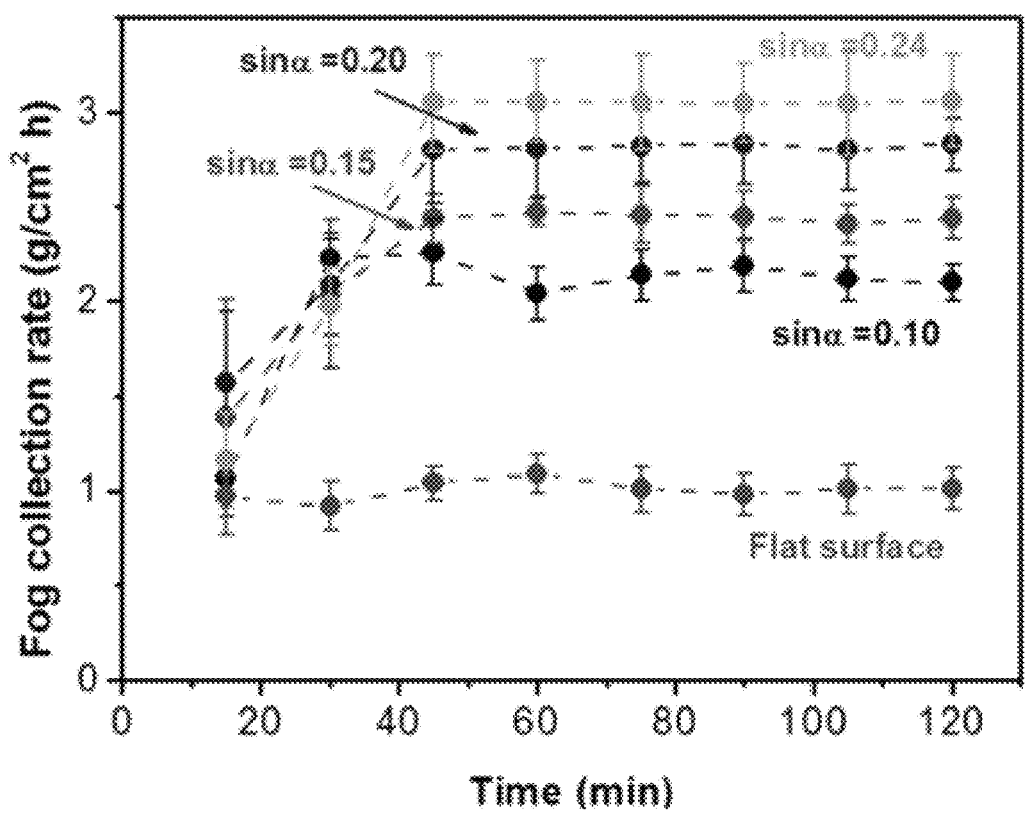
FIG. 12B: Fog collection rates of PVA/PPy gel conical structure arrays with different apex angles in fog harvesting tests. After normalizing the fog collection rates by total surface area, the fog collection ability of different cone arrays improves as the apex angle decreases, indicating faster directional movement of droplets on conical structures with smaller apex angle. These results indicate that while the surface area is maintained, the fog collection ability of conical gel structures can be improved by decreasing their apex angle.

The effect of conical geometries on water droplet transport and fog collection rate was quantified by fabricating and testing similar PVA/PPy gel membranes that contained equivalently-spaced, geometrically-identical surface micro-topologies of cones and cylinders, as well as flat surfaces. FIG. 3C summarizes these findings and reveals that the micro-tree array exhibits a 34% higher fog collection rate than that of a flat surface, the cone array is 17% more efficient, and the cylinder array is 29% lower, after being normalized by total surface area. Since the directions of cones were not a key factor in the directional movement of the water drops[30], the effect of conical geometries was further studied by conducting systematic experiments on conical structure arrays with different apex angles (FIG. 3D), which demonstrated that lower apex angles resulted in faster water collection rates. FIGS. 3D and 12A show the effect of apex angle on the fog collection rate. The data in FIG. 3D has been normalized by total surface area, while the data in FIG. 12A has not been normalized. As shown in FIG. 3D, the surface area-normalized collection rate of the cone arrays increased by 14.7% when sin $\alpha$ decreased from 0.24 to 0.10 (FIGS. 12A-12B).

Figure 3E:
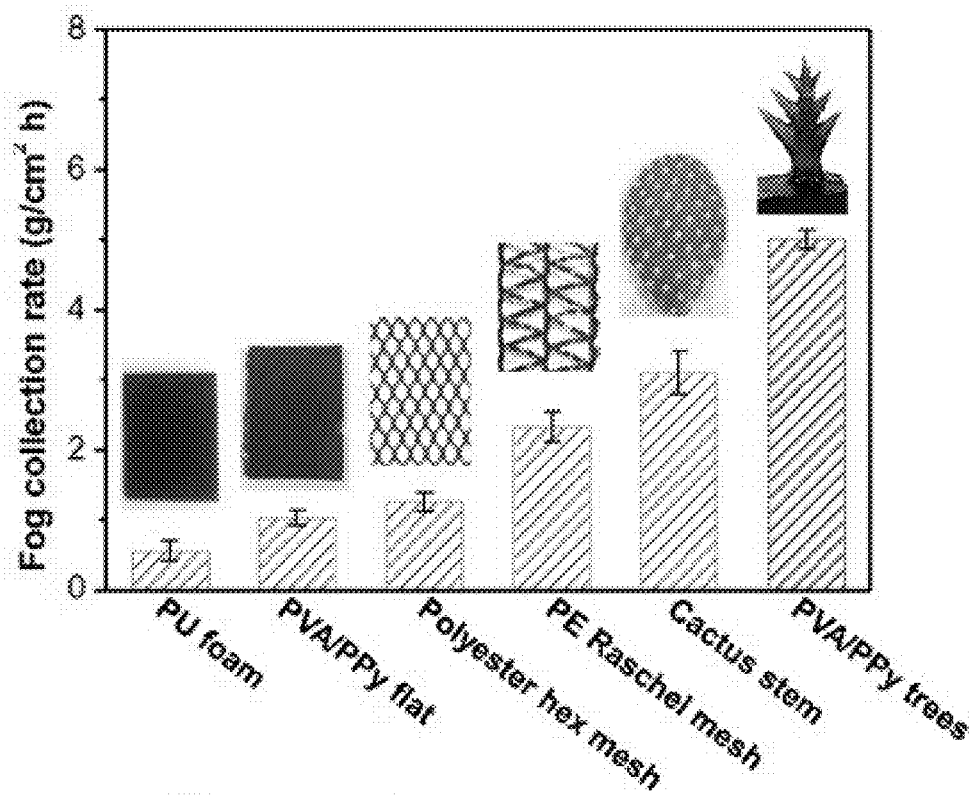
Figure 3F:
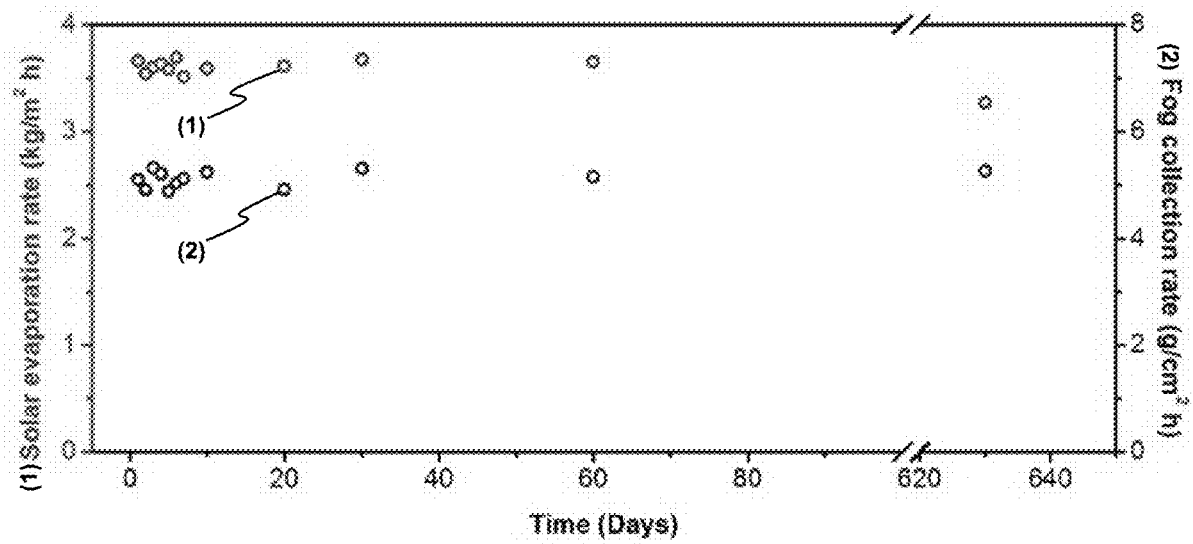
Figure 9B:
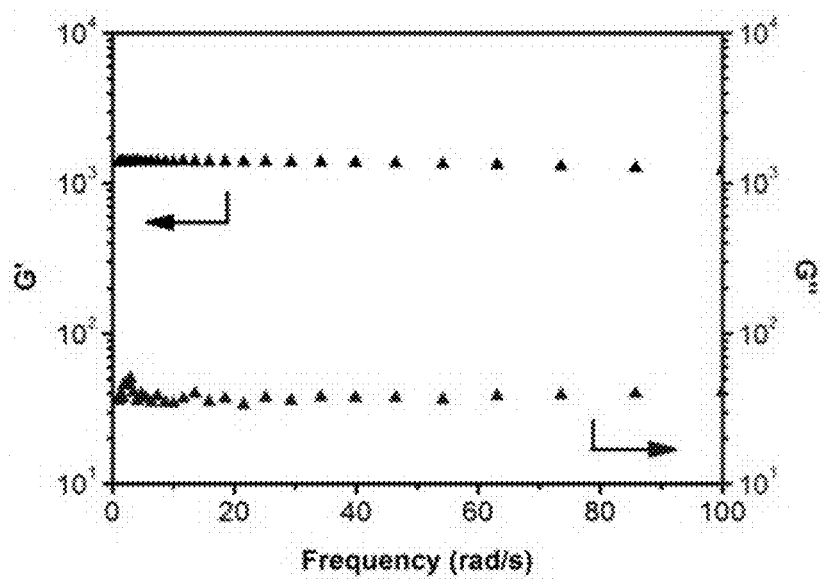
FIG. 9B: The storage modulus (G') and loss modulus (G") of PVA/PPy gels after ~20 month's storage. The crosslinked network structure was well maintained after long-term storage.
Figure 9C:
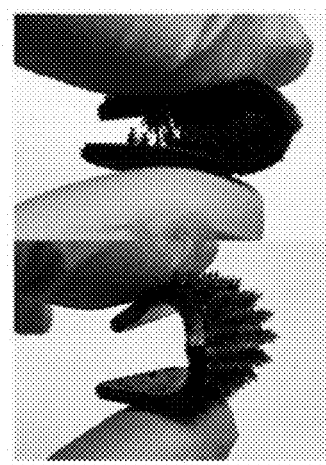
FIG. 9C: Pictures of PVA/PPy gel micro-tree membrane being bent.
Figure 13A:
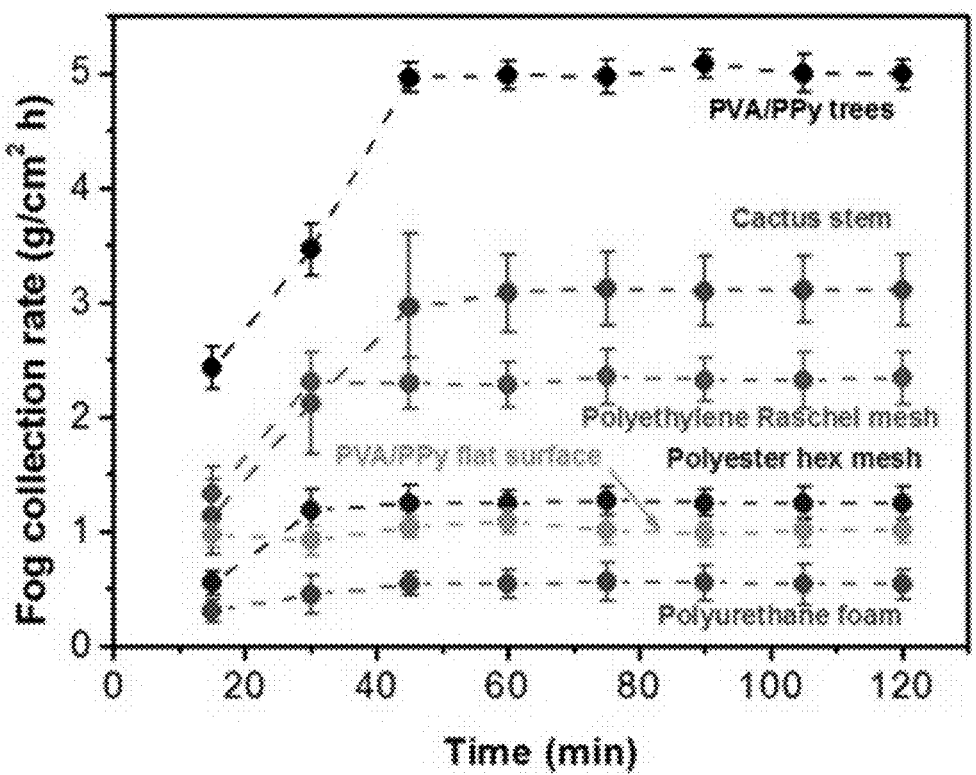
FIG. 13A: Fog collection rates of different materials under equivalent testing conditions. All the tested materials are cut into same diamond shape as PVA/PPy gel membrane and tested under same experimental conditions. The fog collection rates are calculated based on the projected area of these membranes. For porous Raschel mesh (double layered, 35% shading) and hex mesh (double layered, 50% shading), the fog collection rates are calculated based on their effective area (area of pores is excluded).
Figure 13B:
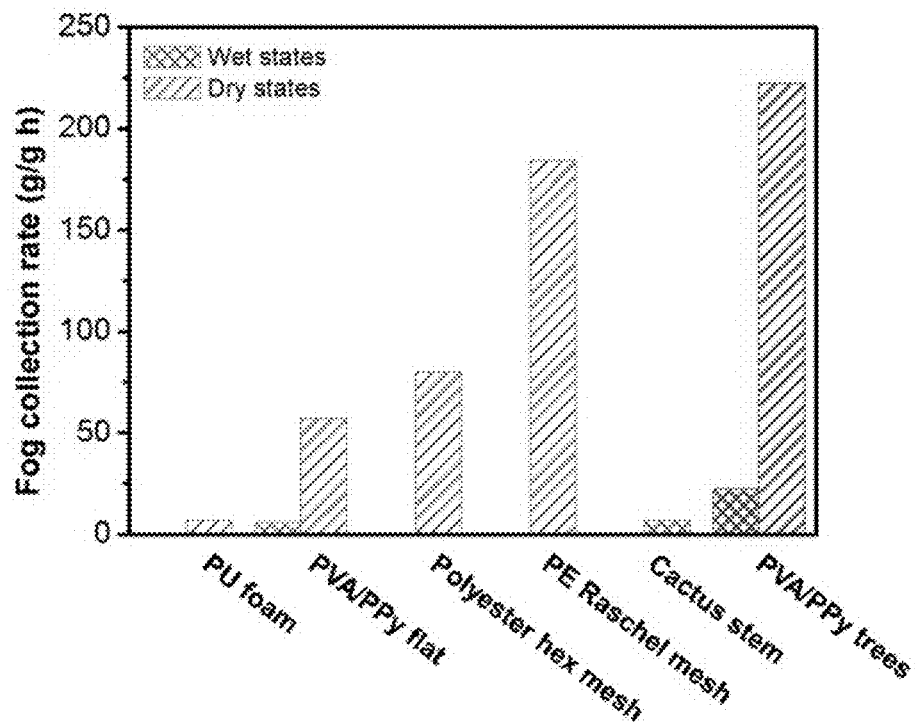
FIG. 13B: Fog collection rates of different materials calculated based on their mass in wet and dry states.
Figure 14A:
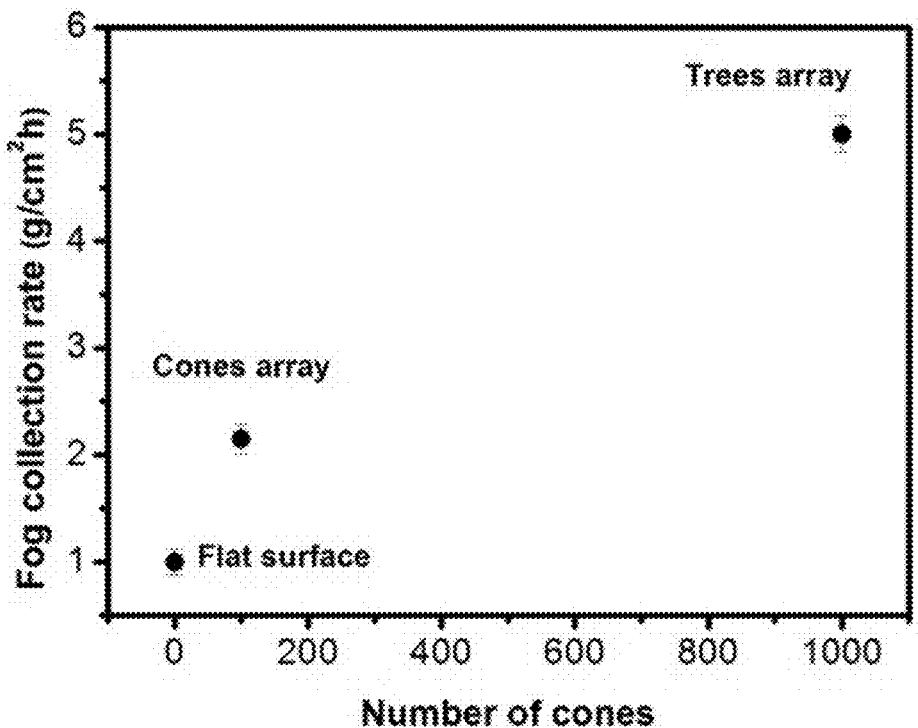
FIG. 14A: Fog collection rates of microstructured PVA/PPy gel membranes along with their number of cones. The droplets formed on conical structure tips sit for much longer time than droplets at other locations. The contribution from each cone is different in three different structures.
Figure 14B:
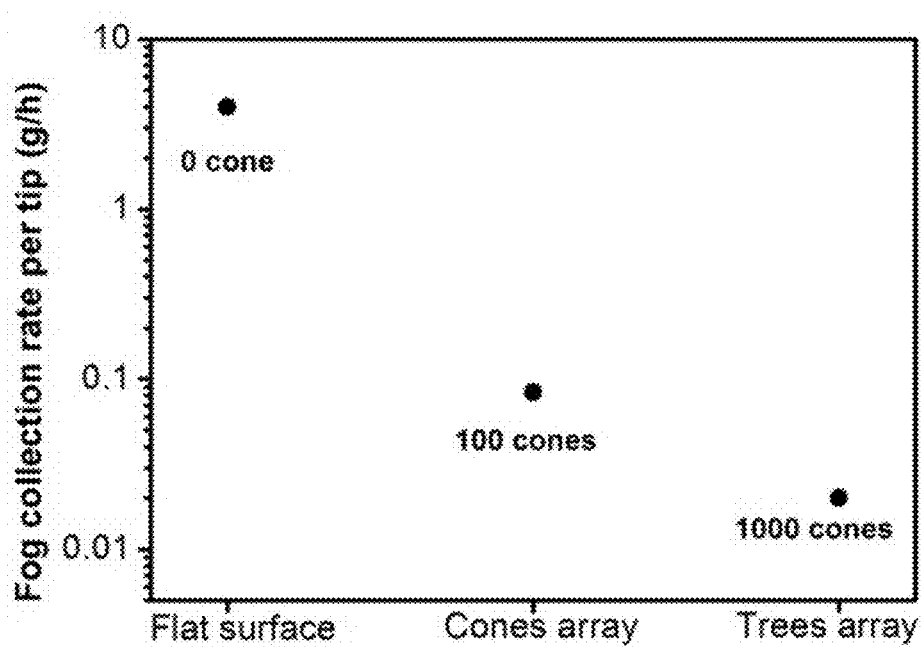
FIG. 14B: Fog collection rates normalized by number of cones for different microstructured PVA/PPy gel membranes, which indicate that the number of cones may not be a determining factor for fog collection rate.
Figure 15A:
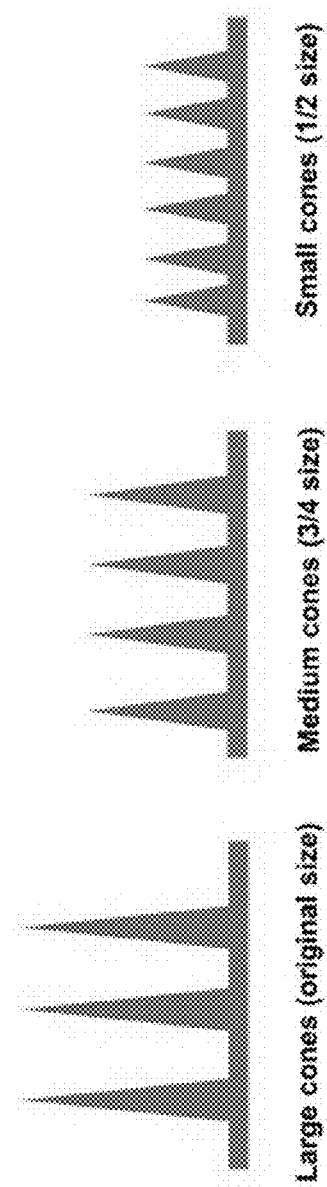
FIG. 15A: Schematic illustration of cone arrays with changed size (side view). The dimension (both height and bottom diameter) and inter-distance of cones are ¾ (medium cones) and ½ (small cones) of original ones.
Figure 15C:
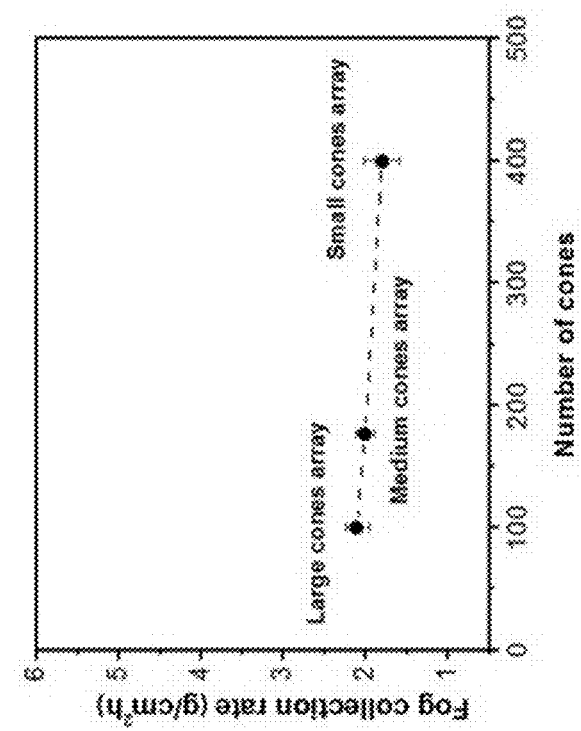
FIG. 15C: Fog collection rates of cone arrays with different size and their number of cones. All these evidence indicate that the droplets deposited on the cone tips contribute little to the fog collection ability of cone-based structures.
Figure 15B:
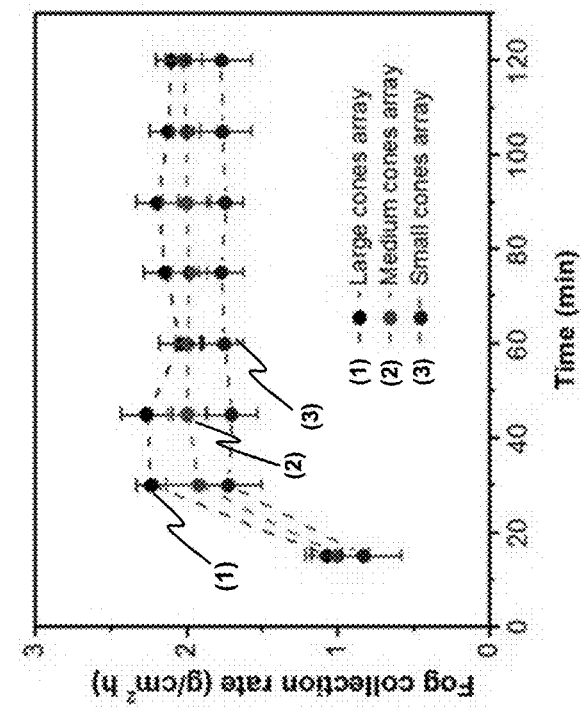
FIG. 15B: Fog collection rates of cone arrays with different sizes during tests.
Figure 16A:
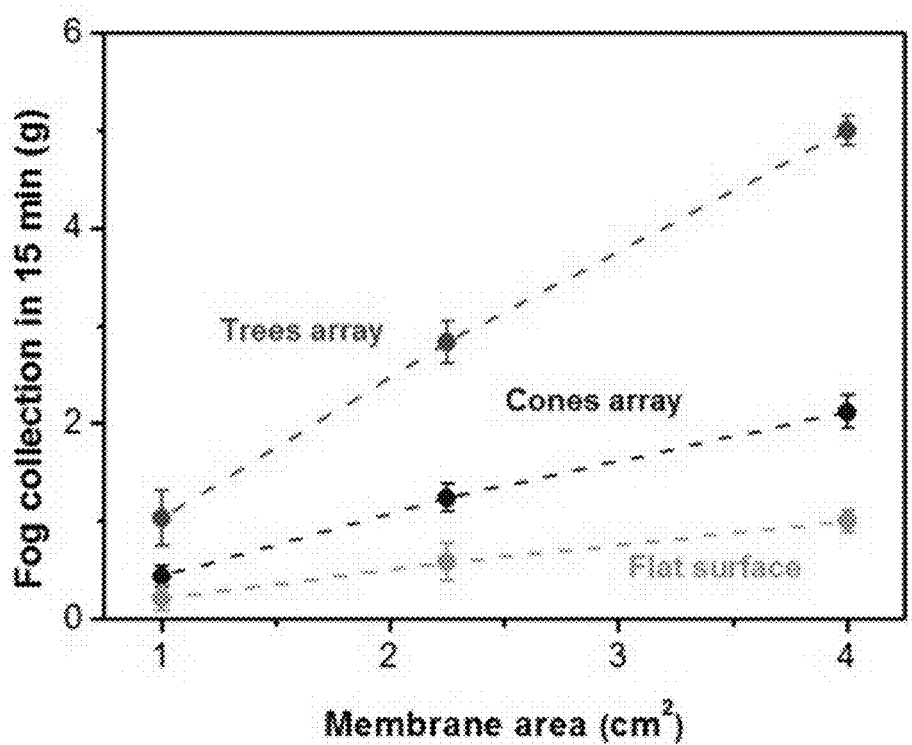
FIG. 16A: Fog collection rates of microstructured PVA/PPy gel membranes with different projected membrane areas. Their fog collection rate during steady states has a proportional relationship to the membrane area, as far as the entire membrane is covered by full fog flow.
Figure 16B:
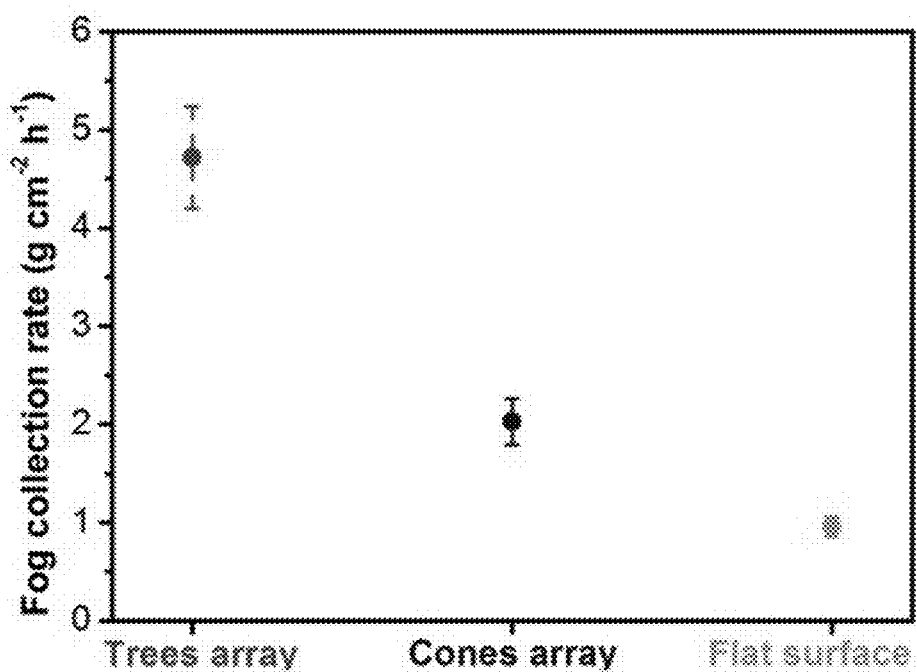
FIG. 16B: Areal fog collection rate remained constant for each structure. The results demonstrate that fog collection rates of different gel structures can be normalized by their total surface area and thus the effects of other factors can be examined separately.

FIG. 3E compares fog collection rates for several representative polymer meshes, as well as a cactus spine and reveals that the areal efficiency of the PVA/PPy hydrogel tree-shaped conical structure arrays is 115% higher than that of double layered Raschel mesh and 61% higher than that of a cactus stem. The PVA/PPy gel micro-tree arrays also show the highest fog collection rates among all different materials based on the mass of polymeric materials (FIGS. 13A-13B). The long-term stability and durability of the tree-shaped conical structure membranes were evaluated by testing their structural integrity (FIGS. 9B-9C) and bi-functional water harvesting properties for a twenty-month period in the lab. FIG. 3F shows that the average fog collection rate, as well as solar vapor generation rate of PVA/PPy gel tree-shaped conical structure array was well maintained after more than twenty-months of storage.

Figure 17A:
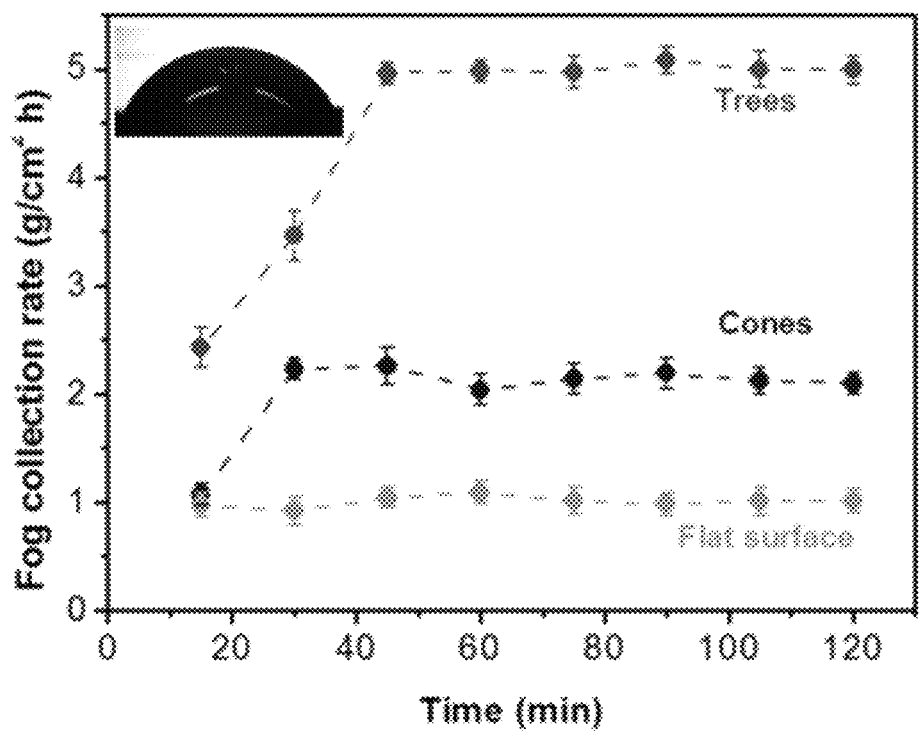
FIGS. 17A-17B: Fog collection rates of (FIG. 17A) PVA/PPy gel membranes and (FIG. 17B) cured PR48 membranes with different microstructures. The insets show the contact angle tests of two materials. The hydrophobicity of surface can affect fog collection behavior[7,8]. Structured PR48 membranes show much worse fog collection performance than PVA/PPy gel membranes with same microstructures, demonstrating that hydrophilic hydrogels can benefit fog collection through facilitating fog droplets deposition.
Figure 17B:
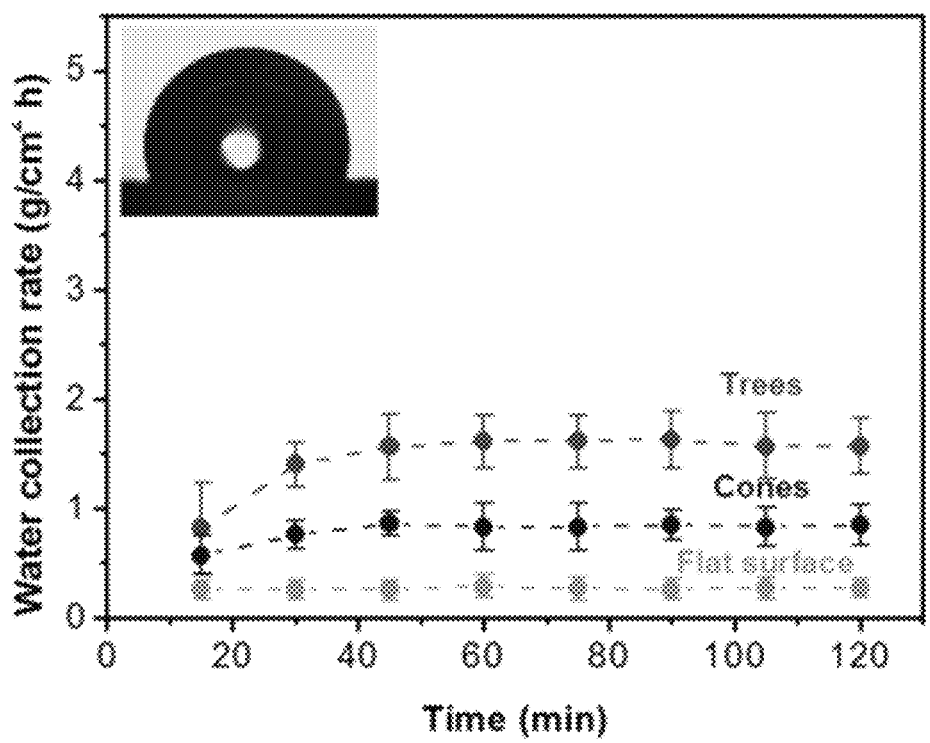
Figure 18A:
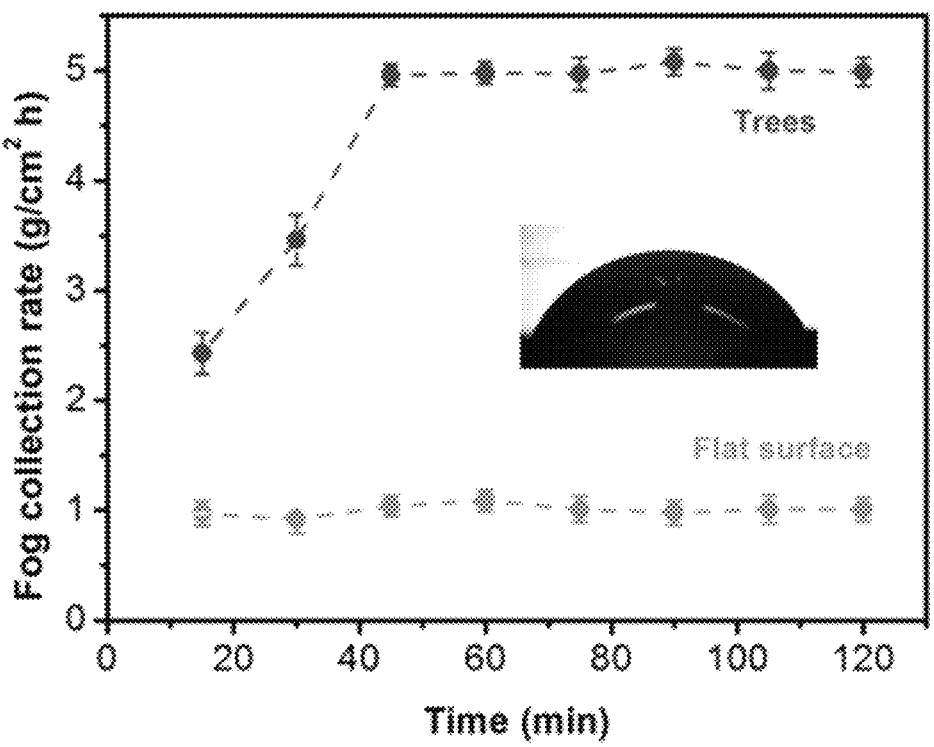
FIGS. 18A-18B: Fog collection rates of (FIG. 18A) PVA/PPy gel membranes and (FIG. 18B) pure PVA hydrogel membranes with different microstructures. The insets show the contact angle tests of two materials. The addition of PPy doesn't affect the fog collection behavior of micro-structured hydrogels. The reason could be that the PPy particles are firstly synthesized and then added to PVA solution for gelation. They are embedded in the PVA matrix, rather than on the gel surface.
Figure 18B:
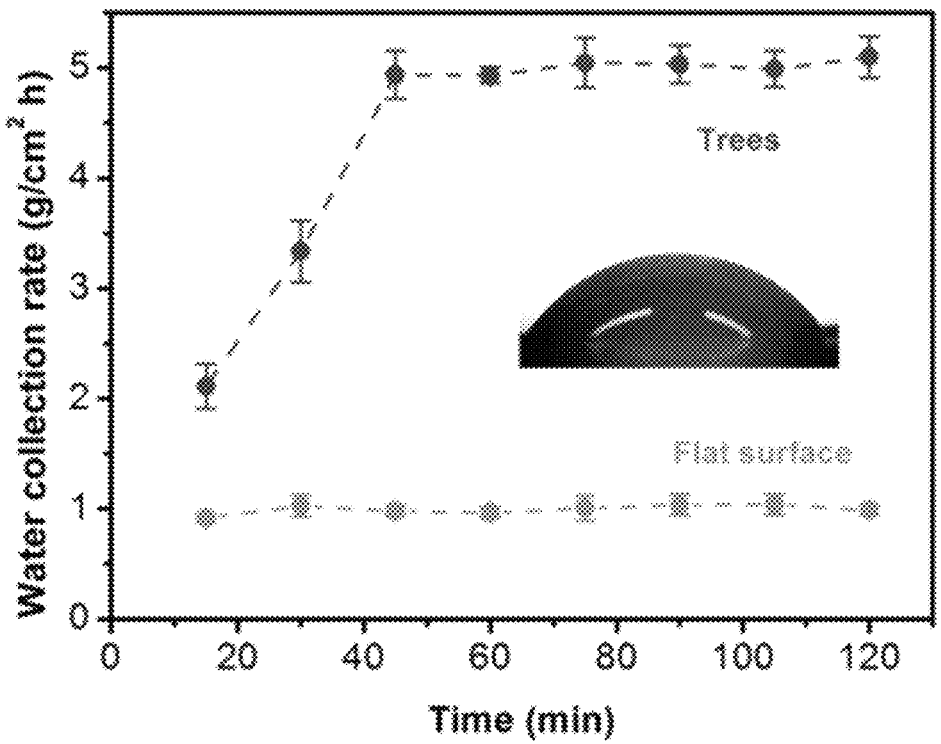

Fog deposition and droplet transport are key processes that determine the fog collection performance[37,41]. Nucleation of water vapor and small water droplets is energetically more favorable on hydrophilic surfaces than hydrophobic ones[30,42,43]. An ideal fog collection structure should provide enhanced surface area with hydrophilic nature to maximize droplet nucleation density[38]. In one embodiment, the tree-shaped conical structure array is such that its footprint area of 1 cm² corresponds to a total surface area of ~3.5 cm² and increases the density of active sites for fog capture and droplet nucleation by increasing surface area (FIGS. 14A-B, 15A-15C and 16A-16B). A contact angle of 65° revealed the surface of PVA/PPy gel to be hydrophilic. As a comparison, membranes with the same geometric features printed out of PR48 (a commercial photo-resin) were hydrophobic, with a contact angle of 128°, and had a >65% lower fog collection rate (FIGS. 17A-17B). Membranes of pure PVA showed similar contact angle to PVA/PPy gel and exhibited similar fog collection behaviors (FIGS. 18A-18B).

Figure 19:
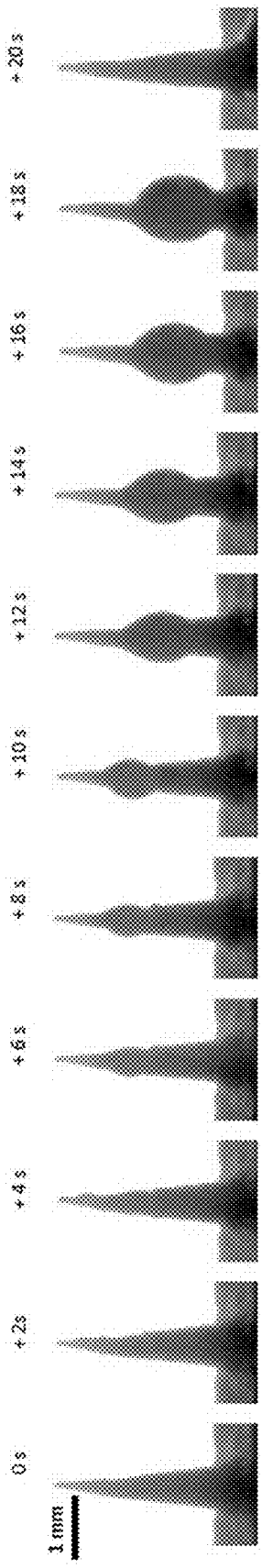
FIG. 19: Photos showing fog collection behavior of PVA/PPy gel micro-cone. After the fog flow is applied, tiny droplets deposit on the gel surface. From the 4th second, one major droplet forms due to coalescence of small droplets and it moves towards the base of cone. The droplet keeps growing by absorbing fog droplets in air and new deposited droplets on gel surface during its directional movement. After around 20 s, the droplet drains from the gel cone and the whole surface is refreshed.
Figure 20:
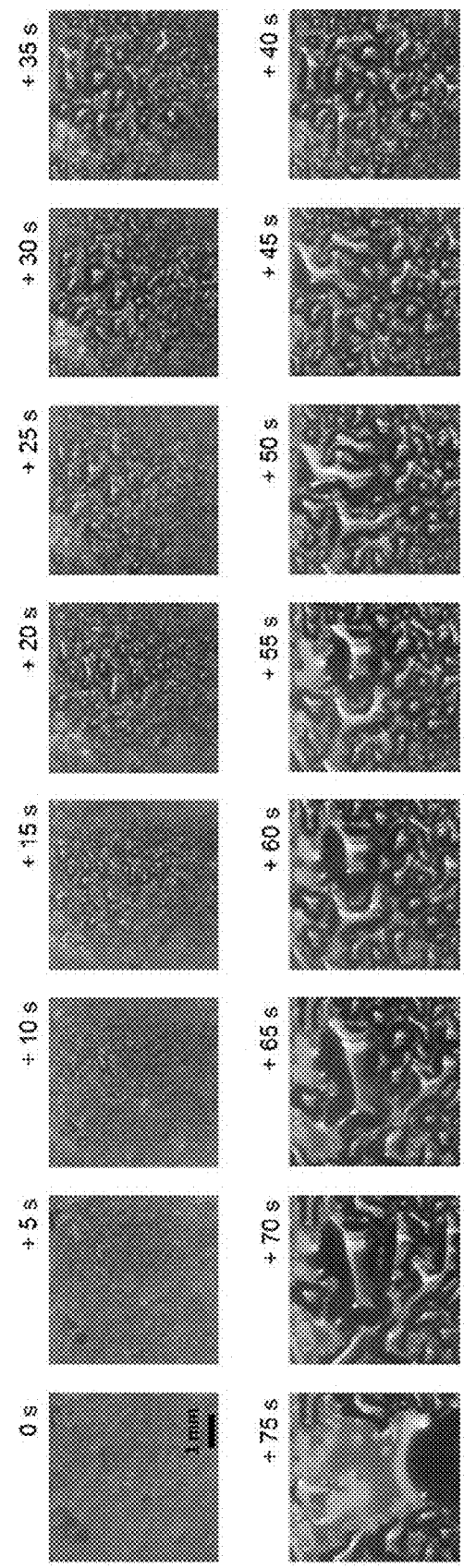
FIG. 20: Photos showing fog collection behavior of PVA/PPy gel flat surface. Tiny water droplets randomly deposit on the smooth gel surface after fog flow is applied. With continued deposition, the water drops increase their size through directly capturing drops in fog or coalescing with other drops nearby but without obvious transfer of mass center in either case. After 75 s, a large and heavy enough water droplet forms and drains off from the gel surface. The absence of quick regeneration of the fresh deposition sites in the overall process counts against the fog collection.

The conical structure of the PVA/PPy gel micro-trees enables efficient directional transport of deposited droplets, thus re-exposing the gel surface to incident vapor and accelerating the collection cycle. Fog collection behaviors of gel membranes with different surface topologies were compared. Directional droplet movement was observed on gel cones (FIG. 19) and the movement was faster as the apex angle decreased. On a tilted flat surface, initial water droplets randomly deposited and then increased their size through capturing drops in fog or coalescing with adjacent droplets but without obvious transfer of mass center (FIG. 20). On gel cylinders, the droplet grew slowly while sticking on the cylinder until it fell (FIG. 21). Both of these geometries do not lend themselves to quick regeneration of available droplet attachment which reduces the collection rate. Assembled by cones with smallest apex angle (sin α=0.10), the gel micro-trees array achieves most efficient fog collection.

Figure 23B:
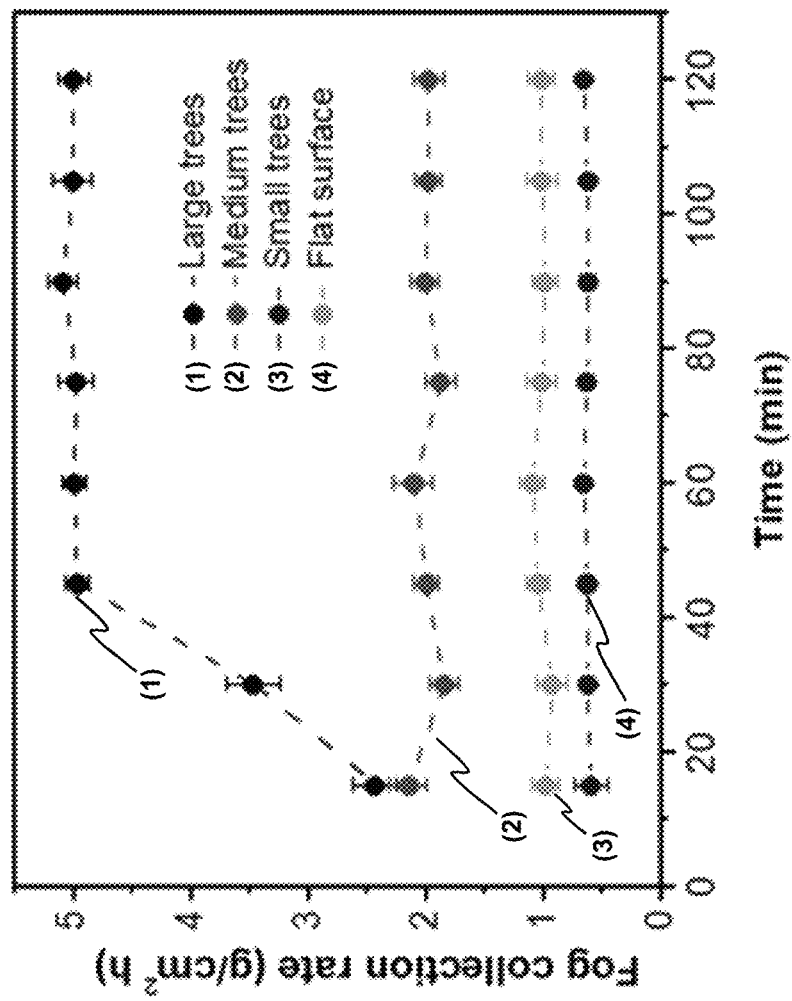
FIG. 23B: Fog collection rates of tree-shaped conical structure arrays with different sizes in fog harvesting tests. The fog collection rate of tree-shaped conical structure arrays decreased significantly as the size of the structures in the array are reduced. The small trees array shows even worse fog collection ability than gel membrane with flat surface. This is caused by inefficient drainage of collected water to beaker. Due to reduced inter-space, the water droplets are trapped among the tree-shaped conical structures and can't be drained to beaker efficiently.
Figure 23A:
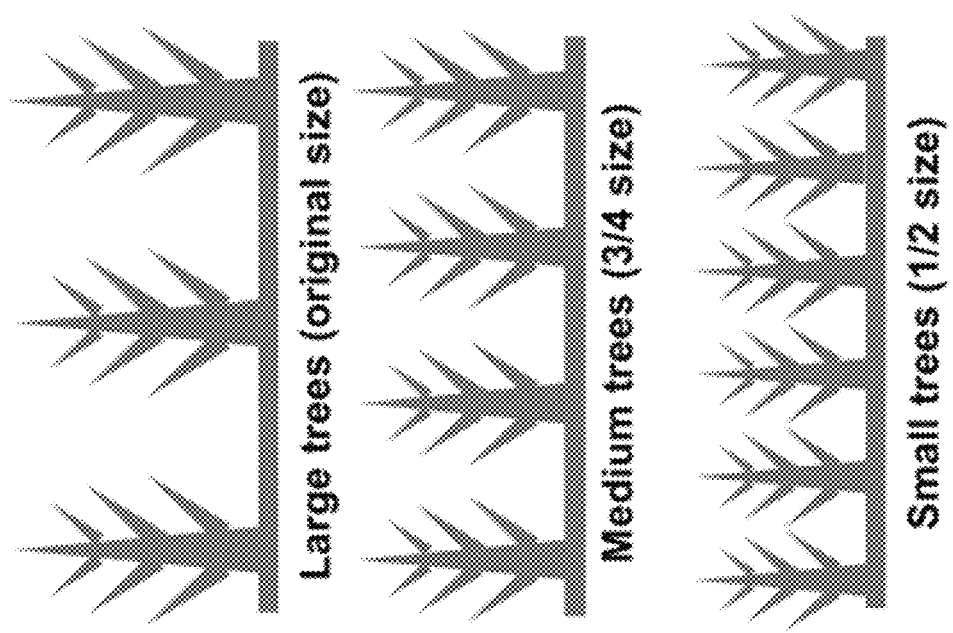
FIG. 23A: Schematic illustration of tree-shaped conical structure arrays with different sizes (side view). The dimension (both height and bottom diameter) and inter-distance of tree-shaped conical structures are ¾ (medium trees) and ½ (small trees) of original ones.

In addition, the hierarchical array provides a drag force resisting fog flow by lowering their speed in the region between the trees, thus increasing the possibility of droplets deposition on gel surface (FIG. 22)[36]. This is also indicated by the varied time for different gel structures to reach their saturated collection rates, as shown in FIG. 3B. The flat membrane reached its maximum collection rate in the first 15 min because its whole surface was contacting with droplets right after it was exposed to fog flow while the gel micro-tree array showed much longer ramp time due to reduced flow speed and increased surface area. This dragging effect also affects the drainage of collected water and thus the size of the gel-tree array is tuned to facilitate the drainage (FIGS. 23A-23B).

Figure 4A:
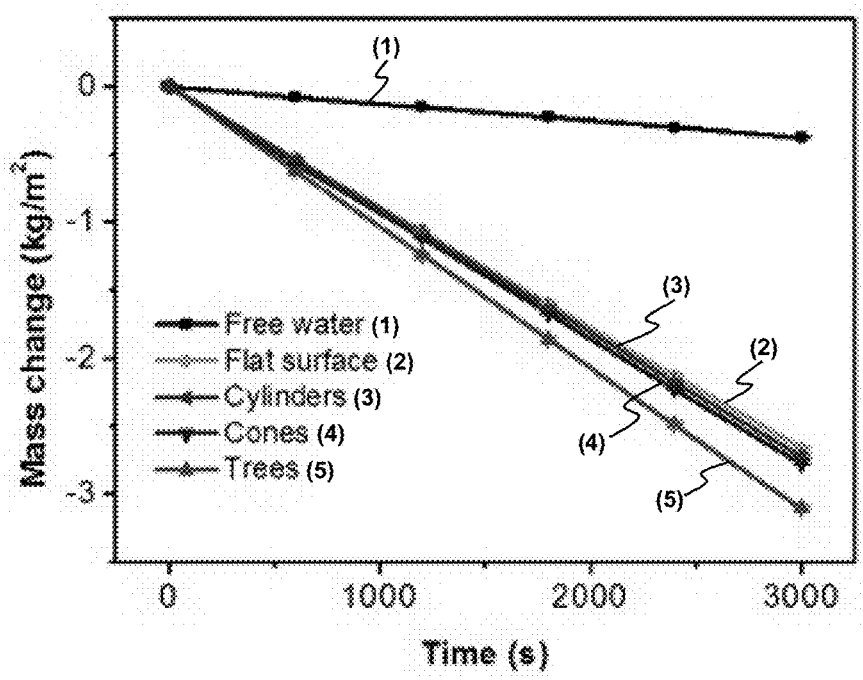
FIGS. 4A-4E: Solar steam generation properties of PVA/PPy hydrogel membranes having tree-shaped conical structures.
Figure 24A:
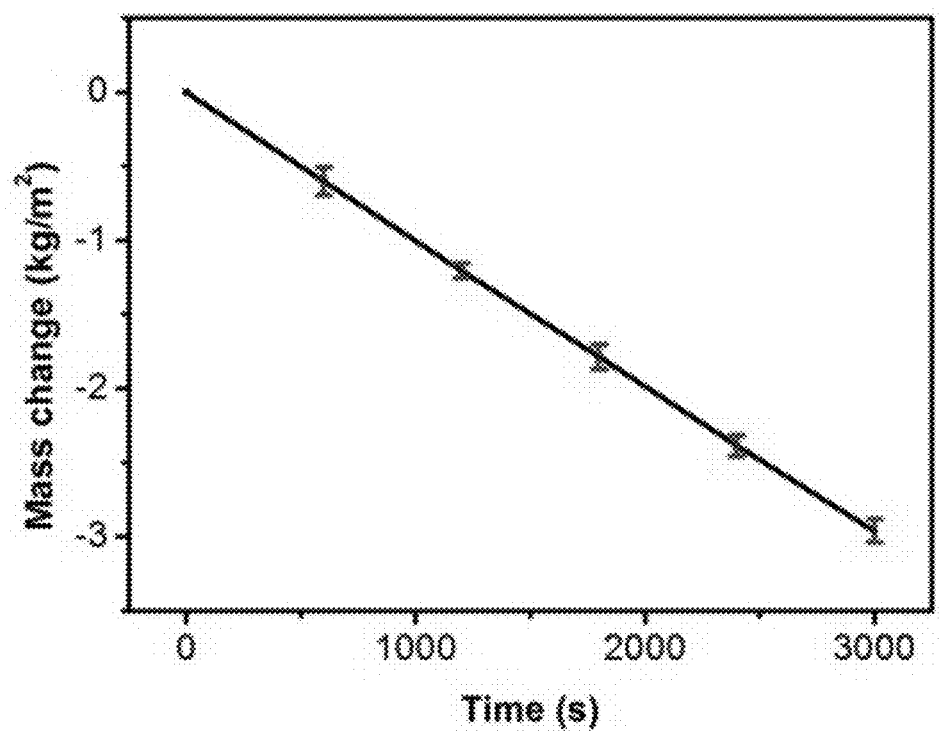
FIGS. 24A-24B: Solar steam generation properties of tree-shaped conical structure arrays with (FIG. 24A) 3 cm×3 cm and (FIG. 24B) 5 cm×5 cm sizes.
Figure 24B:
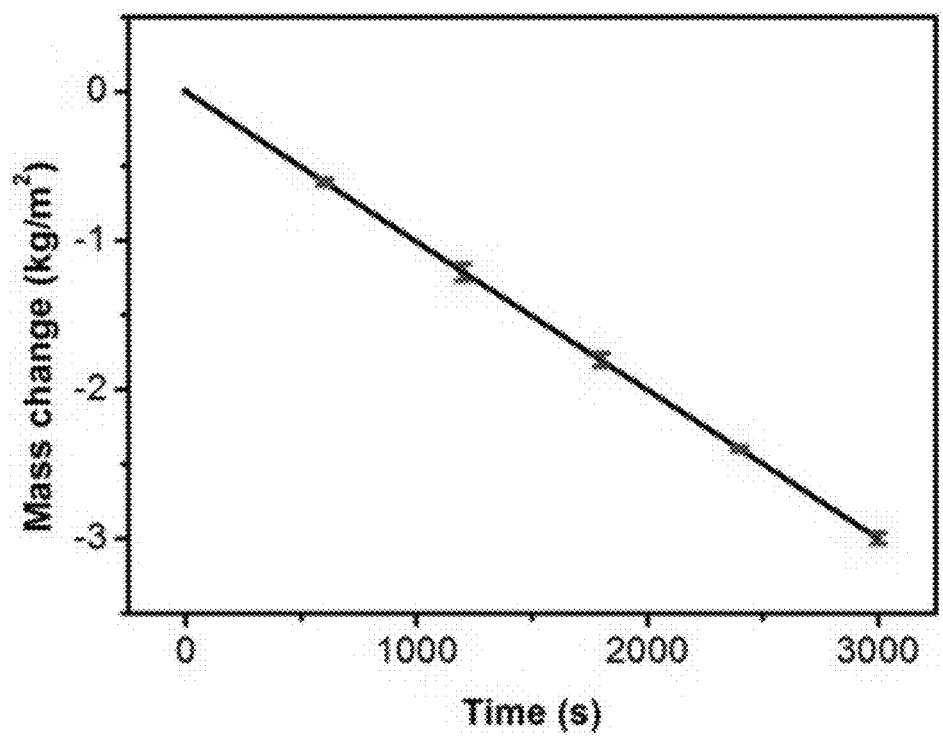
Figure 25A:
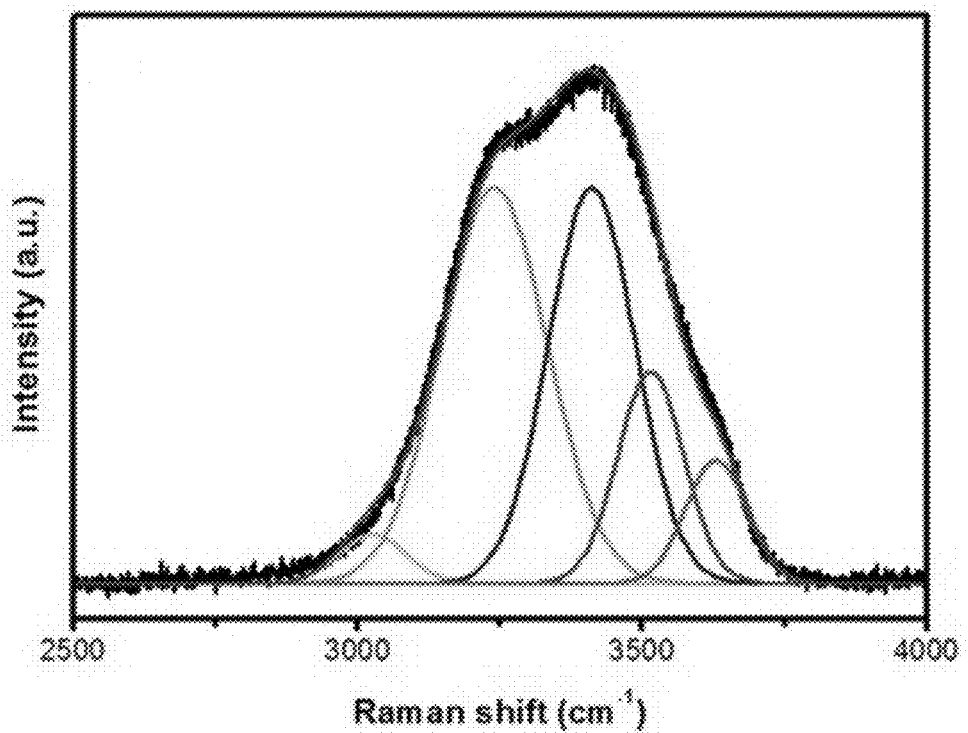
FIGS. 25A-25B: Raman spectra and fitted peaks of (FIG. 25A) free water and (FIG. 25B) PVA/PPy hydrogel[9]. The peak around 3050 cm$^{-1}$ (light blue) arises from the Fermi resonance between the overtone of the bending mode. The three peaks observed at 2735, 2875, and 2920 cm$^{-1}$ (grey) in hydrogel spectra can be assigned to the C—H stretching mode of CH, the symmetric, and asymmetric stretching modes of CH2 on PVA chains, respectively. Four peaks at 3250, 3395, 3505, and 3610 cm$^{-1}$ are observed in both spectra, which are related to water molecules. These peaks are classified as two types of modes: (1) Water molecules forming full hydrogen bonds with adjacent water molecules (the peaks at 3250 and 3395 cm$^{-1}$); (2) weakly or non-hydrogen-bonded water molecules in which the hydrogen bonds of the water molecules have been broken, in part or entirely (the peaks at 3505 and 3610 cm$^{-1}$). Within the band corresponding to the four hydrogen-bonded molecules, the peak at 3250 cm$^{-1}$ is associated with the collective in-phase vibrations of all molecules in the aggregate, whereas the 3395 cm$^{-1}$ peak is associated with vibration, which is not in-phase between the first and higher shell of neighboring molecules. The peaks at 3505 and 3610 cm$^{-1}$ correspond to the symmetric and asymmetric stretching of the weakly hydrogen bonded water molecules, respectively. The molar ratio of weakly bonded water was calculated: fully bonded water in free water and PVA/PPy hydrogel, which are 0.25:1 and 0.74:1, respectively. The weakly bonded water in free water can be attributed to the surface tension induced hydrogen bonds weakening. These results indicate that much water contained in PVA/PPy hydrogel is weakly bonded due to interactions with PVA chains, which reduces the water vaporization enthalpy and facilitates the water evaporation.
Figure 25B:
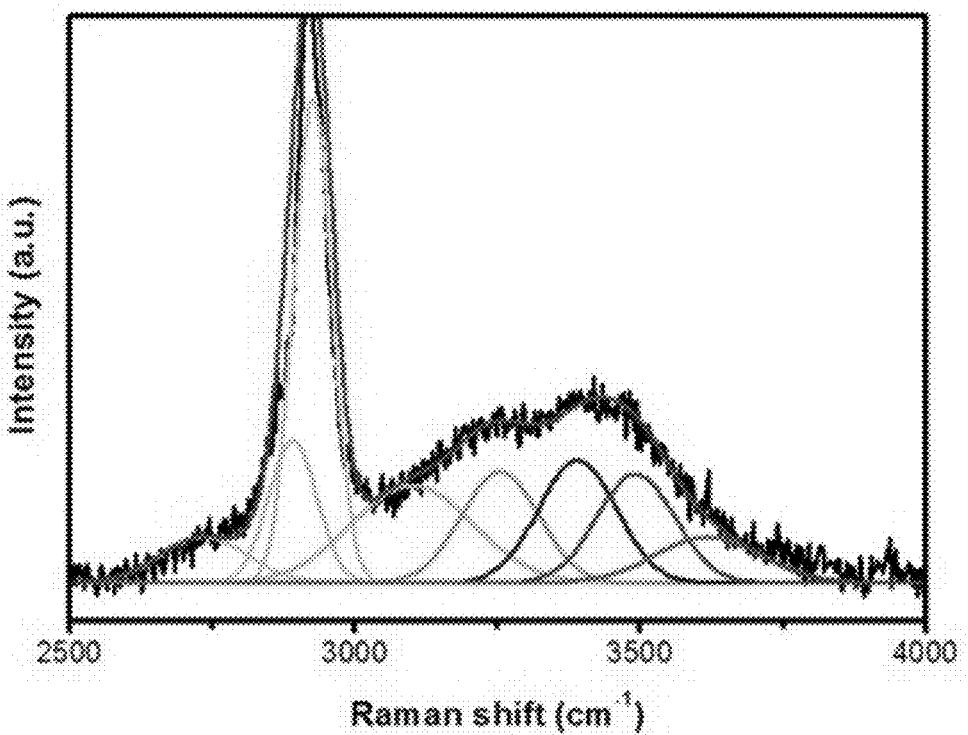

Example 3—Solar Steam Generation by PVA/PPy Gel Membrane with Tree-Shaped Conical Structure Array PVA/PPy gel has been reported to be a highly efficient interfacial solar steam generator because it efficiently transports water through porous gel matrix and reduces water evaporation enthalpy[16]. The solar steam generation properties of PVA/PPy gel membranes were measured with different surface microstructures under 1 sun illumination (1 kW m$^{-2}$) by recording the overall mass change over 1 h, which represents the amount of evaporated water. The membrane was floated on water and placed under the light beam. The mass of the water loss was measured every 10 min after the temperature of gel membranes achieved steady status. The PVA/PPy gel membrane with tree-shaped conical structure array showed the best evaporation rate calculated per projected (illuminated) area, $A_p$, of 3.64 kg m$^{-2}$ h$^{-1}$, which is 7.1 times higher than that of free water and 14.1% higher than that of gel flat membrane (FIG. 4A). Additional hybrid gel micro-trees arrays were fabricated with large areas (FIGS. 24A-24B) or with 4 mm thick supporting layer. It was found that the water evaporation rate remained similar.

Figure 4B:
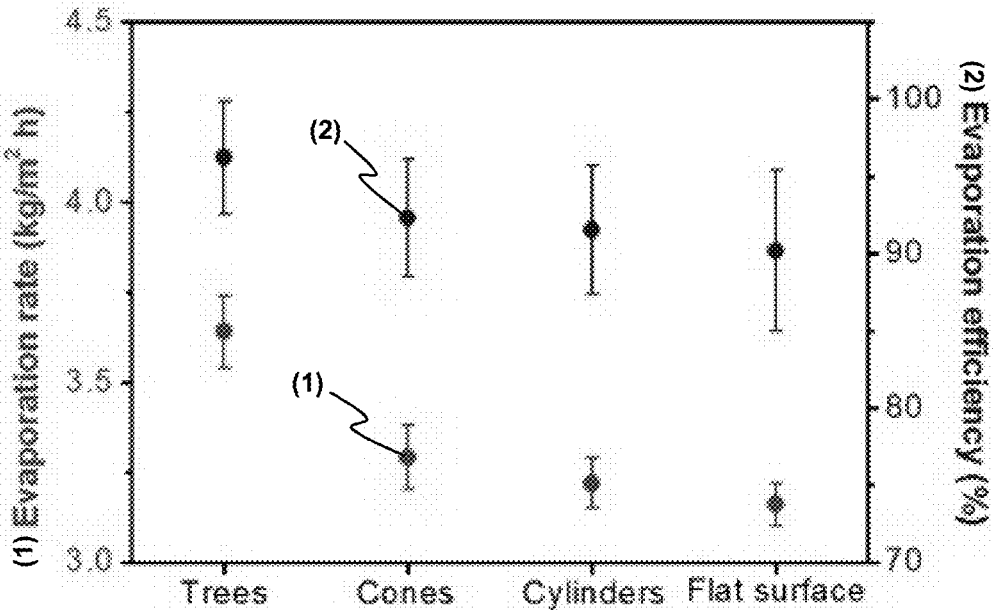

Energy efficiencies of different gel membranes can be calculated using[16]:

$$\eta = \dot{m} h_V / C_{opt} P_0 \qquad \text{Eq. 2}$$

where $\dot{m}$ is the mass flux of evaporated water, $h_V$ is the vaporization enthalpy of the water, $P_0$ is the solar irradiation power (1 kW m$^{-2}$), and $C_{opt}$ is the optical concentration on absorber surface. Note that the water confined in hydrogel molecular mesh is evaporated to a state with a lower enthalpy change than conventional latent heat[16,18,44,45]. Raman spectra was used to confirm the existence of water molecules with different bonding states in PVA hydrogel and conducted controlled evaporation and differential scanning calorimetric (DSC) measurements to measure the evaporation enthalpy (FIGS. 25A-25B and 26A-26C). All gel membranes showed similar water evaporation enthalpy, which was demonstrated to be unaffected by micro-scale structures. The energy efficiencies of different gel structures are shown in FIG. 4B together with their evaporation rates, which conveys that PVA/PPy gel tree-shaped conical structure array has the highest energy efficiency out of all tested geometries, and reaches up to ~96%, a factor of 65% greater than that of a porous plasmonic absorber[46] and 10% higher than that of carbon foam[12]. The PVA/PPy gel micro-trees array also shows the ability to effectively purify brines with different salt concentrations (FIGS. 27A-27B) and it will not contaminate the collected fog water (Table 1).

TABLE 1

The calculated salinity of water during in lab fog collection test. A PVA/PPy gel sample was used to evaporate NaCl solution with salinity of 100 under one Sun irradiation for 6 h. Then a lab fog collection test was applied on this gel sample for 6 h. The artificial fog was generated by adding dilute NaCl solution into the humidifier. The salinity of collected water was measured and compared to that of water in the humidifier. This solar evaporation and fog collection cycle was repeated for 10 times using the same gel sample.

| Fog collection test # | Average salinity of collected water (‰) | Average salinity of water in humidifier (‰) |
| --- | --- | --- |
| 1 | 0.00126 | 0.00119 |
| 2 | 0.00148 | 0.00122 |
| 3 | 0.00137 | 0.00138 |
| 4 | 0.00119 | 0.00121 |
| 5 | 0.00122 | 0.00135 |
| 6 | 0.00130 | 0.00117 |
| 7 | 0.00134 | 0.00129 |
| 8 | 0.00125 | 0.00109 |
| 9 | 0.00113 | 0.00136 |
| 10 | 0.00117 | 0.00125 |

Figure 4C:
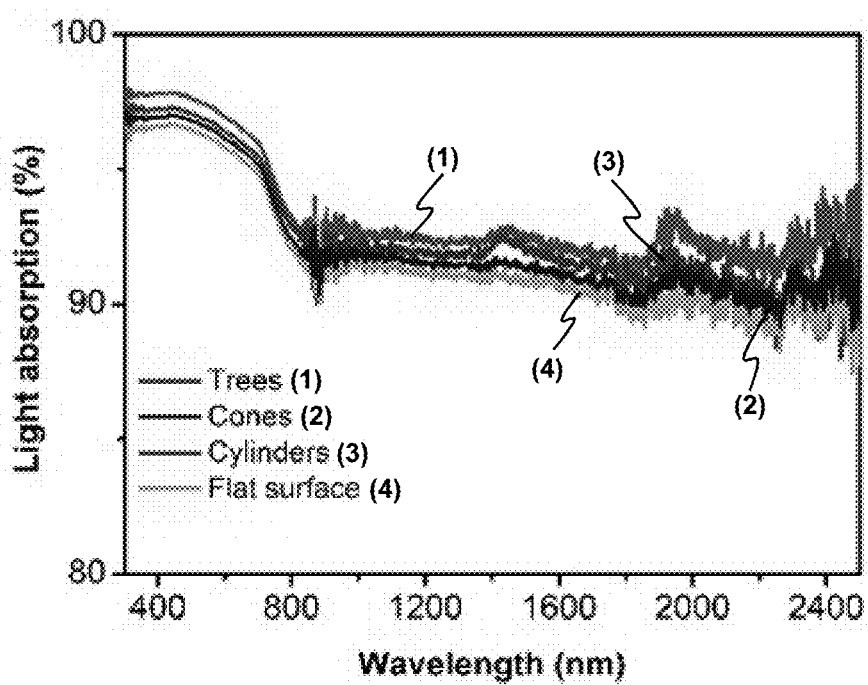
Figure 28A:
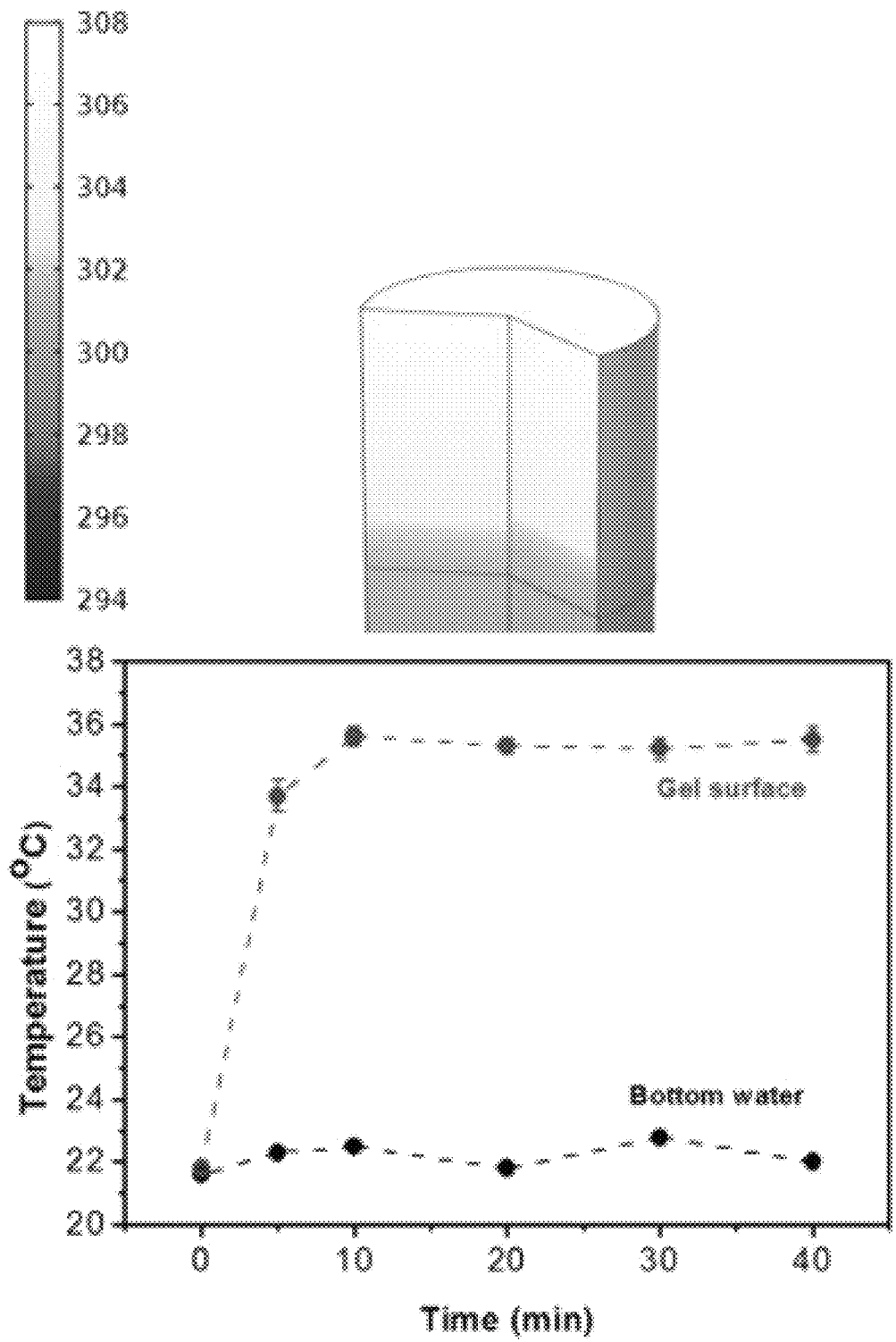
FIGS. 28A-28C: Simulation and experimental measurements of surface temperature distribution of hydrogel structures.
Figure 28B:
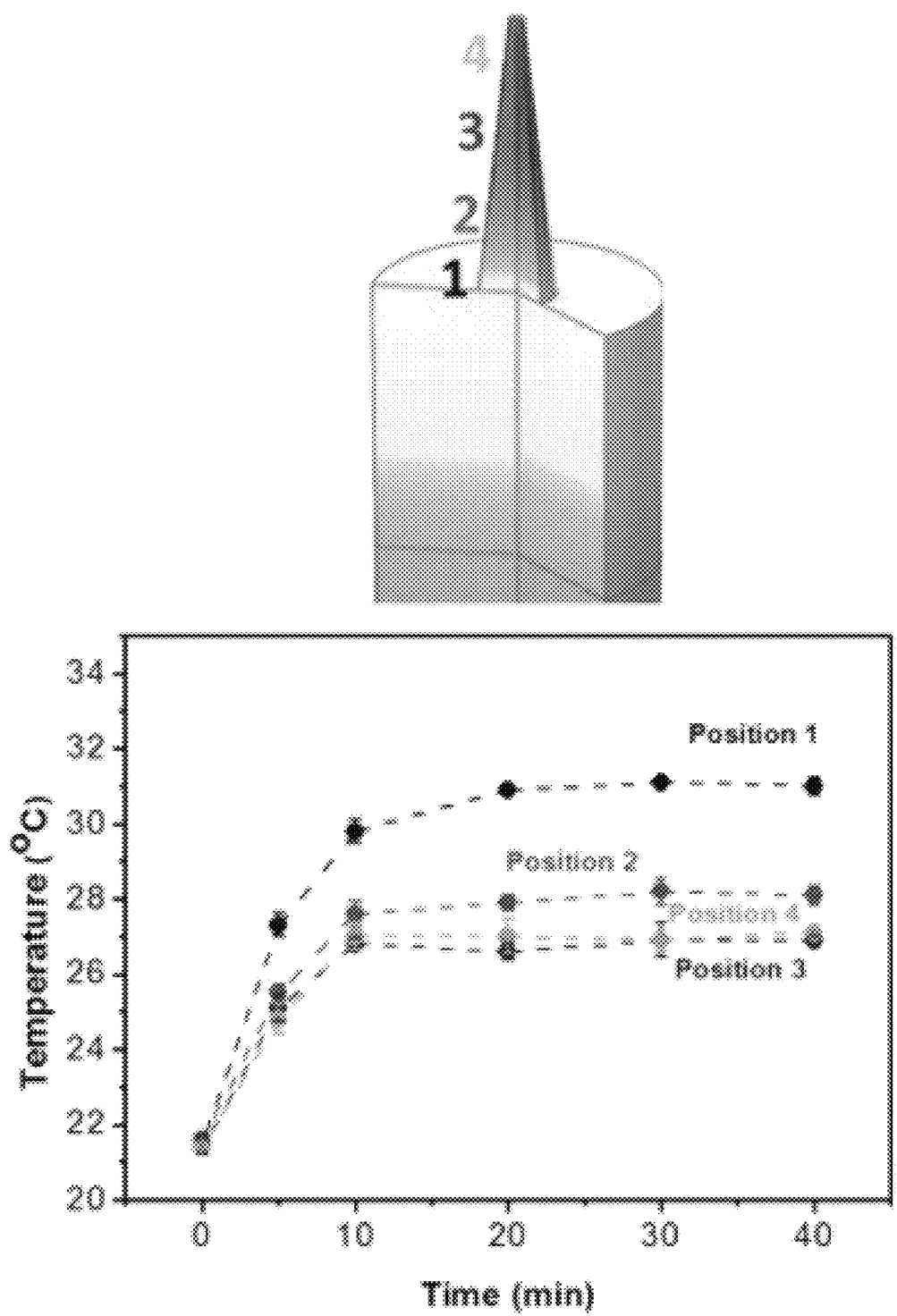
Figure 28C:
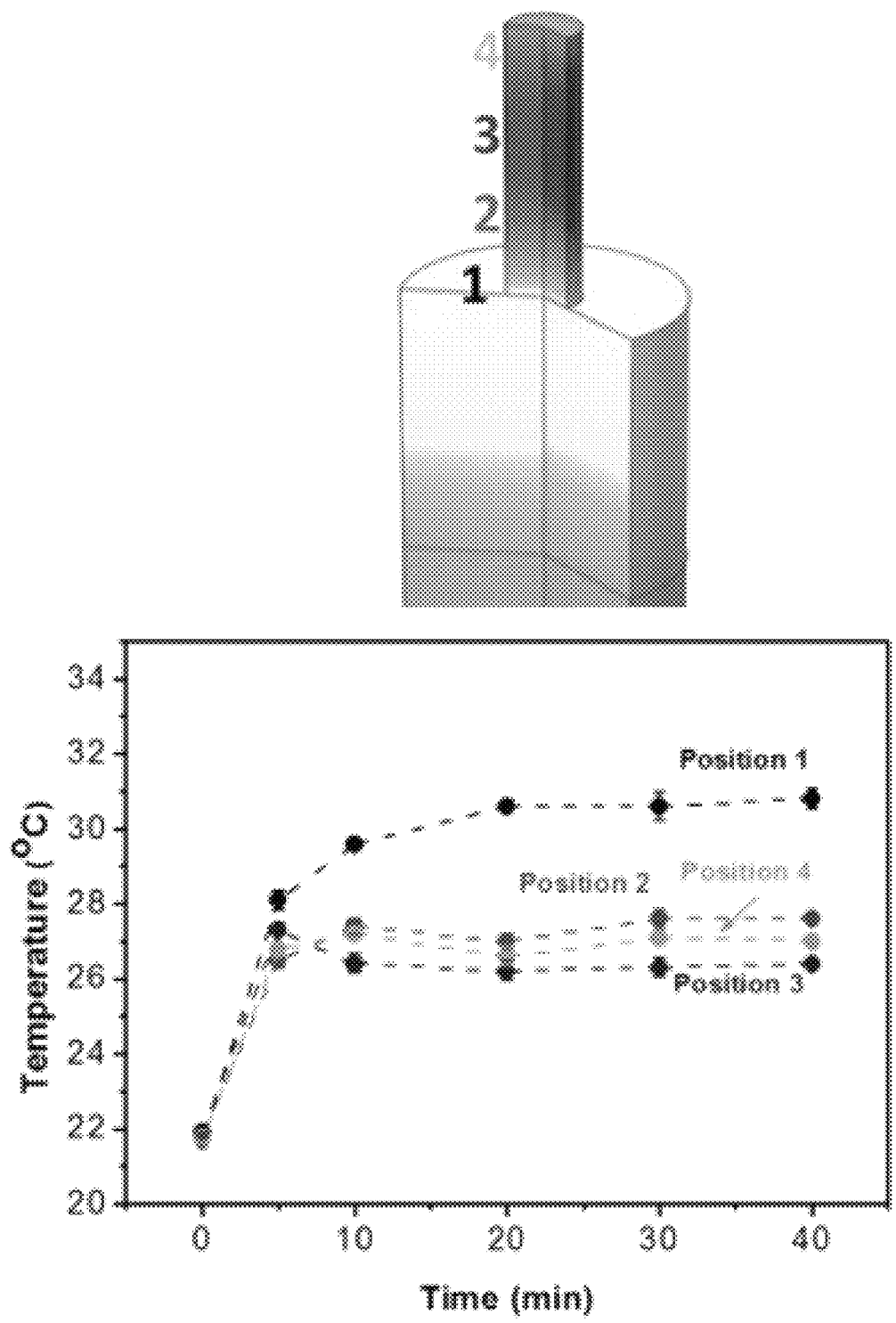

The difference in water loss rates among gel membranes with different micro-topologies indicates that surface features, i.e. surface area, specific geometries, etc., affect solar steam generation. To understand the mechanisms, the energy flow at steady-state was examined by calculating the energy balance between solar irradiation, convection, radiation loss, evaporation, and loss to the water (FIGS. 28A-28C). Four structure-related factors were identified that most significantly influence the energy flow: (1) light absorption, (2) surface area, (3) surface temperature, and (4) local humidity. It was found that all gel membranes exhibited light absorption above 90% (FIG. 4C), with the "micro-tree" array of conical structures having highest absorption from wavelength of 250 nm to 2500 nm, possibly enhanced by increased light scattering within the "forest".

Figure 4D:
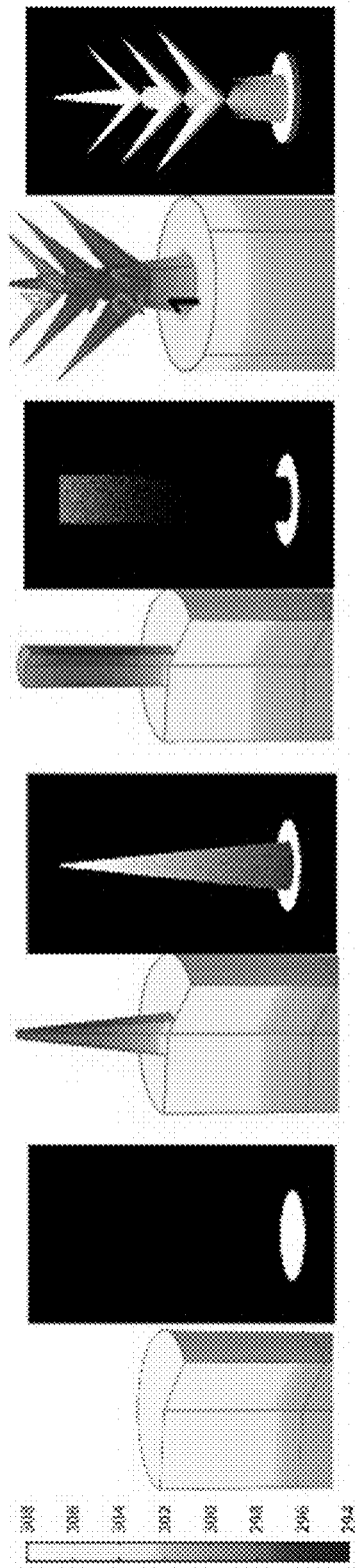
Figure 4E:
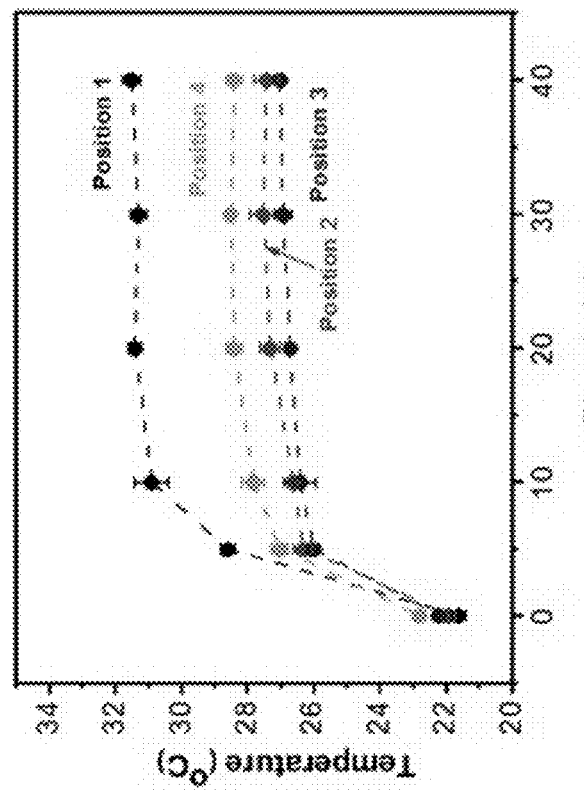

In an interfacial solar steam generator, the light-to-thermal energy conversion and water evaporation processes are confined to the gel-air interface, which implies that a larger surface area with high equilibrium surface temperature is beneficial for steam generation. These two factors are found to be affected by surface microstructures due to structural shadowing and changed light incident angle[15,47,48]. The temperature distribution within the PVA/PPy gel membranes subjected to normal incidence irradiation from the light was simulated and experimentally confirmed in the solar simulator (FIGS. 28A-28C). The contour plots in FIG. 4D and the temperature vs. time plots at four different positions along the height of a representative tree shown in FIG. 4E, indicate that all gel microstructures have a lower average surface temperature at steady states compared with a flat surface. It appears that the cone absorbs light along its entire surface, thus reaching an average surface temperature of ~27.5° C. The cylinder absorbs light only at the top surface, which results in a ~1.0° C. lower average surface temperature in the cylinder array and limits its overall water evaporation rate despite having a larger surface area compared with the cone array. By assembling the cones in a branched way, hydrogel conical micro-trees can directly absorb sunlight through most of their surfaces, which enables maintaining a high average surface temperature of ~28.0° C. under 1 sun irradiation and results in energy efficiency close to 100%. Compared to flat membrane, microstructured gels allowed more heat consumption through increased gel-air interface and minimized the energy dissipated to the gel underneath the membrane surface, thus improving their energy efficiencies.

Figure 29A:
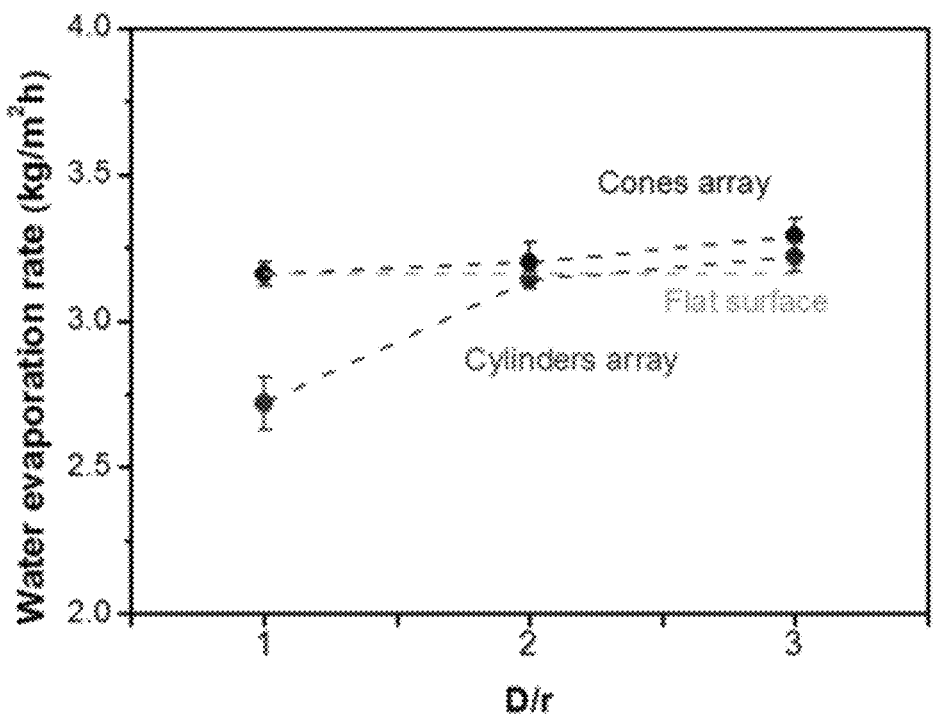
FIG. 29A: Measured solar vapor generation rates and (FIG. 29B) calculated shape factor of PVA/PPy gel cone and cylinder array with changed inter-distance. D is the inter-distance between two adjacent microstructures and r is the bottom radius of gel cone or cylinder. Geometric factor could affect the solar vapor generation performance of gel microstructure arrays by affecting the escape of generated vapor flow. Owing to its tapered shape, the conical structure has the potential to more effectively guide the vapor flow away from the evaporating surface.
Figure 29B:
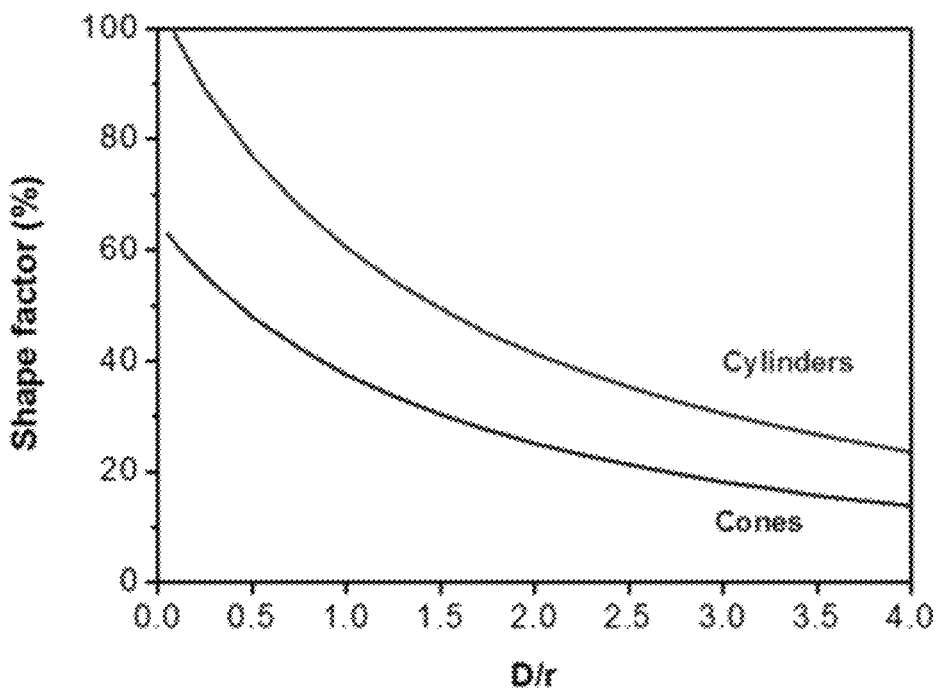
Figure 30A:
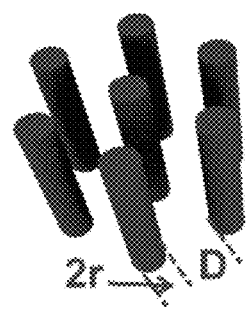
FIG. 30A: Schematic illustration of calculation of D/r value.
Figure 30B:
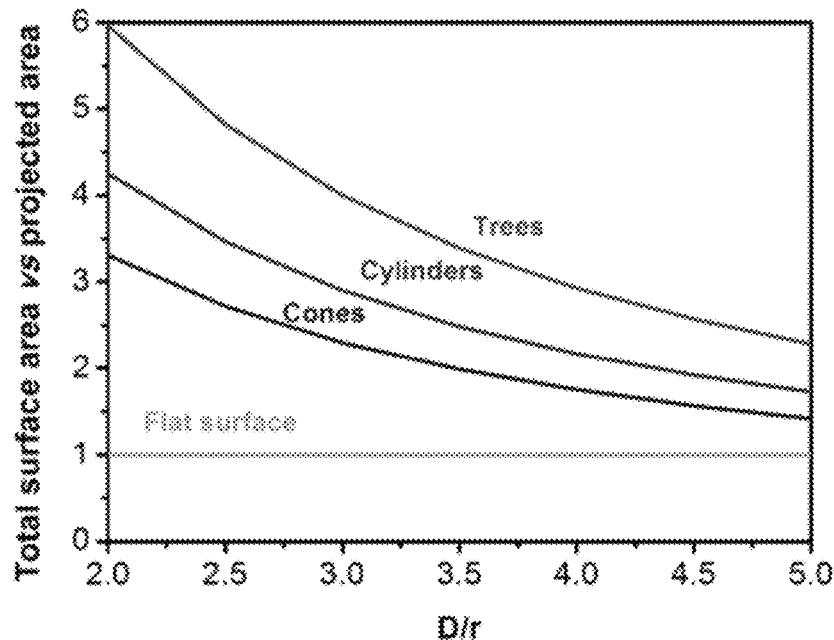
FIG. 30B: Calculation of total surface area vs projected area for gel membranes with different microstructures arrays.
Figure 30C:
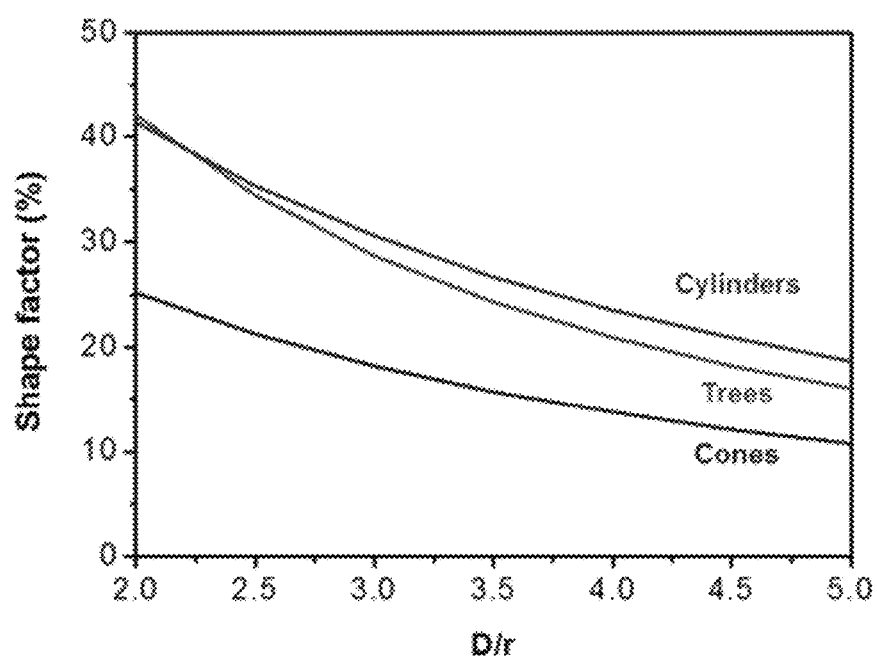
FIG. 30C: Calculation of the shape factor for different microstructure arrays. As the D/r value decreases and the gel micro-structures are more closely packed, the total surface area of micro-trees array increases more rapidly than other micro-structures arrays but its shape factor remains comparable to that of cylinders array. Thus the tree-shaped conical structure array enables a larger evaporation area for a comparable shape factor, indicating that the generated vapor could still efficiently escape when the surface area for evaporation is greatly increased.
Figure 32A:
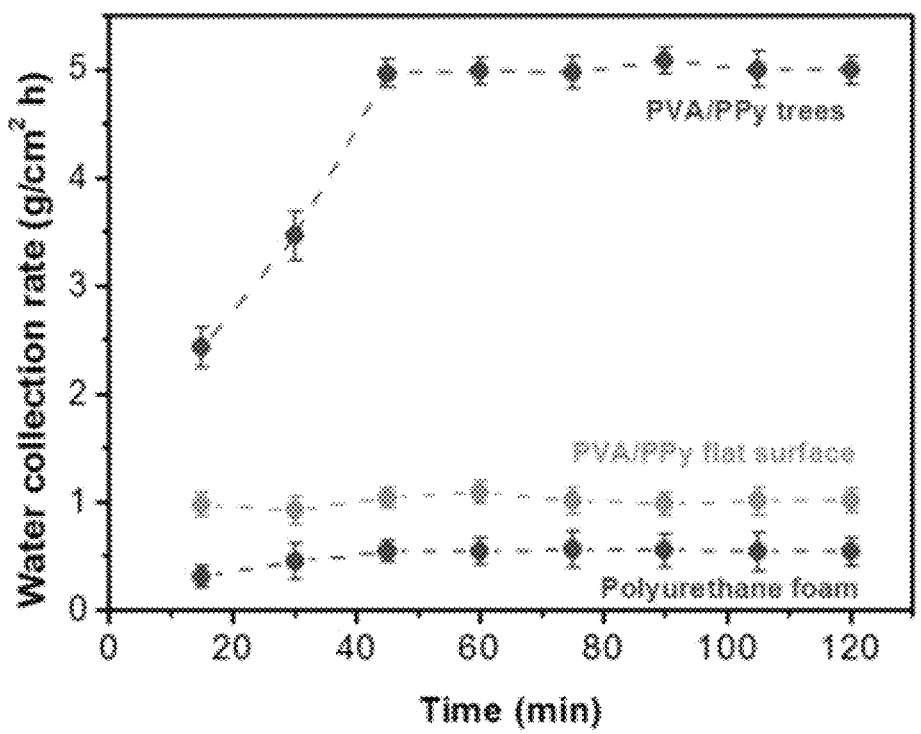
FIG. 32A: Fog collection and (FIG. 32B) solar vapor generation performance of polyurethane foam tested in lab. The polyurethane foam shows low fog collection rate of ~0.5 g $cm^{-2}$ $h^{-1}$ and solar vapor generation rate of ~0.49 kg $m^{-2}$ $h^{-1}$.
Figure 32B:
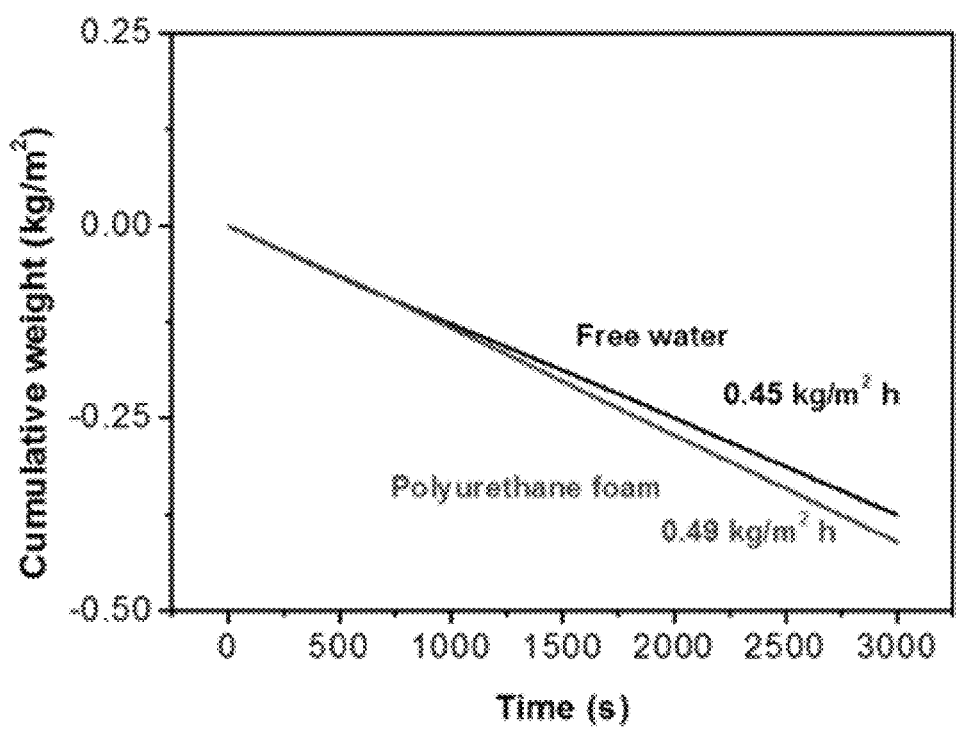

Local humidity near the gel-air interface also influences vapor generation and can be affected by surface morphology[16]. An ideal surface structure should facilitate easy escape of generated vapor since accumulated vapor leads to increased local humidity and hinders water evaporation. Assouline et. al.,[49] reported that an individual cone has a lower resistance to vapor flow compared with cylinder or inverted cone structures due to its convergent flow lines towards the narrow opening. In an array, the vapor flow is also affected by the eddy currents from the adjacent structures. In the experiments where the pitch among the features was systematically varied while other parameters remained fixed, the gel cylinder array exhibited a performance drop of 15.5% when the cylinder distance was reduced by 2 times; the cone array maintained its performance as virtually unchanged over the separation distances of 0.4 to 1.2 mm (FIG. 29A). Without wishing to be bound by theory, this behavior may be explained by the fact that the closely packed cylinders trap vapor more effectively compared with cone array. A shape factor may be introduced as a figure of merit to qualitatively account for this effect (FIG. 29B). Two geometrical factors were additionally compared: shape factor and total surface area of conical micro-trees arrays vs those of other micro-structure arrays at different inter-distances (FIGS. 30A-30C). The results showed that the conical micro-trees array enables a larger evaporation area for a comparable shape factor, indicating that the generated vapor could still efficiently escape when the evaporation area is greatly increased.

Figure 5D:
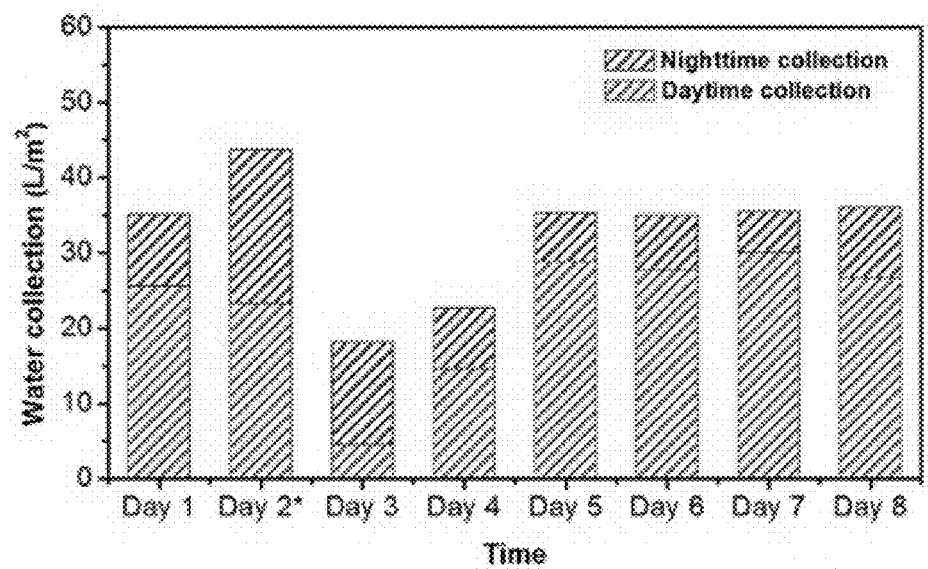
Figure 5E:
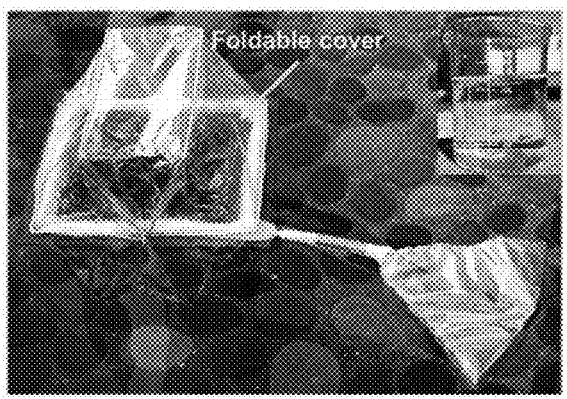
Figure 5F:
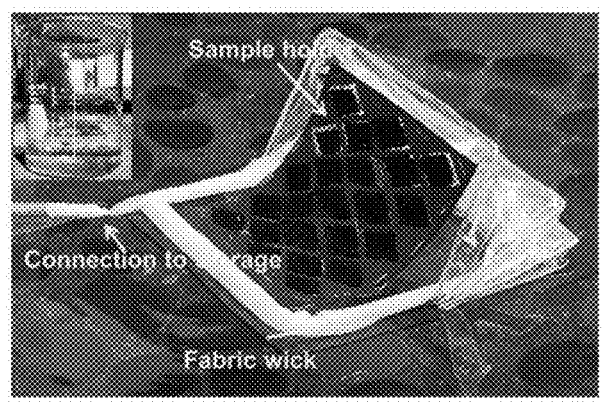
Figure 33:
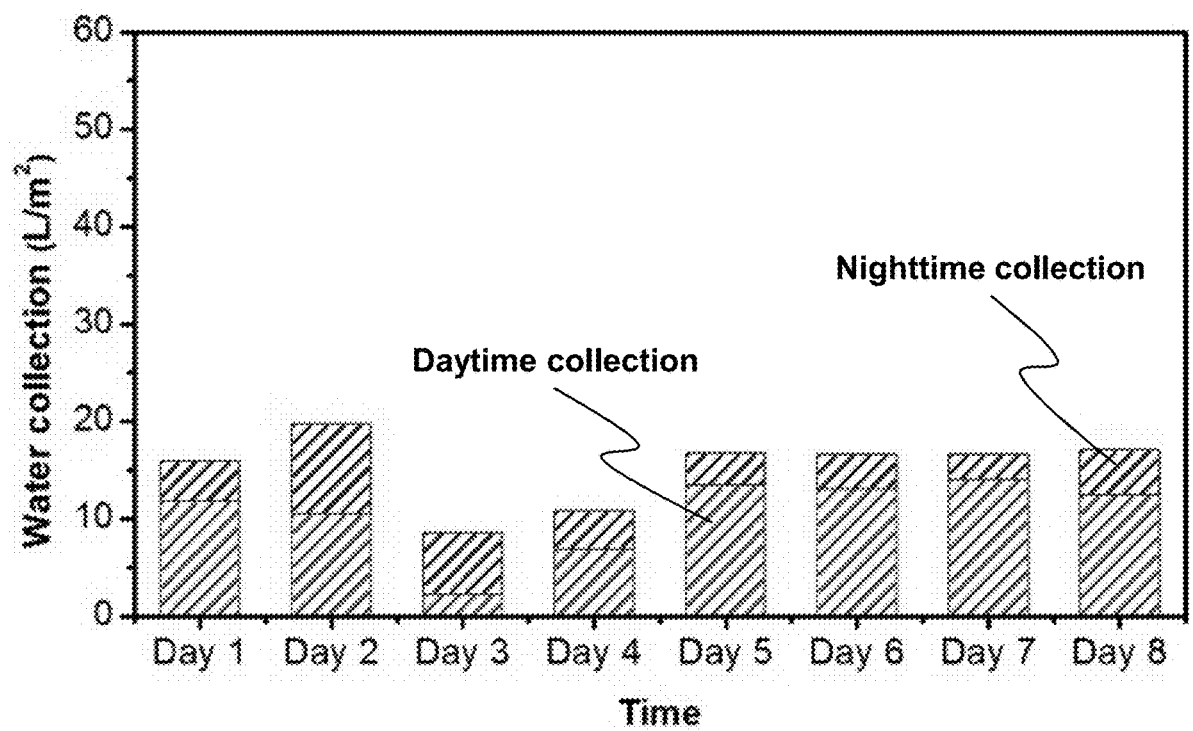
FIG. 33: Daily water collection per square meter of total water surface during rooftop tests. Bottom: water collected during daytime (8 am to 8 pm); top: water collected during nighttime (8 pm to next day's 8 am). The daily water collection rate is much lower because about half of the water surface was covered by the passive supporting structure made by PU foam.
Figure 34A:
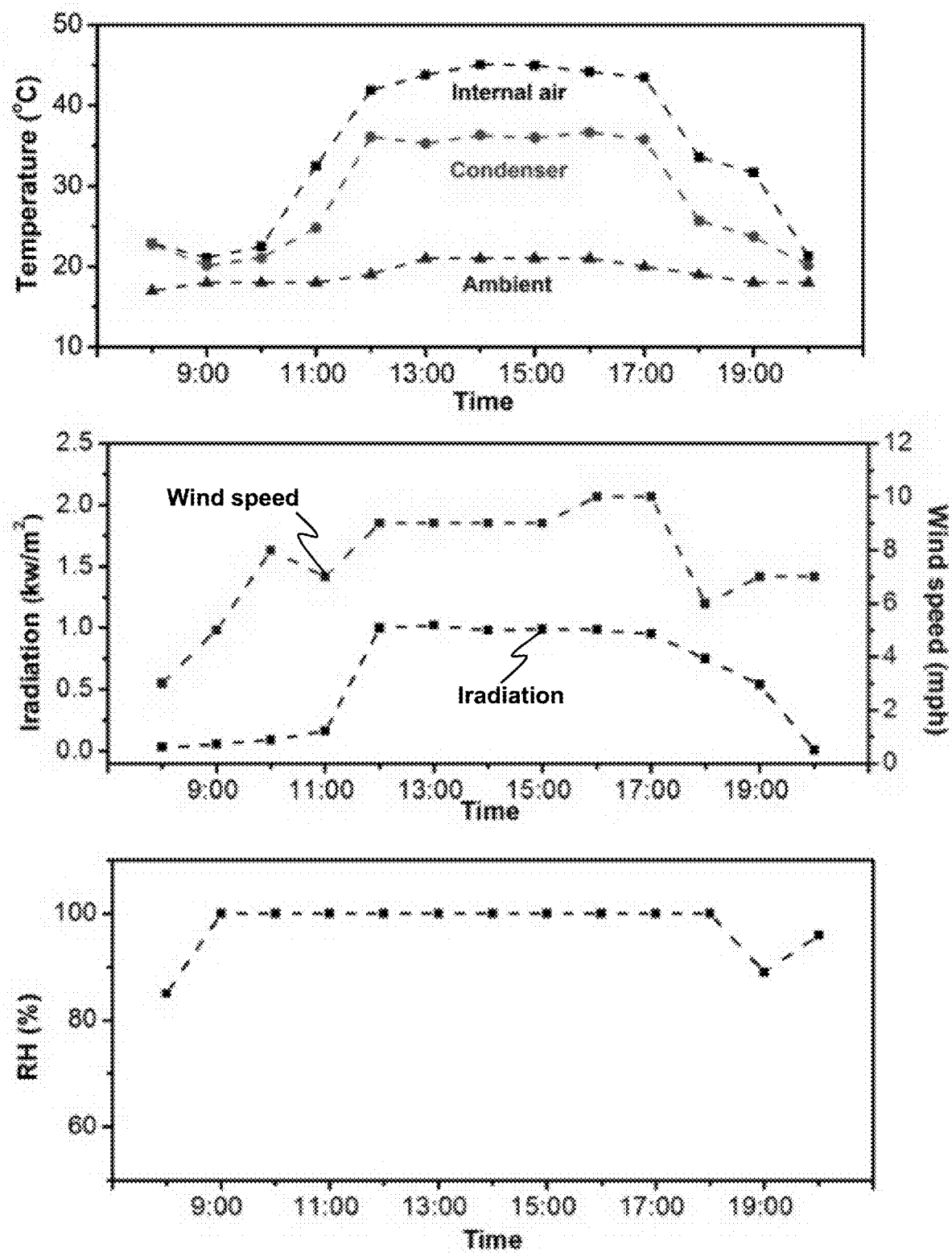
FIGS. 34A-34B: Solar irradiation intensity, temperature inside the desiccator, temperature on the desiccator surface, ambient temperature (from local weather report), wind velocity (from local weather report), and relative humidity inside the desiccator recorded during two rooftop tests.
Figure 34B:
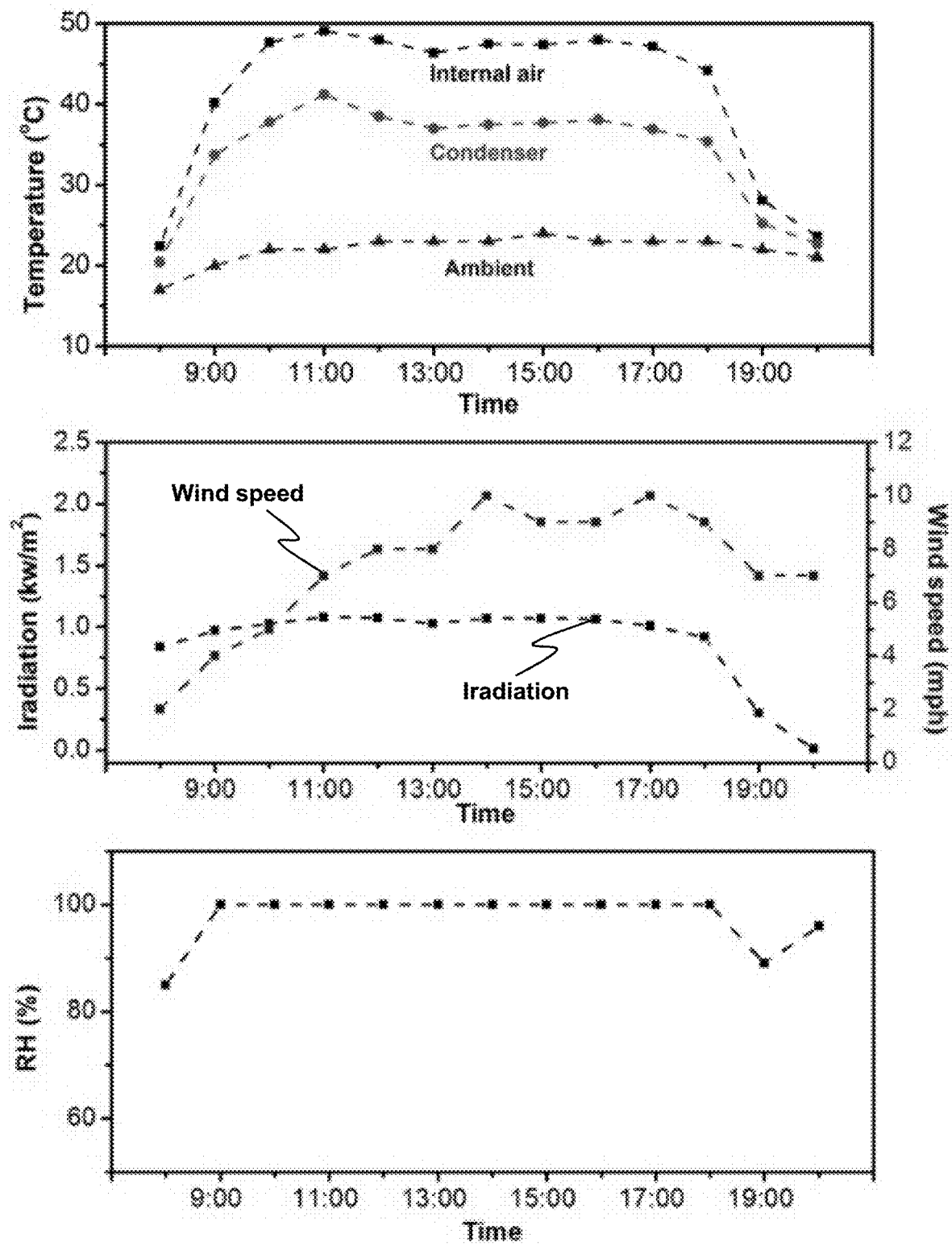
Figure 35:
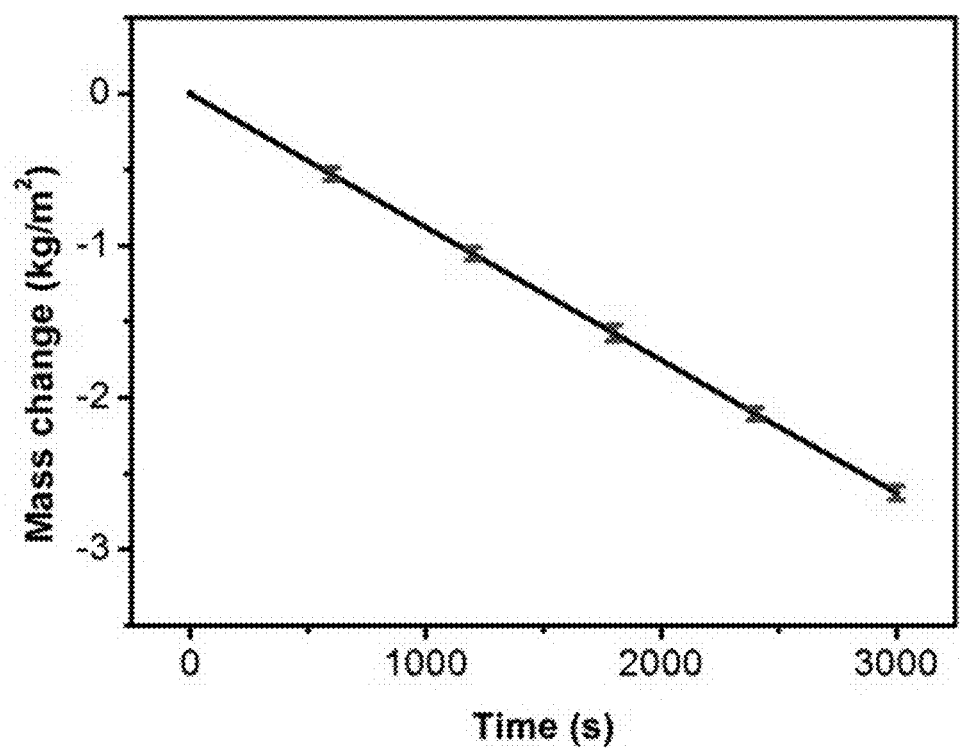
FIG. 35: Solar steam generation properties of PVA/PPy tree-shaped conical structure arrays in a closed system (relative humidity ~100%). The performance decrease caused by high humidity can be solved or relieved by system optimization.
Figure 36:
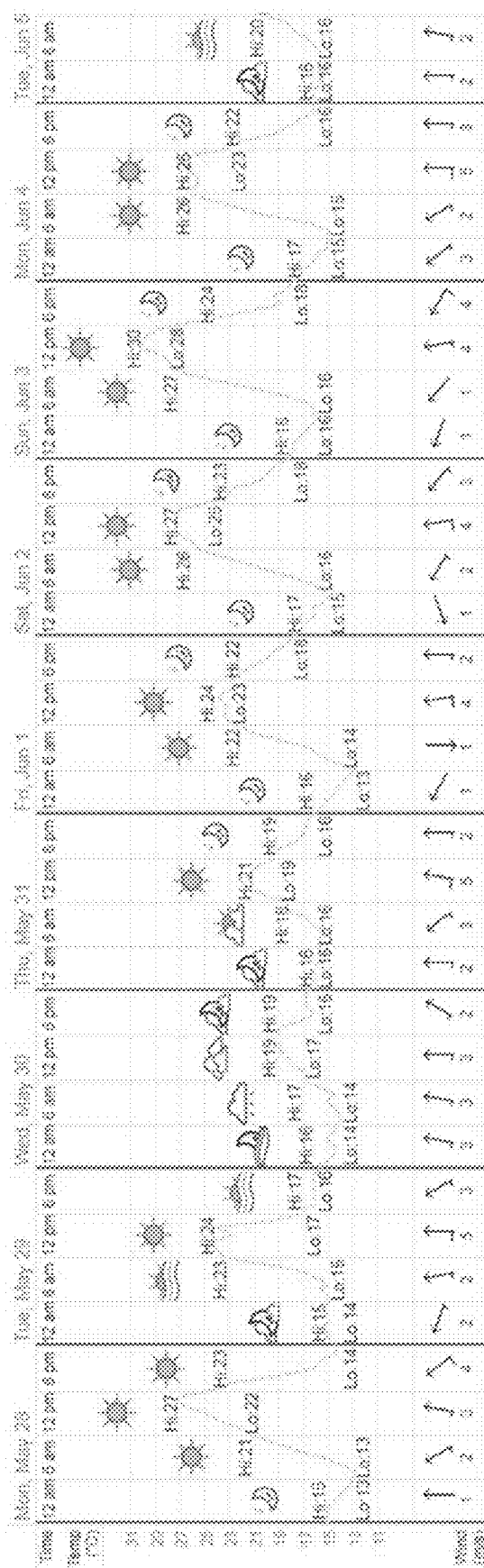
FIG. 36: Weather conditions of Pasadena from May 28, 2018 to Jun. 4, 2018[13].
Figure 37A:
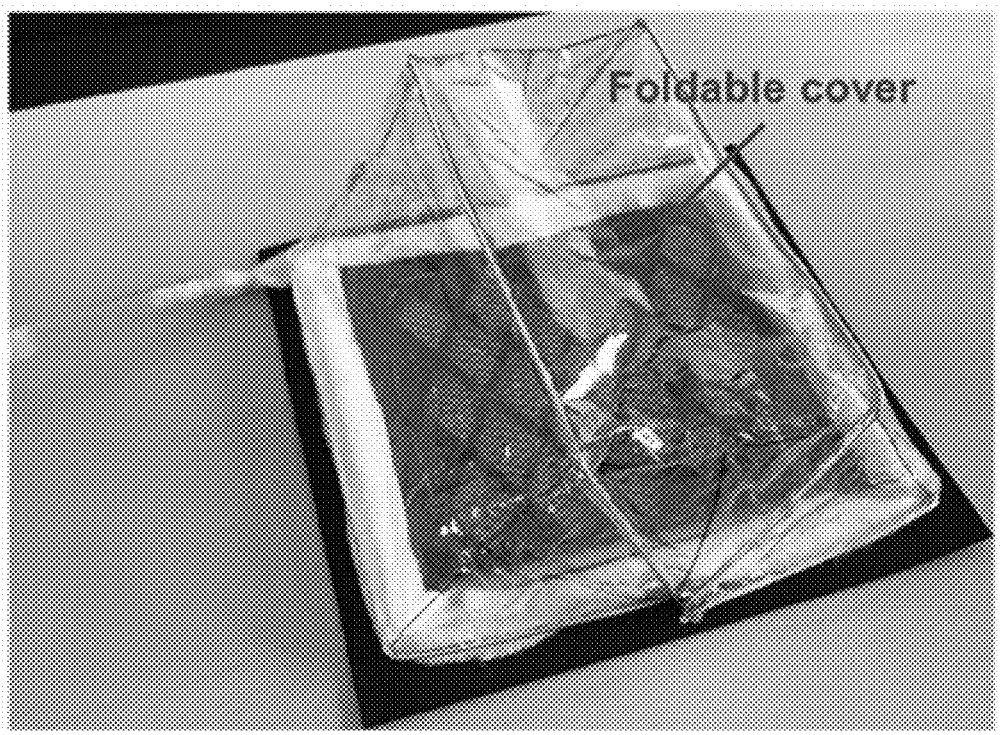
FIG. 37A: Day mode and (FIG. 37B) night mode of floating prototype for water collection. During daytime, the condensation structure is closed and the generated vapor re-condenses on it, which is collected by fabric wicks and transported to water storage. During night, the cover is open and the gel samples can be supported to face the fog flow. The collected water is guided to fabric wicks and stored in floating bag.
Figure 37B:
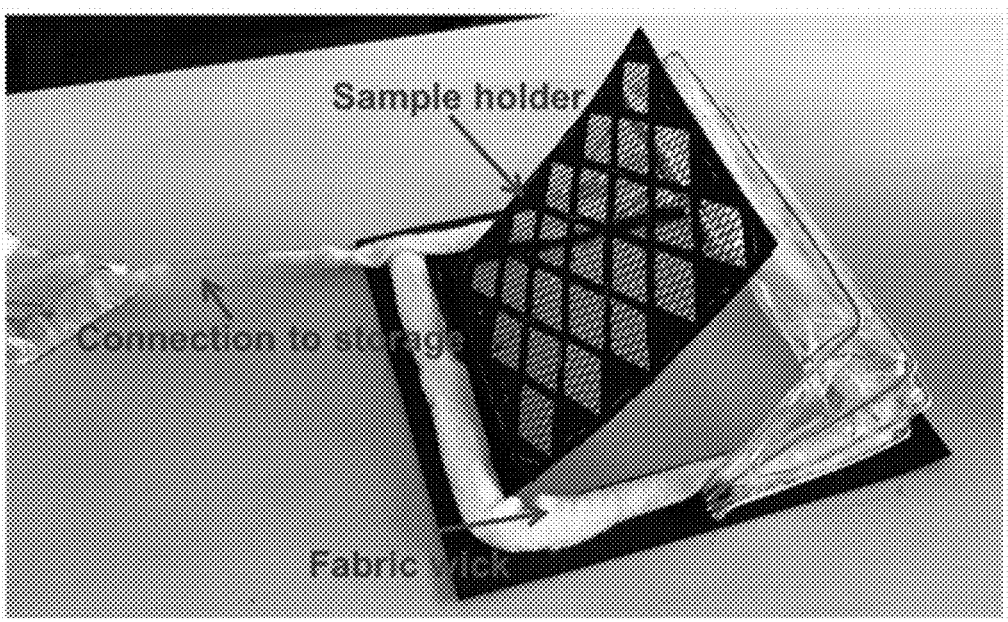

Example 4—Efficiency and Performance of all-Day Water Collection by Micro-Topological PVA/PPy Gel Membranes A test was conducted to evaluate water collection ability of microstructured membranes in a natural environment by harvesting fog over 12 hour periods, from 20:00 pm to next day's 8:00 am and desalinating brine water under sunlight from 8:00 am to 20:00 pm (FIGS. 31A-31B and 32A-32B and Table 2). The gel samples with total membrane areas of 55~126 cm$^2$ were held by the supporting structure shown in FIG. 5A and placed in a prototype device for all-day water collection (FIG. 5B). Solar irradiation was carefully traced every hour using portable solar power radiation meter (FIG. 5C). The results in FIG. 5D showed that on a typical sunny day in Pasadena, CA, with an average solar heat flux of ~1 kW m$^{-2}$, the amount of collected water during daytime was ~150 mL and ~35 mL during nighttime, which translates into efficiencies of ~28 L m$^{-2}$ and ~6 L m$^{-2}$, correspondingly, based on the area of gel membranes. The water collection rates based on the total water surface area were also calculated to show the overall efficiency of the system (FIG. 33). The average energy efficiency of microstructured gel membranes in the system is around 50%. Ambient conditions including temperatures, wind speed, and relative humidity were also recorded and analyzed for two daytime tests, which indicated that the restrained water vaporization was mainly caused by lower sunlight input and saturated internal humidity of the closed system (FIGS. 34A-34B and 35)[13]. It should be noted that the fog collection rates vary with the weather conditions (FIG. 36). On cloudy nights, like those on days 1 and 3, around 10 L m$^{-2}$ of fresh water can be harvested.

TABLE 2

Daytime water collection in outdoor prototypes using PU foam with and without holes

| Daytime water collection | PU foam w/holes | PU foam w/o holes |
| --- | --- | --- |
| Day 1 | 13.6 mL | 14.2 mL |
| Day 2 | 15.2 mL | 14.7 mL |
| Day 3 | 6.8 mL | 6.5 mL |
| Day 4 | 11.3 mL | 10.5 mL |
| Day 5 | 8.8 mL | 9.1 mL |
| Average | 11.14 mL | 11.00 mL |

To demonstrate the versatility of the device, a floating all-day water collection system with a foldable cover, tunable supporting structure, and complete water storage components (FIGS. 5E-5F and 37A-37B) was fabricated. During daytime, the condensation structure is closed and the generated vapor re-condenses on it, which is collected by fabric wicks and transported to water storage[50]. During night, the cover remains open, and the gel samples face the fog flow. The system was tested in a garden pool and managed to successfully harvest ~240 mL of fresh water in one day from ~126 cm$^2$ of micro-topological gel membranes. Thus, the fog is collected through the top surface of the hydrogel and is then directly transported to the clean water container.

The fog collection rate of 5.0 g cm$^{-2}$ h$^{-1}$ was measured, which is 115% higher than that of commercially used Raschel mesh and 61% higher than that of a cactus stem. The results extend the materials pool to include highly hydrophilic hydrogel materials for development of high-performance fog harvesting devices.

It was further discovered that the presence of surface microstructures also improved solar steam generation of hydrogel membrane by providing a large surface area for thermal conversion and water evaporation. Furthermore, it was demonstrated that the specific micro-topologies influence equilibrium surface temperature and local humidity: for example, cylinder arrays exhibited lower surface temperature and inhibited vapor escape than conical ones with otherwise equivalent parameters. Conical structures were demonstrated here to be particularly useful for their abilities to increase light absorption area and reduce resistance for vapor flow. These factors, as well as other parameters like light scattering in gel array, distribution of heat on surface structure, and fabrication defects should be simultaneously accounted for to attain optimal steam generation performance.

Utilizing these multiple objectives and design principles, it was demonstrated that a water collection system using PVA/PPy gel membrane with a 4 mm-tall, 0.8 mm-diameter, 1.2 mm-separated array of tree-shape conical structures achieves solar water evaporation rate of as high as 3.64 kg m$^{-2}$ h$^{-1}$ under 1 sun. Durability studies in a lab setting demonstrated that the membranes were stable and did not degrade in performance over the course of 20 months. These microstructured hydrogel membranes also derive their advantages from being bi-functional: when tested outdoors over 8 days, a 55 cm$^2$ membrane produced ~185 mL of fresh water through solar evaporation under natural sunlight and via fog capture during nighttime (between hours of 8 pm and 8 am). The results demonstrate the capability of micro-topological PVA/PPy hydrogel membranes as efficient 24-hour water harvesters, attaining daily water collection efficiencies of ~34 L m$^{-2}$, which—together with their straightforward fabrication methodology that is compatible with large-scale manufacturing renders them promising for practical water collection devices.

Besides the rooftop system, a floating water collection device with day and night working modes was also demonstrated to combine the solar steam generation and fog harvesting functions in one floating system. In other embodiments, the floating system can be incorporate other features to realize the full potential of the hydrogel membranes, as well as other high-performance interfacial solar evaporators. For example, in one embodiment, a semi-spherical cover with high sunlight transparency may be installed. Other opening and closing mechanisms can be applied to the cover. Remote control functions can be used to remotely switch the working modes. A cooling member can be equipped to promote the condensation.

Methods

Synthesis of Polypyrrole (PPy)

All chemicals are purchased from Sigma Aldrich and used as received. For a typical synthesis of PPy nanoparticles, 0.228 g of APS is dissolved in 10 mL deionized (DI) water and 0.069 mL pyrrole is mixed with 10 mL DI water by sonication for 10 min. APS and pyrrole solutions are then dropwisely added into 50 mL 1.2 M HCl aqueous solution with stir. After polymerization for 5 min, PPy solids are collected after washing and filtration with DI water and IPA. The purified PPy is then re-dispersed in DI water by sonication to form PPy solution.

Preparation of PVA/PPy Gel Precursor Solution

PVA has a molecular weight of 15000 g/mol and hydrolysis degree of ~97%. To prepare PVA/PPy gel precursor solution, 10 mL of 10 wt % PVA solution is mixed with 1 mL of 10 wt % PPy solution by sonication for 5 min. Then 200 μL of 25 wt % glutaraldehyde solution and 100 μL of 2M HCl aqueous solution are added, followed by sonication for 5 min. The precursor solution is readily used to fabricate structured PVA/PPy gel membranes.

Synthesis of PVA/PPy Gels

The as-prepared PVA/PPy gel precursor solution is filled into the PDMS mold with vacuum assisted method and gelation is carried out for 2 h at room temperature. The obtained PVA/PPy hybrid gel is purified by immersing into DI water overnight. The formed PVA/PPy gel structures are properly taken out of the mold after being completely frozen and sent for multiple cycles of freeze-thaw processing. In each cycle, the gel was frozen at ~20° C. for 2 h and then thawed in 30° C. water bath.

Fabrication of Microstructured PVA/PPy Gel Membranes

To fabricate microstructured PVA/PPy gel membranes, a double-inverse molding method is applied. The CAD designed structure is firstly printed using a stereolithography 3D Printer (Ember, Autodesk) with a commercial resin (PR48). Then an inverse Polydimethylsiloxane (PDMS, Sylgard 184, Dow Corning) mold is prepared using the cured PR48 structures. Note that the PDMS mold can be repeatedly used, thus enabling large-quantity fabrication of PVA/PPy gel structures. The as-prepared PVA/PPy gel precursor solution is filled into the PDMS mold with vacuum assisted method and after gelation, the formed PVA/PPy gel structures were properly taken out of the mold after being completely frozen.

Materials Characterizations

The pictures and video of hydrogel samples and their fog collection behavior were recorded by a digital camera (Canon, 60D). The morphology and microstructure of samples were observed by Scanning Electron Microscopy (FEI, Versa 3D DualBeam) operating at 5 kV. Before observation, the hydrogels were freeze dried for 24 h. The Raman spectra of hydrogels and pure water were recorded by the Raman Spectrometer (Reinishaw, M100). During testing, hydrogel sample was placed on a glass substrate and water on surface was removed by Kimswipe. Pure water was sandwiched by two glass substrates. The light absorption spectra of hydrogel samples were recorded by UV-vis-NIR spectrometer (Cary, UV/Vis/NIR 5000) equipped with an integrating sphere. The contact angle tests were conducted on a contact angle goniometer (RemaHart, Model 210). The FTIR spectra of hydrogels were recorded by the Fourier Transform Infrared Spectrometer (Thermo Mattson, Infinity Gold FTIR). Rheological experiments were performed by using a rheometer (TA instrument, AR 2000EX) in a frequency sweep mode.

Fog Collection Test in Lab

To test the fog collection ability of microstructured PVA/PPy gels, a hydrogel membrane sample with 4 cm$^2$ projected area is placed with a inclined angle of 45 degree to the horizontal surface, meanwhile, a sustained fog flow generated by ultrasonic humidifier (Levoit, LV600HH) with a velocity of about 1 m s$^{-1}$ is kept blowing to the surface with a tilted angle (15 degree) to the tangent direction of the membrane at room temperature. The outlet of fog is kept 3 cm from the bottom of gel membrane. The fog flow is just blown to the structured region and higher than the solid substrate, which helps avoid edge effect on supporting layer. A beaker is placed under the gel sample to collect drained water and the amount of collected water is measured every 15 minutes. The room temperature for fog collection tests is 25° c. and the relative humidity in artificial fog flow is 100%.

Solar Steam Generation Test in Lab

Water evaporation experiments were conducted using a home-made solar simulator with 1 sun solar flux (AM1.5, 100 mW cm$^{-2}$). The room temperature for solar steam generation test is 25° c. and the relative humidity is ~50%. The intensity of light was calibrated using a photodiode. The membrane was floated on water and placed under the light beam. After 10 min of pre-irradiation, the temperature of gel membranes achieved steady state and the mass of the water loss was then measured every 10 min. The dark condition-evaporation rate was also measured and used to calibrate vapor generation data. At least five samples were tested for each kind of gel membrane.

Stability Test of Bi-Functional PVA/PPy Gel Micro-Tree Array

The bi-functional water harvesting properties of PVA/PPy gel micro-tree array were tested during long-term storage. The sample was exposed to artificial fog flow for 2 h first and the amount of collected water was recorded every 15 min. After fog collection test, the same sample was left in open space for 0.5 h and then tested for evaporation performance under 1 Sun light irradiation for 1 h to calculate its solar vapor generation rate.

REFERENCES

1 Vörösmarty, C. J., Green, P., Salisbury, J. & Lammers, R. B. Global Water Resources: Vulnerability from Climate Change and Population Growth. *Science* 289, 284-288 (2000).
2 Johnson, N., Revenga, C. & Echeverria, J. Managing Water for People and Nature. *Science* 292, 1071-1072 (2001).
3 Shannon, M. A. et al. Science and technology for water purification in the coming decades. *Nature* 452, 301-310 (2008).
4 Tao, P. et al. Solar-driven interfacial evaporation. *Nat. Energy* 3, 1031-1041 (2018).
5 Ni, G. et al. Steam generation under one sun enabled by a floating structure with thermal concentration. *Nat. Energy* 1, 16126 (2016).
6 Gao, M., Zhu, L., Peh, C. K. & Ho, G. W. Solar absorber material and system designs for photothermal water vaporization towards clean water and energy production. *Energy Environ. Sci.* 12, 841-864 (2018).
7 Chen, C., Kuang, Y. & Hu, L. Challenges and Opportunities for Solar Evaporation. *Joule* 3, 683-718 (2019).
8 Guo, Y. et al. Hydrogels and Hydrogel-Derived Materials for Energy and Water Sustainability. *Chem. Rev.* 120, 7642-7707, (2020).
9 Zhao, F., Guo, Y., Zhou, X., Shi, W. & Yu, G. Materials for solar-powered water evaporation. *Nat. Rev. Mater.* 5, 388-401, (2020).
10 Zhou, X., Lu, H., Zhao, F. & Yu, G. Atmospheric Water Harvesting: A Review of Material and Structural Designs. *ACS Mater. Lett.* 2, 671-684, (2020).
11 Hu, X. et al. Tailoring Graphene Oxide-Based Aerogels for Efficient Solar Steam Generation under One Sun. *Adv. Mater.* 29, 1604031 (2017).
12 Yang, Y. et al. Graphene-Based Standalone Solar Energy Converter for Water Desalination and Purification. *ACS Nano* 12, 829-835 (2018).
13 Ito, Y. et al. Multifunctional Porous Graphene for High-Efficiency Steam Generation by Heat Localization. *Adv. Mater.* 27, 4302-4307 (2015).
14 Bae, K. et al. Flexible thin-film black gold membranes with ultrabroadband plasmonic nanofocusing for efficient solar vapour generation. *Nat. Commun.* 6, 10103 (2015).
15 Zhou, L. et al. 3D self-assembly of aluminium nanoparticles for plasmon-enhanced solar desalination. *Nat. Photon.* 10, 393-398 (2016).
16 Zhao, F. et al. Highly efficient solar vapour generation via hierarchically nanostructured gels. *Nat. Nanotech.* 13, 489-495 (2018).
17 Zhou, X., Zhao, F., Guo, Y., Zhang, Y. & Yu, G. A hydrogel-based antifouling solar evaporator for highly efficient water desalination. *Energy Environ. Sci.* 11, 1985-1992 (2018).
18 Zhou, X., Zhao, F., Guo, Y., Rosenberger, B. & Yu, G. Architecting highly hydratable polymer networks to tune the water state for solar water purification. *Sci. Adv.* 5, eaaw5484 (2019).
19 Guo, Y. et al. Synergistic Energy Nanoconfinement and Water Activation in Hydrogels for Efficient Solar Water Desalination. *ACS Nano* 13, 7913-7919 (2019).
20 Agam, N. & Berliner, P. R. Dew formation and water vapor adsorption in semi-arid environments—A review. *J. Arid Environ.* 65, 572-590 (2006).
21 Fessehaye, M. et al. Fog-water collection for community use. *Renew. Sustain. Energy Rev.* 29, 52-62 (2014).
22 Nandakumar, D. K. et al. Solar Energy Triggered Clean Water Harvesting from Humid Air Existing above Sea Surface Enabled by a Hydrogel with Ultrahigh Hygroscopicity. *Adv. Mater.* 31, 1806730 (2019).
23 Food and Agricultural Organization, Highlands And Drylands-Mountains, A Source Of Resilience In Arid Regions. (2011).
24 Damak, M. & Varanasi, K. K. Electrostatically driven fog collection using space charge injection. *Sci. Adv.* 4, eaao5323 (2018).
25 Park, K. C., Chhatre, S. S., Srinivasan, S., Cohen, R. E. & McKinley, G. H. Optimal Design of Permeable Fiber Network Structures for Fog Harvesting. *Langmuir* 29, 13269-13277 (2013).
26 Andrews, H. G., Eccles, E. A., Schofield, W. C. E. & Badyal, J. P. S. Three-Dimensional Hierarchical Structures for Fog Harvesting. *Langmuir* 27, 3798-3802 (2011).
27 Olivier, J. & de Rautenbach, C. J. The implementation of fog water collection systems in South Africa. *Atmos. Res.* 64, 227-238 (2002).
28 Shanyengana, E. S., Henschel, J. R., Seely, M. K. & Sanderson, R. D. Exploring fog as a supplementary water source in Namibia. *Atmos. Res.* 64, 251-259 (2002).
29 Tu, Y., Wang, R., Zhang, Y. & Wang, J. Progress and Expectation of Atmospheric Water Harvesting. *Joule* 2, 1452-1475 (2018).
30 Parker, A. R. & Lawrence, C. R. Water capture by a desert beetle. *Nature* 414, 33-34 (2001).
31 Zhu, H., Guo, Z. & Liu, W. Biomimetic water-collecting materials inspired by nature. *Chem. Commun.* 52, 3863-3879 (2016).
32 Chen, H. et al. Ultrafast water harvesting and transport in hierarchical microchannels. *Nat. Mater.* 17, 935-942 (2018).

33 Ju, J. et al. A multi-structural and multi-functional integrated fog collection system in cactus. *Nat. Commun.* 3, 1247 (2012).
34 Xu, T., Lin, Y., Zhang, M., Shi, W. & Zheng, Y. High-Efficiency Fog Collector: Water Unidirectional Transport on Heterogeneous Rough Conical Wires. *ACS Nano* 10, 10681-10688 (2016).
35 Heng, X., Xiang, M., Lu, Z. & Luo, C. Branched ZnO Wire Structures for Water Collection Inspired by Cacti. *ACS App. Mater. Interfaces* 6, 8032-8041 (2014).
36 Ju, J. et al. Cactus Stem Inspired Cone-Arrayed Surfaces for Efficient Fog Collection. *Adv. Funct. Mater.* 24, 6933-6938 (2014).
37 Tian, Y. et al. Large-scale water collection of bioinspired cavity-microfibers. *Nat. Commun.* 8, 1080 (2017).
38 Dai, X. et al. Hydrophilic directional slippery rough surfaces for water harvesting. *Sci. Adv.* 4, eaaq0919 (2018).
39 Bai, H. et al. Efficient Water Collection on Integrative Bioinspired Surfaces with Star-Shaped Wettability Patterns. *Adv. Mater.* 26, 5025-5030 (2014).
40 Lorenceau, É. & QuÉRÉ, D. Drops on a conical wire. *J. Fluid Mech.* 510, 29-45 (2004).
41 Bai, H. et al. Controlled Fabrication and Water Collection Ability of Bioinspired Artificial Spider Silks. *Adv. Mater.* 23, 3708-3711 (2011).
42 Hou, Y., Yu, M., Chen, X., Wang, Z. & Yao, S. Recurrent Filmwise and Dropwise Condensation on a Beetle Mimetic Surface. *ACS Nano* 9, 71-81 (2015).
43 Liu, X. & Cheng, P. Dropwise condensation theory revisited Part II. Droplet nucleation density and condensation heat flux. *Int. J. Heat Mass Transf.* 83, 842-849 (2015).
44 Miyazaki, M., Fujii, A., Ebata, T. & Mikami, N. Infrared Spectroscopic Evidence for Protonated Water Clusters Forming Nanoscale Cages. *Science* 304, 1134-1137 (2004).
45 Sun, Z. et al. Plasmon Based Double-Layer Hydrogel Device for a Highly Efficient Solar Vapor Generation. *Adv. Funct. Mater.* 29, 1901312 (2019).
46 Zhou, L. et al. Self-assembly of highly efficient, broadband plasmonic absorbers for solar steam generation. *Sci. Adv.* 2, e1501227 (2016).
47 Chen, C. et al. Highly Flexible and Efficient Solar Steam Generation Device. *Adv. Mater.* 29, 1701756 (2017).
48 Guo, Y., Zhao, F., Zhou, X., Chen, Z. & Yu, G. Tailoring Nanoscale Surface Topography of Hydrogel for Efficient Solar Vapor Generation. *Nano Lett.* 19, 2530-2536 (2019).
49 Assouline, S. & Narkis, K. Evaporation From Soil Containers With Irregular Shapes. *Water Resour. Res.* 53, 8795-8806 (2017).
50 Ni, G. et al. A salt-rejecting floating solar still for low-cost desalination. *Energy Environ, Sci.* 11, 1510-1519 (2018).

Supplementary Information

Figure 6A:
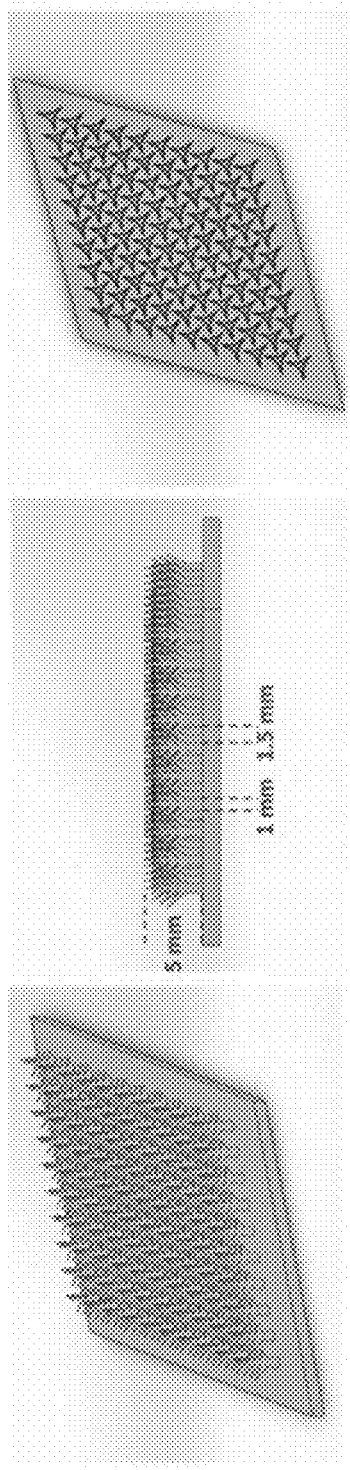
FIGS. 6A-6C: CAD blueprints of membranes with (FIG. 6A) tree-shaped conical structures, (FIG. 6B) cones and (FIG. 6C) cylinder array.
Figure 6B:
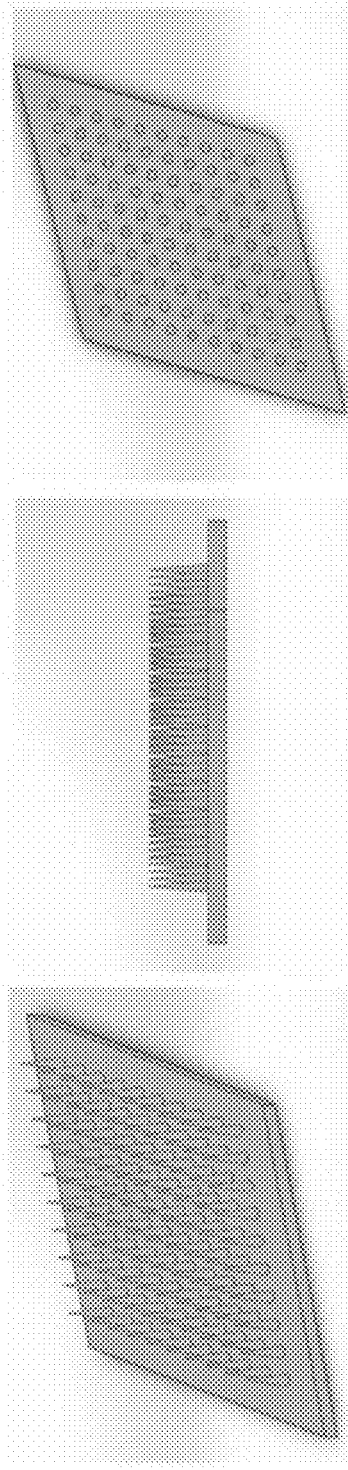
Figure 6C:
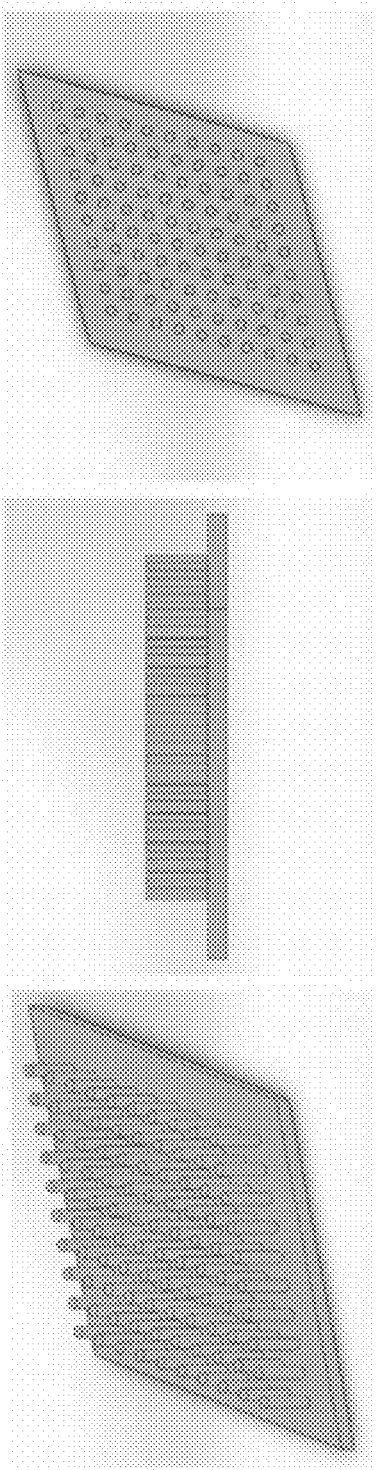

Supplementary Methods
CAD Design of Membranes with Micro-Tree, Cone, and Cylinder Array by Solidworks The micro-structured gel membranes are initially designed and drawn by Solidworks software. FIG. 6A shows the blueprints of membrane with micro-tree array in 45 degree top, side, and top views. The height of tree trunk is 5 mm and its bottom diameter is 1 mm. 9 smaller cones with same conicity are distributed uniformly as branches at ⅓, ½, and ⅔ height of trunk with 45 degree tilted. 100 these micro-trees are hexagonally planted on a 1.5-mm thick supporting layer and the distance (center to center) between two adjacent trees is 2.5 mm. The gel thickness has been demonstrated to have no effects on saturated water content and water transport rate of hybrid hydrogels[1]. The relatively thick supporting layer used is to maintain the structure integrity of hydrogels during fabrication and processing.

The cones have exactly same size with micro-tree[1] trunk, with height of 5 mm and bottom diameter of 1 mm (FIG. 6B). 100 these micro-cones are hexagonally distributed on the supporting layer with inter-distance (center to center) of 2.5 mm. The hexagonal arrangement is beneficial for fog collection because with the staggered arrangement each cone is wholly wrapped by the flow stream and water drops can not only deposit on the windward side but also on the leeward side of the cones[2]. The cylinders have height of 5 mm and diameter of 1 mm (FIG. 6C). 100 these micro-cylinders are hexagonally distributed on the supporting layer with inter-distance (center to center) of 2.5 mm.

The projected area of supporting layer is designed to be slightly larger than that of micro-structures array, thus facilitating mold assisted fabrication. The supporting layer is cut to fit the area of array for final PVA/PPy gel membranes during all tests. It is also worthy to notice that PVA/PPy gels shrinks a little during cycles of freeze-thaw processing. The size of final gel structures is ~80% of the size in CAD design (in one dimension). For examples, the height of PVA/PPy gel micro-tree is ~4 mm and its bottom diameter is ~0.8 mm. The ratio of total surface areas for membranes with flat surface, cone array, cylinder array and micro-tree array is 1:1.8:2.4:3.5, respectively.

Set-Up of Fog Collection Test in Lab

To test the fog collection ability of microstructured PVA/PPy gels, a hydrogel membrane sample with 4 cm$^2$ projected area is placed with a inclined angle θ to the horizontal surface, meanwhile, a sustained fog flow generated by ultrasonic humidifier (LV600HH, Levoit) with a velocity of about 1 m s$^{-1}$ is kept blowing to the surface with a tilted angle (15 degree) to the tangent direction of the membrane at room temperature (FIG. 10A)[3]. The fog flow angle is carefully selected to make sure the fog flow passes through the gel micro-structure array and minimize the influence of supporting layer. If the angle is smaller, the fog flow may directly hits the supporting layer and causes significant edge effect. When the angle is larger, that part of the fog flow bounced back from the substrate and flow into the collection beaker directly.

The outlet of fog is kept 3 cm from the bottom of gel membrane. θ is tuned from 15 degree, 45 degree to 85 degree. The fog flow is just blown to the structured region and higher than the solid substrate, which helps avoid edge effect on supporting layer[3]. A beaker is placed under the gel sample to collect drained water and the amount of collected water is measured every 15 minutes. Without further clarification, the fog collection rate in this Supplementary Text is calculated based on the projected area of gel membranes. The effect of inclined angle for the gravity assisted drainage was studied and it was found that there was no obvious difference in resulted fog collection rate (FIG. 10B). This is mainly because the millimeter-size droplets formed by coalescence of smaller droplets from all branches have an initial speed when they drop from the micro-trees, which facilitates their drainage. Thus θ is set as 45 degree for all fog collection tests. The room temperature for fog collection tests is 25° c. and the relative humidity in artificial fog flow is 100%.

To study the influence of fog flow velocity, fog flows with 0.5 m/s and 2 m/s speed were applied (FIG. 10C). It can be seen that as the fog flow speed increases, the time for hydrogel conical micro-tree array to reach the saturated collection rate decreases but the maximum fog collection rate remains almost same. This is because it takes longer time for slower fog flow to pass through the micro-tree array and to fully wrap the whole surface of gel micro-trees. Once the array is saturated by the fog flow, the concentration of water droplets in the fog exceeds the fog collection capacity of the gel surface. The whole surface of gel membrane continuously captures droplets and transports them for collection.

Figure 26A:
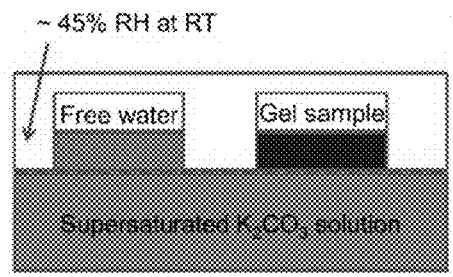
FIG. 26A: Schematic illustration of experimental set-up for equivalent vaporization enthalpy measurements.
Figure 26B:
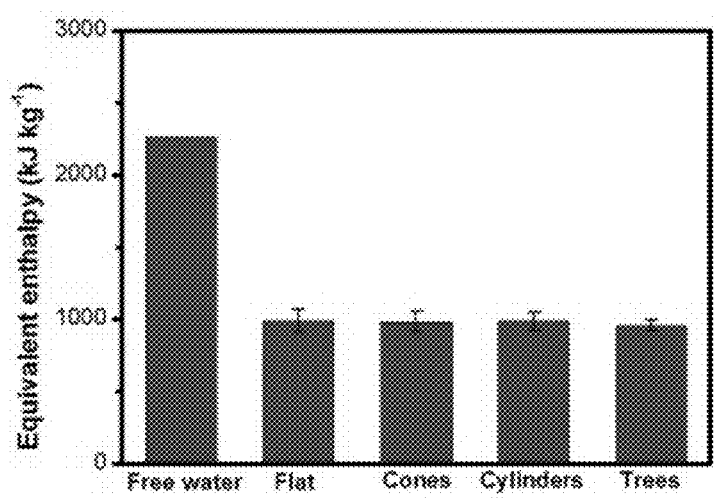
FIG. 26B: Calculated equivalent vaporization enthalpy of water in microstructured PVA/PPy gels.
Figure 26C:
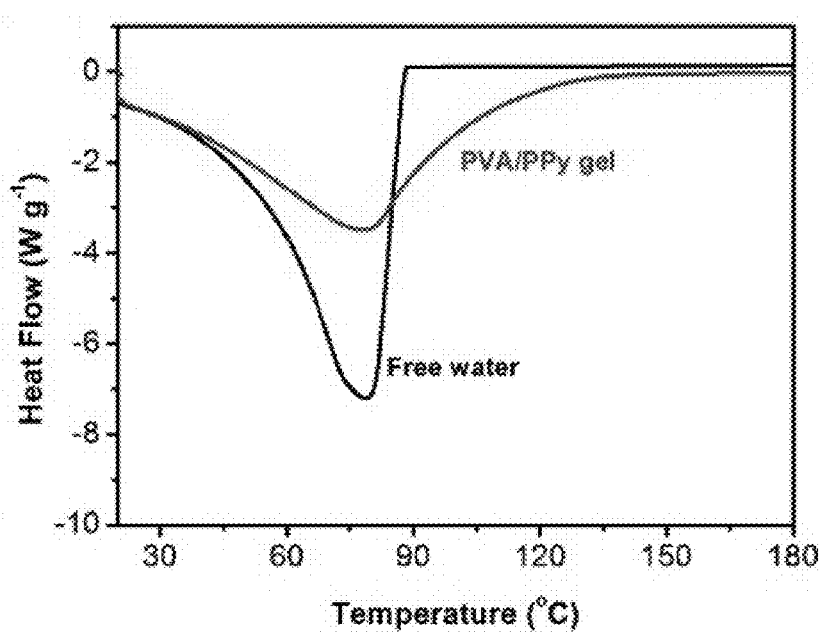
FIG. 26C: DSC measurements on free water and PVA/PPy gel. The measured enthalpy of free water is 2424 kJ $kg^{-1}$, which is very close to the theoretical value of 2450 kJ $kg^{-1}$. The water vaporization enthalpy in PVA/PPy gel is 1735 kJ $kg^{-1}$. Note that the enthalpy values calculated from DSC are higher than those tested in evaporation experiments, since the DSC test and evaporation test present a full dehydration and slightly dehydration processes, respectively[1].
Figure 27A:
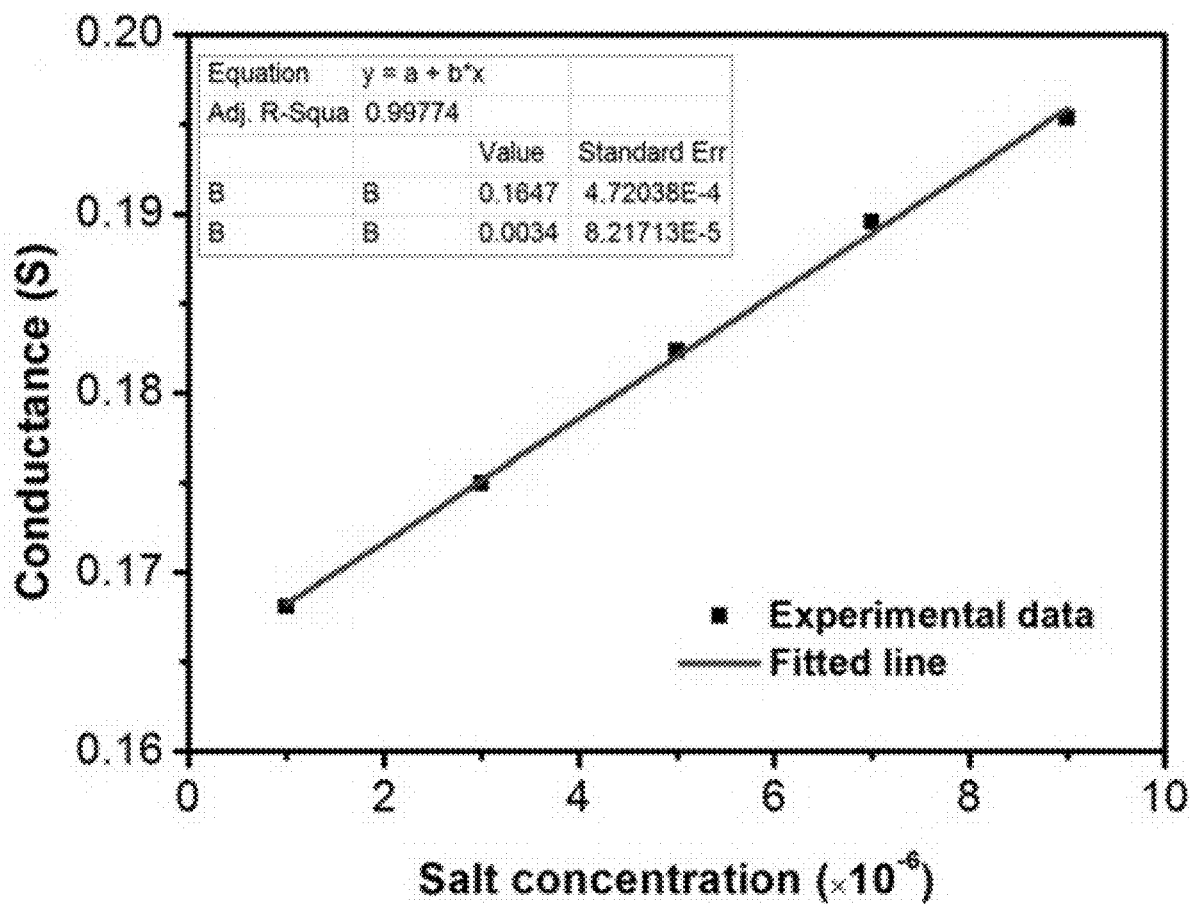
FIG. 27A: Linear dependency of salinity and conductance of NaCl solution under 25° C.
Figure 27B:
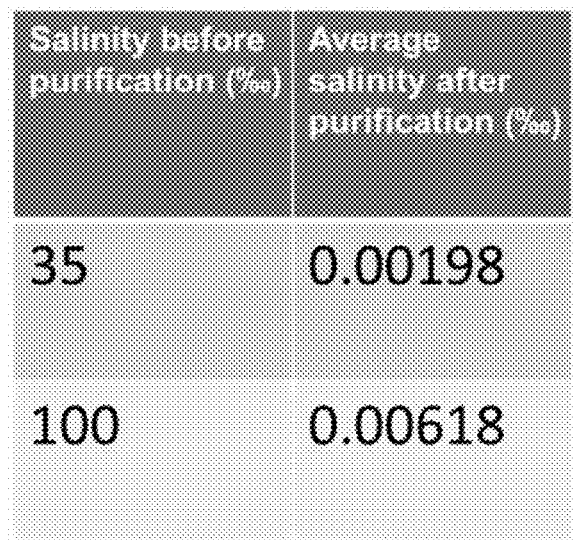
FIG. 27B: The calculated salinity of purified water. Antifouling property has been demonstrated for hydrogel based solar steam generators in several studies[10,11]. The salt accumulation issue was not observed in the studies. The mechanism behind is that the hydrogel layer builds a salt equilibrium by water transport-induced salt ion absorption and diffusion-enabled salt ion discharge.

Experimental Measurement of Equivalent Vaporization Enthalpy in Microstructured PVA/PPy Hydrogels To compare the water vaporization enthalpy in microstructured PVA/PPy hydrogels, a control experiment was designed to measure the vaporization enthalpy[1]. As shown in FIG. 26A, a container is set under room temperature (RT) and half of the container is filled up with supersaturated potassium carbonate solution to enable stabilized relative humidity (RH) of ~45% in the closed space. Free water and gel samples with same evaporation area are synchronously put in the closed container above potassium carbonate solution. To keep the evaporation area same, an optical profilometer was used to measure the surface area of hydrogel, which is ~2 m$^2$/m$^2$. Then the total surface area of gel microstructures was estimated by combining the parameter from CAD file used for 3D printing. The mass change of free water and gel sample caused by water evaporation is measured every hour and corresponding equivalent evaporation enthalpy ($\Delta H_{equ}$) is calculated based on the following equation using average evaporation amount in an hour:

$$U_{in} = \Delta H_{vap} m_0 = \Delta H_{equ} m_g$$

where $U_{in}$ is the power input which is identical for free water and gel samples; $\Delta H_{vap}$ and $m_0$ are the vaporization enthalpy and average evaporation amount of free water; $m_g$ is the average evaporation amount of gel samples.

To further prove the reduced evaporation enthalpy of water in PVA/PPy hybrid gel, differential scanning calorimetric (DSC) measurement is used for measuring the vaporization energy of pure water and water in the gel. The gel sample was placed in an open Al crucible and measured with a linear heating rate of 5 K min$^{-1}$, under a nitrogen flow (20 mL min$^{-1}$), in the temperature range from 20 to 180° C. The effective specific heat capacity was calculated by comparing the heat flow of measured gels with that of the standard sapphire sample.

Simulation of Surface Temperature Distribution of PVA/PPy Gel Microstructures

At steady state, the net temperature and evaporation rate is determined from the energy balance between various terms: solar irradiation, convection, radiation loss, evaporation, and loss to the water underneath. This balance can be expressed as:

$$Q_{solar} + Q_{conv} + Q_{rad} + Q_{evap} + Q_{water} = 0 \quad (S1)$$

In the system, there a number of surfaces that are not normal to the incident light direction (z), so the energy flux due to irradiation can be expressed as $Q_{solar} = \alpha I_{solar} |\hat{n} \cdot \hat{z}|$, where a is the surface absorptivity (FIG. 4C in main text), and $I_{solar}$ is the solar irradiance at Earth level. Generally, for a closed environment with controlled ambient parameters (humidity, pressure, temperature), the evaporative flux can be expressed as $Q_{evap} = H_v k(C_{sat}(T) - C_{wa})$ where $H_v, k$ are the heat of evaporation and the mass transfer coefficient, respectively, and $C_{sat}, C_{wa}$ are the concentration of saturated vapor and the concentration of vapor in air, respectively[4]. The saturation concentration relates to the saturation pressure $p_{sat}$ as $C_{sat}(T) = p_{sat}(T)/RT$. The convective heat flux is expressed as $Q_{conv} = h_{conv}(T - T_a)$, where $T_a \approx 23°$ C. is the ambient environment temperature, and $h_{conv}$ is the convective heat transfer coefficient. The radiation loss term is proportional to emissivity of the material, the local temperature, and the background environment temperature, i.e. $Q_{rad} = \epsilon \sigma(T^4 - T_a^4)$, where $\sigma$ is the Stefan-Boltzmann constant; from Kirchoff's law, it is assumed the emissivity of the gel structure is equal to its absorptivity, e.g. $\epsilon = \alpha$. Last, the energy flow to the underlying water is incorporated through the temperature boundary condition where the water temperature is equal to the environment temperature $T_a$ (room temperature). This energy balance model is used to simulate and identify qualitative trends in surface temperature distribution for different morphologies (cone, cylinder, tree). In COMSOL Multiphysics, cone and cylinder case is analyzed as a two-dimensional axisymmetric model, while the tree case is analyzed as a three-dimensional model with an illumination source incident from the top (~z direction). The energy balance of Equation (S1) is applied as the net heat flux boundary condition at "top" interfaces that are exposed to illumination/evaporation. For the edges of the boundary domain below the top interface (side walls and below surface level), insulating boundary conditions (i.e. no heat flux across the boundary) are assumed. In the model, values are assumed for the incident solar intensity (1,000 W/m$^2$), heat of evaporation (~1,000 kJ/kg), convective heat transfer coefficient (~10 W/m$^2$K), and estimate k~2.2·10$^{-5}$ m/s$^4$.

Calculation of Shape Factors for Different Gel Microstructure Arrays

To get a qualitative understanding for how the inter-distance affects vapor escape in arrays with different morphology, a parallel was drawn to the concept of shape factor in radiative heat transfers. Shape factor is a geometrical function that depends on the size, shape, separation distance, and orientation of participating elements. The shape factor between two surfaces A and B, labelled $F_{A \to B}$, relates the proportion of radiation leaving surface A that is intercepted by surface B. Shape factor was used as a geometrical characteristic to qualitatively describe the "packing density" of participating elements in the gel micro-structure arrays by showing how closely these micro-structures are packed together in one array and how much open space the array could provide for the vapor to escape. As the inter-distance of gel micro-structures on the membranes is at millimeter level, smaller shape factor indicates more open space for vapor to escape and lower chance for generated vapor to be interfered by the adjacent micro-structures.

The shape factor (COMSOL Multiphysics) was numerically evaluated between the nearest-neighbor elements for cone, cylinder, and tree arrays. Geometrical shape factors are calculated using COMSOL Multiphysics Surface-to-Surface Radiation interface. The computational domain consists of two nearest-neighbor elements. The boundary conditions applied to the surface of the elements treat them as diffuse black-body radiators with emissivity near-unity emissivity. The shape factor, also known as the view factor, between the two elements/surfaces A1 and A2 is defined as the ratio between the diffuse energy leaving A1 and intercepted by A2 and the total diffuse energy leaving A1, that is $$F_{A1-A2} = \frac{\int_{A2} \Upsilon(J_1)ds}{\int_{A1} J_1 ds},$$

where $J_1$ is the radiosity of element 1, and $\Upsilon(J_1)$ is the irradiation operator from the surface-to-surface radiation interface in COMSOL Multiphysics.

Design of Floating Prototype for all Day Water Collection in Natural Environments A floating system for all day water collection in natural environments, such as sea, lake, or pool was designed. The structure was constructed from polyester thin film, cellulose-based fabric, polyurethane foam, metal wires and wood rods. The condensation structure was constructed from lightweight and cheap polyester films. The film was cut into several pieces and glued together on skeleton made by steel wires. Droplet collection was facilitated by inclined polymer film and super-absorbable fabric wicks (Zorbs)[6]. Collected water was transported to water storage bag by fabric wicks. The PVA/PPy gel samples were held by a supporting structure which was made by polyurethane foam and nylon mesh. The wholesale materials cost of the entire floating prototype is ~$4.

The unique feature of the floating system is its foldable condensation structure which enables dual mode for all day water collection. The design can be easily replicated at home or modified and produced by factory. Smart or remote modulus can be further added to the device to enable intelligent control of water collection modes.

SUPPLEMENTARY REFERENCES

1. Zhao, F., Zhou, X. Y., Shi, Y., Qian, X., Alexander, M., Zhao, X. P., Mendez, S., Yang, R. G., Qu, L. T. & Yu, G. H. Highly efficient solar vapour generation via hierarchically nanostructured gels. *Nat. Nanotech.* 13, 489-495 (2018).
2. Ju, J., Yao, X., Yang, S., Wang, L., Sun, R. Z., He, Y. X., & Jiang, L. Cactus Stem Inspired Cone-Arrayed Surfaces for Efficient Fog Collection. *Adv. Funct. Mater.* 24, 6933-6938 (2014).
3. Ju, J. et al. Cactus Stem Inspired Cone-Arrayed Surfaces for Efficient Fog Collection. *Adv. Funct. Mater.* 24, 6933-6938 (2014).
4. Lecoq, L., Flick, D. & Laguerre, O. Study of the water evaporation rate on stainless steel plate in controlled conditions. *Int. J. Therm. Sci.* 111, 450-462 (2017).
5. El-Samadony, Y. A. F., El-Maghlany, W. M. & Kabeel, A. E. Influence of glass cover inclination angle on radiation heat transfer rate within stepped solar still. *Desalination* 384, 68-77 (2016).
6. Ni, G. et al. A salt-rejecting floating solar still for low-cost desalination. *Energy Environ, Sci.* 11, 1510-1519 (2018).
7. Dai, X., Sun, N., Nielsen, S. O., Stogin, B. B., Wang, J., Yang, S. K. & Wong, T. K., Hydrophilic directional slippery rough surfaces for water harvesting. *Sci. Adv.* 4, eaaq0919 (2018).
8. Bai, H. et al. Efficient Water Collection on Integrative Bioinspired Surfaces with Star-Shaped Wettability Patterns. *Adv. Mater.* 26, 5025-5030 (2014).
9. Kudo, K. et al. Structural changes of water in poly(vinyl alcohol) hydrogel during dehydration. *J. Chem. Phys.* 140, 044909 (2014).
10. Zhou, X. et al. A Hydrogel-based Antifouling Solar Evaporator for Highly Efficient Water Desalination. *Energy Environ. Sci.* 11, 1985-1992 (2018).
11. Guo, Y. et al. Biomass-Derived Hybrid Hydrogel Evaporators for Cost-Effective Solar Water Purification. *Adv. Mater.* 32, 1907061 (2020)
12. Zhou, M. et al. Accelerating vapor condensation with daytime radiative cooling. *Proc. SPIE* 11121, *New Concepts in Solar and Thermal Radiation Conversion II*, 1112107 (2019).
13. https://www.timeanddate.com/weather/usa/pasadena-ca/historic.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of purifying and collecting water, the method comprising:
    contacting a membrane with fog, wherein the membrane comprises:
        a sheet having a top surface and a bottom surface; and
        a plurality of conical structures disposed on the top surface of the sheet, the conical structures comprising a hydrogel material;
    absorbing water from the fog into the membrane via the conical structures;
    collecting the fog-derived water;
    placing the membrane on a surface of an amount of impure water, wherein the impure water is not the fog-derived water;
    covering the membrane with a condensation structure, wherein the condensation structure is at least partially transparent to solar radiation;
    distilling at least a portion of the impure water, wherein the distilling comprises:
        absorbing the impure water into the membrane via the bottom surface of the sheet;
        heating the membrane via solar radiation;
        releasing purified water vapor from the conical structures;
        condensing the purified water vapor on a surface of the condensation structure; and
        collecting the condensed purified water.

2. The method of claim 1, wherein each conical structure of the plurality of conical structures has a height of 1 mm to 50 mm, wherein the height is measured from the top surface of the sheet to an apex of one of the conical structures.

3. The method of claim 1, wherein each conical structure of the plurality of conical structures has an apex angle of 10 to 60 degrees.

4. The method of claim 1, wherein each of the conical structures comprises a conical trunk structure, and wherein each of the conical trunk structures further comprises a plurality of conical branch structures disposed thereon.

5. The method of claim 1, wherein each of the conical structures is characterized by a self-similar geometrical configuration.

6. The method of claim 1, wherein the conical structures are disposed on the top surface at a density of 1 to 400 conical structures per $cm^2$.

7. The method of claim 1, wherein the membrane comprises polyvinyl alcohol.

8. The method of claim 1, wherein the membrane comprises polypyrrole particles dispersed in a continuous matrix of polyvinyl alcohol.

9. The method of claim 1, comprising:
concomitant with or prior to the step of contacting the membrane with fog, tilting the sheet to improve drainage of the fog-derived water from the membrane.

10. The method of claim 1, comprising floating the membrane on the surface of the impure water.

11. The method of claim 1, wherein each conical structure of the plurality of conical structures has an apex angle of 20 to 45 degrees.

12. The method of claim 1, wherein the conical structures are separated from a nearest adjacent conical structure by an average spacing of 0.3 to 15 mm.

13. The method of claim 1, wherein the conical structures are provided over an area of the top surface of the sheet selected from the range of 1 $cm^2$ to 10 $m^2$.

14. The method of claim 1, wherein each of the trunk structures has a conical apex and a conical axis, the conical axis passing through the conical apex such that each trunk structure has circular symmetry about its respective conical axis; and
wherein the conical axis and the top surface of the sheet form an angle that is within 20 degrees of perpendicular.

15. The method of claim 4, wherein each of the branch structures has a conical apex and a conical axis, the conical axis passing through the conical apex such that each branch structure has circular symmetry about the conical axis; and
wherein for each branch structure, the conical axis of the trunk structure and the conical axis of the branch structure form an angle of 30 to 60 degrees.

16. The method of claim 1, wherein the hydrogel material is characterized by a contact angle selected from the range of 10 degrees to 90 degrees.

17. The method of claim 1, wherein the hydrogel material is hierarchically porous.

18. The method of claim 1, wherein the membrane has an average thickness selected from the range of 0.5 to 100 mm.

19. The method of claim 1, wherein the membrane has a maximum absorbance of greater than 80% of an incident amount of electromagnetic radiation in the visible spectrum.

* * * * *